(12) United States Patent
Dowell et al.

(10) Patent No.: US 11,170,177 B2
(45) Date of Patent: Nov. 9, 2021

(54) COMPUTATIONAL LINGUISTIC ANALYSIS OF LEARNERS' DISCOURSE IN COMPUTER-MEDIATED GROUP LEARNING ENVIRONMENTS

(71) Applicants: Nia Marcia Maria Dowell, Ann Arbor, MI (US); Tristan Nixon, Ann Arbor, MI (US)

(72) Inventors: Nia Marcia Maria Dowell, Ann Arbor, MI (US); Tristan Nixon, Ann Arbor, MI (US)

( * ) Notice: Subject to any disclaimer, the term of this patent is extended or adjusted under 35 U.S.C. 154(b) by 0 days.

(21) Appl. No.: 16/048,804

(22) Filed: Jul. 30, 2018

(65) Prior Publication Data
US 2019/0138597 A1 May 9, 2019

Related U.S. Application Data

(60) Provisional application No. 62/538,413, filed on Jul. 28, 2017.

(51) Int. Cl.
*G06F 40/30* (2020.01)
*G06F 40/284* (2020.01)
(Continued)

(52) U.S. Cl.
CPC .............. *G06F 40/35* (2020.01); *H04L 51/16* (2013.01); *H04L 65/40* (2013.01); *H04L 65/4023* (2013.01)

(58) Field of Classification Search
CPC ...... G06F 40/20; G06F 40/279; G06F 40/284; G06F 40/30; G06F 40/295; G06F 40/35; G10L 25/30
(Continued)

(56) References Cited

U.S. PATENT DOCUMENTS

| 9,037,464 | B1 * | 5/2015 | Mikolov | G06F 40/30 |
| | | | | 704/255 |
| 9,218,339 | B2 * | 12/2015 | Zechner | G06F 40/40 |

(Continued)

OTHER PUBLICATIONS

Akkerman, S., Van den Bossche, P., Admiraal, W., Gijselaers, W., Segers, M., Simons, R.-J., & Kirschner, P. (2007). Reconsidering group cognition: From conceptual confusion to a boundary area between cognitive and socio-cultural perspectives? Educational Research Review, 2(1), 39-63. https://doi.org/10.1016/j.edurev.2007.02.001.

(Continued)

*Primary Examiner* — Martin Lerner

(57) ABSTRACT

A method is described comprising receiving a conversational transcript of a conversational interaction among a plurality of participants, wherein each participant contributes a sequence of contributions to the conversational interaction. The method includes projecting contributions of the plurality of participants into a semantic space using a natural language vectorization, wherein the semantic space describes semantic relationships among words of the conversational interaction. The method includes computing interaction process measures using information of the conversational transcript, the conversational interaction, and the natural language vectorization.

27 Claims, 13 Drawing Sheets
(11 of 13 Drawing Sheet(s) Filed in Color)

(51) Int. Cl.
    *G06F 40/35*     (2020.01)
    *H04L 12/58*     (2006.01)
    *H04L 29/06*     (2006.01)

(58) Field of Classification Search
    USPC .................................. 704/1, 9, 232; 706/55
    See application file for complete search history.

(56) References Cited

U.S. PATENT DOCUMENTS

| | | | |
|---|---|---|---|
| 9,336,192 B1* | 5/2016 | Barba ................. | G06F 40/30 |
| 10,262,654 B2* | 4/2019 | Hakkani-Tur ......... | G06F 40/35 |
| 10,338,939 B2* | 7/2019 | Franck .................. | G10L 17/08 |
| 2010/0223051 A1* | 9/2010 | Burstein ................ | G06F 40/30 704/9 |
| 2011/0145334 A9* | 6/2011 | Colson .................. | G06Q 10/06 709/206 |
| 2011/0258181 A1* | 10/2011 | Brdiczka ............... | G06F 40/295 707/769 |
| 2013/0158982 A1* | 6/2013 | Zechner ................ | G06F 40/40 704/9 |
| 2013/0158986 A1* | 6/2013 | Wiles .................... | G06F 40/35 704/9 |
| 2014/0282244 A1* | 9/2014 | Speer .................... | G06F 40/103 715/811 |
| 2014/0337034 A1* | 11/2014 | John ...................... | G10L 25/48 704/270 |
| 2016/0203187 A1* | 7/2016 | Alonso ................. | G06F 16/345 707/692 |
| 2016/0226813 A1* | 8/2016 | Cecchi .................. | G06F 40/284 |
| 2017/0092264 A1* | 3/2017 | Hakkani-Tur ......... | G06F 40/35 |
| 2017/0270100 A1* | 9/2017 | Audhkhasi ............. | G06F 40/30 |
| 2017/0300499 A1* | 10/2017 | Lev-Tov ............... | G06F 40/174 |
| 2018/0032874 A1* | 2/2018 | Sanchez Charles ..... | G06F 40/35 |
| 2018/0351899 A1* | 12/2018 | Kano ..................... | G06F 40/00 |
| 2018/0365319 A1* | 12/2018 | Ghotbi .................. | G06F 40/284 |
| 2018/0374486 A1* | 12/2018 | Zhao ..................... | G10L 15/16 |
| 2019/0197129 A1* | 6/2019 | Yong ..................... | G06F 40/30 |

OTHER PUBLICATIONS

Alavi, M., & Butner, D. (2004). Technology-mediated collaborative learning: A research perspective. In S. R, Hiltz & R. Goldman (Eds.), Learning together online: Research on asynchronous learning networks (pp. 191-213). Mahwah, NJ: Routledge.

Anderson, M. J. (2001). A new method for non-parametric multivariate analysis of variance. Austral Ecology, 26(1), 32-46. https://doi.org/10.1111/j.1442-9993.2001.01070.pp.x.

Antonenko, P. D., Toy, S., & Niederhauser, D. S. (2012). Using cluster analysis for data mining in educational technology research. Educational Technology Research and Development, 60(3), 383-398.

Azevedo, R., Moos, D. C., Johnson, A. M., & Chauncey, A. (2010). Measuring cognitive and metacognitive regulatory processes during hypermedia learning: Issues and challenges. Educational Psychologist, 45(4), 210-223. https://doi.org/10.1080/00461520.2010.515934.

Azevedo, R., Winters, F. I., & Moos, D. C. (2004). Students collaboratively use hypermedia to learn science? The dynamics of self-and other-regulatory processes in an ecology classroom. Journal of Educational Computing Research, 31(3), 215-245. https://doi.org/10.2190/HFT6-8EB1-TN99-MJVQ.

Bagley, E., & Shaffer, D. (2015). Learning in an urban and regional planning practicum: The view from educational ethnography. Journal of Interactive Learning Research, 26(4), 369-393.

Baker, R. S. (2010). Data mining for education. In B. McGaw, P. Peterson, & E. Baker (Eds.), International encyclopedia of education (3rd ed., vol. 7, pp. 112-118). Oxford, U.K: Elsevier.

Baker, R. S., D'Mello, S. K., Rodrigo, M. M. T., & Graesser, A. C. (2010). Better to be frustrated than bored: The incidence, persistence, and impact of learners' cognitive-affective states during interactions with three different computer-based learning environments. International Journal of Human-Computer Studies, 68(4), 223-241. https://doi.org/10.1016/j.ijhcs.2009.12.003.

Barron, B. (2000). Achieving coordination in collaborative problem-solving groups. Journal of the Learning Sciences, 9(4), 403-436. https://doi.org/10.1207/S15327809JLS0904_2.

Barron, B. (2003). When smart groups fail. Journal of the Learning Sciences, 12(3), 307-359. https://doi.org/10.1207/S15327809JLS1203_1.

Beers, P. J., Boshuizen, H. P. A., Kirschner, P. A., & Gijselaers, W. H. (2007). The analysis of negotiation of common ground in CSCL. Learning and Instruction, 17(4), 427-435. https://doi.org/10.1016/j.learninstruc.2007.04.002.

Berkowitz, M. W., & Gibbs, J. C. (1983). Measuring the developmental features of moral discussion. Merrill-Palmer Quarterly, 29(4), 399-410.

Binkley, M., Erstad, O., Herman, J., Raizen, S., Ripley, M., & Rumble, M. (2011). Defining 21st century skills. In P. Griffin, B. McGaw, & E. Care (Eds.), Assessment and teaching 21st century skills (pp. 17-66). Heidelberg: Springer.

Blei, D. M., Ng, A., & Jordan, M. (2003). Latent dirichlet allocation. Journal of Machine Learning Research, 3, 993-1022.

Blumenfeld, P. C., Kempler, T. M., & Krajcik, J. S. (2006). Motivation and cognitive engagement in learning environments, In K. Sawyer (Ed.), The Cambridge handbook of the learning sciences (pp. 475-488). New York, NY, US: Cambridge University Press.

Brock, G., Pihur, V., Datta, S., & Datta, S, (2008). clValid , an R package or cluster validation.

Burkett, C., Keshtkar, F., Graesser, A. C., & Li, H. (2012). Constructing a personality-annotated corpus for educational game based on Leary's Rose. In G. M. Youngblood & P. M. McCarthy (Eds.), Proceedings of the 25th Florida Artificial Intelligence Research Society Conference. Palo Alto, Calfornia: AAAI Press. Retrieved from https://www.aaai.org/ocs/index.php/FLAIRS/FLAIRS12/paper/view/4375.

Cade, W. L., Dowell, N. M., Graesser, A. C., Tausczik, Y. R., & Pennebaker, J. W. (2014). Modeling student socioaffective responses to group interactions in a collaborative online chat environment. In J. Stamper, Z. Pardos, M. Mavrikis, & B. M. McLaren (Eds.), Proceedings of the 7th International Conference on Educational Data Mining. (pp. 399-400). Berlin: Springer.

Cai, Z., Li, H., Hu, X., & Graesser, A. C. (2016). Can word probabilities from LDA be simply adde up to represent documents? In T. Barnes, M. Chi, & M. Feng (Eds.), Proceedings of the 9th International Conference on Educational Data Mining (pp. 577-578). Raleigh, NC: International Educational Data Mining Society. Retrieved from https://www.researchgate.net/publication/305045020_Can_word_probabilities_from_LDA_be_simply_added_up_to_represent_documents.

Care, E., Scoular. C., & Griffin, P. (2016). Assessment of collaborative problem solving in education environments. Applied Measurement in Education, 29(4), 250-264. https://doi.org/10.1080/08957347.2016.1209204.

Chan, C. K. K. (2012). Co-regulation of learning in computer-supported collaborative learning environments: a discussion. Metacognition and Learning, 7(1), 63-73. https://doi.org/10.1007/s11409-012-9086-z.

Charred, M., Ghazzali, N., Boiteau, V., & Niknafs, A. (2014). NbClust: An R package for determining the relevant number of clusters in a data set. Journal of Statistical Software, 61(6). https://doi.org/10.18637/jss.v061.i06.

Chen, S.-J., & Caropreso, E. J. (2004). Influence of personality on online discussion. Journal of Interactive Online Learning, 3(2), 1-17.

Chi, M. T. H., & Menekse, M. (2015). Dialogue patterns in peer collaboration that promote learning. In L. B. Resnick, C. S. C. Asterhan, & S. N. Clarke (Eds.), Socializing intelligence through academic talk and dialogue (pp. 263-274). Washington, D.C.: American Educational Research Association. Retrieved from http://ebooks.aera.net/SOCCH21.

(56) References Cited

OTHER PUBLICATIONS

Chi, M. T. H. (2009). Active-Constructive-Interactive: A conceptual framework for differentiating learning activities. Topics in Cognitive Science, 1(1), 73-105. https://doi.org/10.1111/j.1756-8765.2008.01005.x.

Clark, H., & Brennan, S. E. (1991). Grounding in communication. In L. B. Resnick, J. M. Levine, & S. D. Teasley (Eds.), Perspectives on socially shared cognition (pp. 127-149). Washington, DC: American Psychological Association.

Cooke, N. J., & Hilton, M. L. (Eds.). (2015). Enhancing the effectiveness of team science. Washington (DC): National Academies Press (US). Retrieved from hftp://www.ncbi.nlm.nih.gov/books/NBK310387/.

Cooke, N. J., Gordman, J., & Winner, J. (2007). Team cognition. In F. Durso, S. Nickerson, S. Dumais, S. Lewandowsky, & T. Perfect (Eds.), Handbook of applied cognition (2nd ed., pp. 239-268). New York, NY: Wiley.

Cooke, N. J., Gorman, J. C., Myers, C. W., & Duran, J. L. (2013). Interactive team cognition. Cognitive Science, 37(2), 255-285. https://doi.org/10.1111/cogs.12009.

Cress, U. (2008). The need for considering multilevel analysis in CSCL research—An appeal for the use of more advanced statistical methods. International Journal of Computer-Supported Collaborative Learning, 3(1), 69-84. https://doi.org/10.1007/s11412-007-9032-2.

Dalton, L., Ballarin, V., & Brun, M. (2009). Clustering algorithms: on learning, validation, performance, and applications to genomics. Current Genomics, 10(6), 430-445. https://doi.org/10.2174/138920209789177601.

Daradoumis, T., Martinez-Monés, A., & Xhafa, F. (2006). A layered framework for evaluating on-line collaborative learning interactions. International Journal of Human-Computer Studies, 64(7), 622-635. https://doi.org/10.1016/j.ijhcs.2006.02.001.

Datta, S., & Datta, S. (2003). Comparisons and validation of statistical clustering techniques for microarray gene expression data. Bioinformatics, 19(4), 459-466. https://doi.org/10.1093/bioinformatics/btg025.

De Wever, B., Schellens, T., Valcke, M., & Van Keer, H. (2006). Content analysis schemes to analyze transcripts of online asynchronous discussion groups: A review. Computers & Education, 46(1), 6-28. https://doi.org/10.1016/j.compedu.2005.04.005.

De Wever, B., Van Keer, H., Schellens, T., & Valcke, M. (2007). Applying multilevel modelling to content analysis data: Methodological issues in the study of role assignment in asynchronous discussion groups. Learning and Instruction, 17(4), 436-447. https://doi.org/10.1016/j.learninstruc.2007.04.001.

Dede, C. (2009). Comparing frameworks for 21st century skills. In J. Bellanca & R. Brandt (Eds.), 21st century skills: Rethinking how students learn. (pp. 51-76). Bloomington, IN: Solution Tree Press.

Dede, C. (2014). The role of digital technologies in deeper learning. (Students at the Center: Deeper Learning Research Series). Boston, MA: Jobs for the Future.

Dede, C. (2015). Data-intensive research in education: Current work and next steps (p. 120). Washington, D.C: Computer Research Association, Retrieved from http://cra.org/cra-releases-report-on-data-intensive-research-in-education/.

Dehler, J., Bodemer, D., Buder, J., & Hesse, F. (2011). Guiding knowledge communication in CSCL via group knowledge awareness. Computers in Human Behavior, 27(3), 1068-1078. https://doi.org/10.1016/j.chb.2010.05.018.

Devine, D. J., Clayton, L. D., Philips, J. L., Dunford, B. B., & Melner, S. B. (1999). Teams in organizations: Prevalence, characteristics, and effectiveness. Small Group Research, 30(6), 678-711. https://doi.org/10.1177/104649649903000602.

Dillenbourg, P., & Fischer, F. (2007). Basics of computer-supported collaborative learning. Zeitschrift Fur Berufs-Und Wirtschaftspadagogik, 21, 111-130.

Dillenbourg, P., & Traum, D. (2006). Sharing solutions: Persistence and grounding in multimodal collaborative problem solving. Journal of the Learning Sciences, 15(1), 121-151. https://doi.org/10.1207/s15327809jls1501_9.

Dillenbourg, P., Järvelä, S., & Fischer, F. (2009). The evolution of research on computer-supported collaborative learning. In D. N. Balacheff, D. S. Ludvigsen, D. T. de Jong, D. A. Lazonder, & D. S. Barnes (Eds.), Technology-enhanced learning (pp. 3-19). Springer Netherlands. https://doi.org/10.1007/978-1-4020-9827-7_1.

D'Mello, S., & Graesser, A. (2012a). Dynamics of affective states during complex learning. Learning and Instruction, 22(2), 145-157. https://doi.org/10.1016/j.learninstruc.2011.10.001.

D'Mello, S., & Graesser, A. C. (2012b). Language and discourse are powerful signals of student emotions during tutoring. IEEE Transactions on Learning Technologies, 5(4), 304-317. https://doi.org/10.1109/TLT.2012.10.

Dönmez, P. Rosé, C., Stegmann, K., Weinberger, A., & Fischer, F. (2005). Supporting CSCL with automatic corpus analysis technology. In T. Koschmann, D. Suthers, & T. W. Chan (Eds.), Proceedings of the 2005 Conference on Computer Support for Collaborative Learning: Learning 2005: The Next 10 Years! (pp. 125-134). Taipei, Taiwan: International Society of the Learning Sciences. Retrieved from http://dl.acm.org/citation.cfm?id=1149293.1149310.

Dong, A. (2005). The latent semantic approach to studying design team communication. Design Studies, 26(5), 445-461. https://doi.org/10.1016/j.destud.2004.10.003.

Dowell, N. M., & Graesser, A. C. (2015). Modeling learners' cognitive, affective, and social processes through language and discourse. Journal of Learning Analytics, 1(3), 183-186.

Dowell, N. M., Cade, W. L., Tausczik, Y. R., Pennebaker, J. W., & Graesser, A. C. (2014). What works: Creating adaptive and intelligent systems for collaborative learning support. In S. Trausan-Matu, K. E. Boyer, M. Crosby, & K. Panourgia (Eds.), Twelfth International Conference on Intelligent Tutoring Systems. (pp. 124-133). Berlin: Springer.

Dowell, N. M., Skrypnyk, O., Joksimović, S., Graesser, A. C., Dawson, S., Gašević, S., . . . Kovanović, V. (2015). Modeling learners' social centrality and performance through language and discourse. In C. Romero & M. Pechenizkiy (Eds.), Proceedings of the 8th International Conference on Educational Data Mining (pp. 250-257). International Educational Data Mining Society.

Dunn, J. C. (1974). Well-separated clusters and optimal fuzzy partitions. Journal of Cybernetics, 4(1), 95-104. https://doi.org/10.1080/01969727408546059.

Everitt, B. S., Landau, S., Leese, M., & Stahl, D. (2011). Model-Based cluster analysis for structured data. In Cluster analysis (pp. 187-213). Chichester, UK.: John Wiley & Sons, Ltd. Retrieved from http://onlinelibrary.wiley.com.proxy.lib.umich.edu/doi/10.1002/9780470977811.ch7/summary.

Fiore, S., & Schooler, J. (2004). Process mapping and shared cognition: Teamwork and the development of shared problem models. In E. Salas & S. Fiore (Eds.), Team cognition: Understanding the factors that drive process and performance (pp. 133-152). Washington, D.C: American Psychological Association.

Fiore, S. M., Rosen, M. A. Smith-Jentsch, K. A., Salas, E., Letsky, M., & Warner, N. (2010). Toward an understanding of macrocognition in teams: predicting processes in complex collaborative contexts. Human Factors, 52(2), 203-224.

Foltz, P., Lavoie, N., Oberbreckling, R. J., & Rosenstein, M. (2007). Tools for automated analysis of networked verbal communication (Network Science Report No. 1) (pp. 19-24). United States Military Academy Network Science Center.

Fuchs, L. S., Fuchs, D., Hamlett, C. L., & Karns, K. (1998). High-achieving students' interactions and performance on complex mathematical tasks as a function of homogeneous and heterogeneous pairings. American Educational Research Journal, 35(2), 227-267. https://doi.org/10.2307/1163424.

Goldberg, L. R. (1961). Language and individual differences: The search for universals in personality lexicons. In L. Wheeler (Ed,), Review of Personality and Social Psychology (vol. 2, pp. 141-165). Beverly Hills, CA: SAGE.

Gorman, J. C., Cooke, N. J., & Kiekel, P. A. (2004). Dynamical perspectives on team cognition. Proceedings of the Human Factors

(56) References Cited

OTHER PUBLICATIONS and Ergonomics Society Annual Meeting, 48(3), 673-677. https://doi.org/10.1177/154193120404800385.

Gorman, J. C., Foltz, P. W., Kiekel, P. A., Martin, M. J., & Cooke, N. J. (2003). Evaluation of latent semantic analysis-based measures of team communications content. Proceedings of the Human Factors and Ergonomics Society Annual Meeting, 47(3), 424-428. https://doi.org/10.1177/154193120304700337.

Graesser, A. C., D'Mello, S. K., & Strain, A. C. (2014), Emotions in advanced learning technologies. In R. Pekrun & L. Linnenbrink-Garcia (Eds.), International handbook of emotions in education. New York, NY: Routledge Handbooks Online. Retrieved from https://www.routledgehandbooks.com/doi/10.4324/9780203148211.ch24.

Graesser, A. C., Foltz, P., Rosen, Y., Shaffer, D., Forsyth, C., & Germany, M. (2016). Challenges of assessing collaborative problem-solving. In E. Care, P. Griffin, & M. Wilson (Eds.), Assessment and teaching of 21st century skills. Heidelberg, Germany: Springer.

Graesser, A. C., Forsyth, C., & Foltz, P. (2017). Assessing conversation quality, reasoning, and problem solving performance with computer agents. In B. Csapo, J. Funke, & A. Schleicher (Eds.), On the nature of problem solving: A look behind PISA 2012 problem solving assessment (pp. 275-297). Heidelberg, Germany: OECD Series.

Graesser, A. C., McNamara, D. S., Cai, Z., Conley, M., Li, H., & Pennebaker, J. W. (2014). Coh-Metrix measures text characteristics at multiple levels of language and discourse. The Elementary School Journal, 115(2), 210-229. https://doi.org/10.1086/678293.

Graesser, A. C., McNamara, D. S., Louwerse, M. M., & Cai, Z. (2004). Coh-metrix: analysis of text on cohesion and language. Behavior Research Methods, Instruments, & Computers: A Journal of the Psychonomic Society, Inc, 36(2), 193-202.

Greenhow, C., Robelia, B., & Hughes, J. E. (2009). : What path should we take now? Educational Researcher, 38(4), 246-259. https://doi.org/10.3102/0013189X09336671.

Griffin, P., Care, E., & McGaw, B. (2012). The changing role of education and schools. In P. Griffin, B. McGaw, & E. Care (Eds.), Assessment and teaching of 21st century skills (pp. 1-15). Heidelberg: Springer.

Gunawardena, C. N., Lowe, C. A., & Anderson, T. (1997). Analysis of a global online debate and the development of an interaction analysis model for examining social construction of knowledge in computer conferencing. Journal of Educational Computing Research, 17(4), 397-431.

Guzdial, M., & Turns, J. (2000). Effective discussion through a computer-mediated anchored forum. The Journal of the Learning Sciences, 9(4), 437-469.

Gweon, G., Jain, M., McDonough, J., Raj, B., & Rosé, C. P. (2013). Measuring prevalence of other-oriented transactive contributions using an automated measure of speech style accommodation. International Journal of Computer-Supported Collaborative Learning, 8(2), 245-265. https://doi.org/10.1007/s11412-013-9172-5.

Hake, R. R. (1998). Interactive-engagement versus traditional methods: A six-thousand-student survey of mechanics test data for introductory physics courses. American Journal of Physics, 66(1), 64-74. https://doi.org/10.1119/1.18809.

Handl, J., Knowles, J., & Kell, D. B. (2005). Computational cluster validation in post-genomic data analysis. Bioinformatics, 21(15), 3201-3212. https://doi.org/10.1093/bioinformatics/bti517.

Hare, A. P. (1994). Types of roles in small groups: A bit of history and a current perspective. Small Group Research, 25(3), 433-448. https://doi.org/10.1177/1046496494253005.

Haviland, S. E., & Clark, H. H. (1974). What's new? Acquiring new information as a process in comprehension. Journal of Verbal Learning and Verbal Behavior, 13(5), 512-521. https://doi.org/10.1016/S0022-5371(74)80003-4.

Hew, K. F., Cheung, W. S., & Ng, C. S. L. (2010). Student contribution in asynchronous online discussion: a review of the research and empirical exploration. Instructional Science, 38(6), 571-606. https://doi.org/10.1007/s11251-008-9087-0.

Hmelo-Silver, C. E., & Barrows, H. S. (2008). Facilitating collaborative knowledge building. Cognition and Instruction;26(1), 48-94. https://doi.org/10.1080/07370000701798495.

Hoadley, C. (2010). Roles, design, and the nature of CSCL. Computers in Human Behavior, 26(4), 551-555. https://doi.org/10.1016/j.chb.2009.08.012.

Howley, I., & Mayfield, E. (2011). Missing something? authority in collaborative learning. In Proceedings of the 9th International Computer Supported Collaborative Learning Conference (vol. 1, pp. 336-373). New York, NY: International Society of the Learning Sciences.

Howley, I., Mayfield, E., & Rosé, C. P. (2013). Linguistic analysis methods for studying small groups. In C. E. Hmelo-Silver, C. A. Chinn, & A. M. O'Donnell (Eds.), The international handbook of collaborative learning (pp. 184-203). New York, NY: Routledge.

Howley, I., Mayfield, E., Rose, C. P., & Strijbos, J. W. (2013). A multivocal process analysis of social positioning in study group interactions. In D. Suthers, K. Lund, C. P. Rose, C. Teplovs, & N. Law (Eds.), Productive multivocality in the analysis of group interactions (vol. 15). New York, NY: Springer.

Hrastinski, S. (2008). What is online learner participation? A literature review. Computers & Education, 51(4), 1755-1765. https://doi.org/http://dx.doi.org/10.1016/j.compedu.2008.05.005.

Hu, X., Cai, Z., Wiemer-Hastings, P., Graesser, A. C., & McNamara, D. S. (2007). Strengths, limitations, and extensions of LSA. In T. K. Landauer, D. S. McNamara, S. Dennis, & W. Kintsch (Eds.), Handbook of latent semantic analysis (pp. 401-426). New York: Lawrence Erlbaum Assoc Incorporated.

Hu, X., Zhang, X., Lu, C., Park, E. K., & Zhou, X. (2009). Exploiting Wikipedia as external knowledge for document clustering. In Proceedings of the 15th ACM SIGKDD International Conference on Knowledge Discovery and Data Mining (pp. 389-396). New York, NY, USA: ACM. https://doi.org/10.1145/1557019.1557066.

Hubert, L. J., & Arabie, P. (1985). Comparing partitions. Journal of Classification, 2(2-3), 193-218. https://doi.org/10.1007/BF01908075.

Hughes, C. (1998). Online interactions: Developing a neglected aspect of the virtual classroom. Educational Technology, 38(4), 48-55.

Ilgen, D. R., Hollenbeck, J. R., Johnson, M., & Jundt, D. (2005). Teams in organizations: from input-process-output models to IMOI models. Annual Review of Psychology, 56, 517-543. https://doi.org/10.1146/annurev.psych.56.091103.070250.

Jahnke, I. (2010). Dynamics of social roles in a knowledge management community. Computers in Human Behavior, 26(4), 533-546. https://doi.org/10.1016/j.chb.2009.08.010.

Jeong, H., & Chi, M. T. H. (2006). Knowledge convergence and collaborative learning. Instructional Science, 35(4), 287-315. https://doi.org/10.1007/s11251-006-9008-z.

Johnson, D. W., & Johnson, R. T. (2014). Using technology to revolutionize cooperative learning: an opinion. Frontiers in Psychology, 5. https://doi.org/10.3389/fpsyg.2014.01156.

Joksimović, S., Dowell, N. M. Oleksandra, S., Kovanović, V., Gašević, D., Dawson, S., & Graesser, A. C. (2015). How do you connect? Analysis of social capital accumulation in connectivist MOOCs. In Proceedings from the 5th International Learning Analytics and Knowledge (LAK) Conference (pp. 66-68). New York, NY: ACM.

Joksimović, S., Dowell, N. M., Oleksandra, S., Kovanović, V., Gašević, D., Dawson, S., & Graesser, A. C. (under review). Exploring the accumulation of social capital in cMOOCs through language and discourse. Journal of Educational Data Mining.

Joshi, M., & Rosé, C. P. (2007). Using transactivity in conversation summarization in educational dialog. In Proceedings of the SLaTE Workshop on Speech and Language Technology in Education.

Järvelä, S., Hurme, T. R., & Järvelä, H. (2011). Self-regulation and motivation in computer supported collaborative learning environments. In S. Ludvigsen, S. Lund, I. Rasmussen, & R. Säljö (Eds.), Learning across sites: New tools, infrastructures and practices (pp. 330-345). Oxford, U.K: Routledge.

Kapur, M. (2011). Temporality matters: Advancing a method for analyzing problem-solving processes in a computer-supported col-

(56) References Cited

OTHER PUBLICATIONS laborative environment. International Journal of Computer-Supported Collaborative Learning, 6(1), 39-56. https://doi.org/10.1007/s11412-011-9109-9.

Kapur, M., Voiklis, J., & Kinzer, C. K. (2011). A Complexity-Grounded model for the emergence of convergence in CSCL groups. In S. Puntambekar, G. Erkens, & C. Hmelo-Silver (Eds.), Analyzing interactions in CSCL: Methods, approaches and issues (pp. 3-23). Springer US. https://doi.org/10.1007/978-1-4419-7710-6_1.

Keshtkar, F., Burkett, C., Graesser, A. C., & Li, H. (2012). Detecting players' personality behavior with any effort of concealment. In A. Gelbukh (Ed.), Proceedings of 13th International Conference on Intelligent Text Processing and Computational Linguistics (pp. 502-514). Heidelberg, Germany: Springer. https://doi.org/10.1007/978-3-642-28801-8_42.

Kirschner, F., Pass, F., & Kirschner, P. A. (2009). A cognitive-load approach to collaborative learning: United brains for complex tasks. Educational Psychology Review, 21(1), 31-42. https://doi.org/10.1007/s10648-008-9095-2.

Kirschner, P. A., & Erkens, G. (2013). Toward a framework for CSCL research. Educational Psychologist, 48(1), 1-8. https://doi.org/10.1080/00461520.2012.750227.

Kirschner, P. A., Beers; P. J., Boshuizen, H. P. A., & Gijselaers, W. H. (2008). Coercing shared knowledge in collaborative learning environments. Computers in Human Behavior, 24(2), 403-420. https://doi.org/10.1016/j.chb.2007.01.028.

Knowlton, D. S. (2005). A taxonomy of learning through asynchronous discussion. Journal of Interactive Learning Research, 16(2), 155-177.

Kotrlik, J. W., Williams, H. A., & Jabor, M. K. (2011). Reporting and interpreting effect size in quantitative agricultural education research. Journal of Agricultural Education, 52(1), 132-142. https://doi.org/10.5032/jae.2011.01132.

Kozlowski, S. W. J. (2015). Advancing research on team process dynamics: Theoretical, methodological, and measurement considerations. Organizational Psychology Review, 5(4), 270-299. https://doi.org/10.1177/2041386614533586.

Kreijns, K., Kirschner; P. A., & Jochems, W. (2003). Identifying the pitfalls for social interaction in computer-supported collaborative learning environments: A review of the research. Computers in Human Behavior, 19(3). 335-353. https://doi.org/10.1016/S0747-5632(02)00057-2.

Lipponen, L., Rahikainen, M. Lallimo, J., & Hakkarainen, K. (2003). Patterns of participation and discourse in elementary students' computer-supported collaborative learning. Learning and Instruction, 13(5), 487-509. https://doi.org/10.1016/S0959-4752(02)00042-7.

Liu, L., von Davier, A., Kyllonen, P., & Zapata-Rivera, D. (2015). A tough nut to crack: Measuring collaborative problem solving. In R. Yigal, S. Ferrara, & M. Mosharraf (Eds.), Handbook of research on technology tools for real-world skill development (pp. 344-359). Hershey, PA: IGI Global.

Lucas, M., Gunawardena, C., & Moreira, A. (2014). Assessing social construction of knowledge online: A critique of the interaction analysis model. Computers in Human Behavior, 30, 574-582. https://doi.org/10.1016/j.chb.2013.07.050.

Marcos-Garcia, J.-A., Martinez-Mones, A., & Dimitriadis, Y. (2015). DESPRO: A method based on roles to provide collaboration analysis support adapted to the participants in CSCL situations. Computers & Education, 82, 335-353. https://doi.org/10.1016/j.compedu.2014.10.027.

Mayfield, E., & Penstein-Rosé, C. (2010). An interactive tool for supporting error analysis for text mining. In Proceedings of the NAACL HLT 2010 Demonstration Session (pp. 25-28). Stroudsburg, PA, USA: Association for Computational Linguistics. Retrieved from http://dl.acm.org/citation.cfm?id=1855450.1855457.

McCarthy, P., Dufty, D., Hempelman, C. F., Cai, Z., Graesser, A. C., & McNamara, D. (2012). Newness and givenness of information: Automated identification in written discourse. In P. M. McCarthy & C. Boonthum (Eds.), Applied natural language processing and content analysis: Identification, investigation, and resolution (pp. 475-478), Hershey, P.A: IGI Global.

McCrae, R. R., & John, O. P. (1992). An introduction to the five-factor model and its applications. Journal of Personality, 60(2), 175-215.

Mercer, N. (2008). The seeds of time: why classroom dialogue needs a temporal analysis. Journal of the Learning Sciences, 17(1), 33-59. https://doi.org/10.1080/10508400701793182.

Mesmer-Magnus, J. R., & Dechurch, L. A. (2009). Information sharing and team performance: a meta-analysis. The Journal of Applied Psychology, 94(2), 535-546. https://doi.org/10.1037/a0013773.

Mirriahi, N., Liaqat, D., Dawson, S., & Gašević, D. (2016). Uncovering student learning profiles with a video annotation tool: reflective learning with and without instructional norms. Educational Technology Research and Development, 1-24. https://doi.org/10.1007/s11423-016-9449-2.

Mäkitalo, K., Weinberger, A., Häkkinen, P., Järvelä, S., & Fischer, F. (2005). Epistemic cooperation scripts in online learning environments: fostering learning by reducing uncertainty in discourse? Computers in Human Behavior, 21(4), 603-622. https://doi.org/10.1016/j.chb.2004.10.033.

Molenaar, I., Chiu, M. M., Sleegers, P., & Boxtel, C. van. (2011). Scaffolding of small groups' metacognitive activities with an avatar. International Journal of Computer-Supported Collaborative Learning, 6(4), 601-624. https://doi.org/10.1007/s11412-011-9130-z.

Mostow, J., & Beck, J. (2006). Some useful tactics to modify, map and mine data from intelligent tutors. Natural Language Engineering, 12(2), 195-208. https//doi.org/10.1017/S1351324906004153.

Mu, J., Stegmann, K., Mayfield, E., Rosé, C., & Fischer, F. (2012). The ACODEA framework: Developing segmentation and classification schemes for fully automatic analysis of online discussions. International Journal of Computer-Supported Collaborative Learning, 7(2), 285-305. https://doi.org/10.1007/s11412-012-9147-y.

Nonnecke, B., & Preece, J. (2000). Lurker demographics: counting the silent. In Proceedings of the SIGCHI Conference on Human Factors in Computing Systems (pp. 73-80). New York, NY, USA: ACM. https://doi.org/10.1145/332040.332409.

O'Donnell, A. M. (2006). The role of peers and group learning. In P. Alexander & P. H. Winne (Eds.), Handbook of educational psychology (2 edition, pp. 781-802). Mahwah, N.J: Routledge.

Oecd. (2013). PISA 2015 collaborative problem solving framework. Oxford, U.K: OECD Publishing.

Ozer, D. J., & Benet-Martinez, V. (2006). Personality and the prediction of consequential outcomes. In Annual Review of Psychology (vol. 57, pp. 401-421). Palo Alto: Annual Reviews.

Pintrich, P. R. (2000). Multiple goals, multiple pathways: The role of goal orientation in learning and achievement. Journal of Educational Psychology, 92(3), 544-555. https://doi.org/10.1037/0022-0663.92.3.544.

Preece, J., Nonnecke, B., & Andrews, D. (2004). The top five reasons for lurking: improving community experiences for everyone. Computers in Human Behavior, 20(2), 201-223. https://doi.org/10.1016/j.chb.2003.10.015.

Prince, E. F. (1981). Toward a taxonomy of given-new information. In P. Cole (Ed.), Radical Pragmatics (pp. 223-255). New York, NY: Academic. Retrieved from http://search.proquest.com.proxy.lib.umich.edu/docview/741868036?pq-origsite=summon&accountid=14667.

Reimann, P. (2009). Time is precious: Variable- and event-centred approaches to process analysis in CSCL research. International Journal of Computer-Supported Collaborative Learning, 4(3), 239-257, https://doi.org/10.1007/s11412-009-9070-z.

Risser, H. S., & Bottoms, S. (2014). "Newbies" and "Celebrities": Detecting social roles in an online network of teachers via participation patterns. International Journal of Computer-Supported Collaborative Learning, 9(4), 433-450. https://doi.org/10.1007/s11412-014-9197-4.

Rose, C., Wang, Y.-C., Cui, Y., Arguello, J., Stegmann, K., Weinberger, A., & Fischer, F. (2008). Analyzing collaborative learning processes automatically: Exploiting the advances of computational linguistics in computer-supported collaborative learning. International Journal

(56) References Cited

OTHER PUBLICATIONS of Computer-Supported Collaborative Learning, 3(3), 237-271. https://doi.org/10.1007/s11412-007-9034-0.

Roschelle, J., & Teasley, S. D. (1995), The construction of shared knowledge in collaborative problem-solving. In C. E. O'Malley (Ed.), Computer-supported collaborative learning (pp. 67-97). Berlin: Springer-Verlag.

Roschelle, J. (1992). Learning by collaborating: convergent conceptual change. Journal of the Learning Sciences, 2(3), 235-276. https://doi.org/10.1207/s15327809jls0203_1.

Rosen, Y., & Mosharraf, M. (2015). Computer agent technologies and collaboration assessments. In Handbook of research on technology tools for real-world skill development (pp. 319-342). Hershey, PA: IGI Global.

Rosen, Y., & Rimor, R. (2012). Teaching and assessing problem solving in online collaborative environment. In T. Hartshorne, T. Heafner, & T. Petty (Eds.), Teacher education programs and online learning tools: Innovations in teacher preparation (pp. 82-97). Hershey, PA: Information Science Referenc, IGI Global.

Rosen, Y. (2015). Computer-based assessment of collaborative problem solving: Exploring the feasibility of human-to-agent approach. International Journal of Artificial Intelligence in Education, 1-27. https://doi.org/10.1007/s40593-015-0042-3.

Rousseeuw, P. J. (1987). Silhouettes: a graphical aid to the interpretation and validation of cluster analysis. Journal of Computational and Applied Mathematics, 20, 53-65.

Salas, E., Cooke, N. J., & Rosen, M. A. (2008). On teams, teamwork, and team performance: discoveries and developments. Human Factors, 50(3), 540-547.

Salas, E., Rosen, M. A., Burke, C. S.. Nicholson, D., & Howse, W. R. (2007). Markers for enhancing team cognition in complex environments: The power of team performance diagnosis. Aviation, Space, and Environmental Medicine, 78(5 Suppl), B77-85.

Sarmiento, J. W., & Shumar, W. (2010). Boundaries and roles: Positioning and social location in the Virtual Math Teams (VMT) online community. Computers in Human Behavior, 26(4), 524-532. https://doi.org/10.1016/j.chb.2009.08.009.

Shaffer, D., & Graesser, A. C. (2010). Using a quantitative model of participation in a community of practice to direct automated mentoring in an ill-defined domain. In C. Lynch, K. Ashley, T. Mitrovic, V. Dimitrova, N. Pinkwart, & V. Aleven (Eds.), Proceedings of the 4th International Workshop on Intelligent Tutoring Systems and Ill-Defined Domains(pp. 61-68). Pittsburgh, PS: Workshop at Intelligent Tutoring Systems (ITS).

Shaffer, D., Hatfield, D., Svarovsky, G. N., Nash, P., Nulty, A., Bagley, E., . . . Mislevy, R. (2009). Epistemic network analysis: A prototype for 21st-century assessment of learning. International Journal of Learning and Media, 1(2), 33-53. https://doi.org/10.1162/ijlm.2009.0013.

Siemens, G. (2005). Connectivism: Learning theory for the digital age. International Journal of Instructional Technology and Distance Learning, 2(1).

Siemens, G., Gasevic, D., & Dawson, S. (2015), Preparing for the Digital University (pp. 1-230). Retrieved from http://linkresearchlab.org/PreparingDigitalUniversity.pdf.

Smith Risser, H., & Bottoms, S. (2014). "Newbies" and "Celebrities": Detecting social roles in an online network of teachers via participation patterns. International Journal of Computer-Supported Collaborative Learning, 9(4), 433-450. https://doi.org/10.1007/s11412-014-9197-4.

Stahl, G. (2002). Rediscovering CSCL. In T. Koschmann, R. Hall, & N. Miyake (Eds.), CSCL 2: Carrying forward the conversation (pp. 169-181), Hillsdale, NJ: Lawrence Erlbaum.

Stahl, G. (2005). Group cognition in computer-assisted collaborative learning. Journal of Computer Assisted Learning, 21(2), 79-90. https://doi.org/10.1111/j.1365-2729.2005.00115.x.

Stahl, G. (2013a). Learning across levels. International Journal of Computer-Supported Collaborative Learning, 8(1), 1-12. https://doi.org/10.1007/s11412-013-9169-0.

Stahl, G. (2013b). Theories of collaborative cognition: foundations for CSCL and CSCW together. In S. P. Goggins, I. Jahnke, & V. Wulf (Eds.), Computer-Supported collaborative learning at the workplace (pp. 43-63). Springer US. Retrieved from https://link.springer.com/chapter/10.1007/978-1-4614-1740-8_3.

Stahl, G., Law, N., Cress, U., & Ludvigsen, S. (2014). Analyzing roles of individuals in small-group collaboration processes. International Journal of Computer-Supported Collaborative Learning. 9(4), 365-370. https://doi.org/10.1007/s11412-014-9204-9.

Stasser, G., & Titus, W. (1985). Pooling of unshared information in group decision making: Biased information sampling during discussion. Journal of Personality and Social Psychology, 48(6), 1467-1478. https://doi.org/10.1037/0022-3514.48.6.1467.

Stewart, G. L., Fulmer, I. S., & Barrick, M. R. (2005). An exploration of member roles as a multilevel linking mechanism for individual traits and team outcomes. Personnel Psychology, 58(2), 343-365. https://doi.org/10.1111/j.1744-6570.2005.00480.x.

Steyvers, M., & Griffiths, T. (2007). Probabilistic topic models. In T. K. Landauer, D. S. McNamara, S. Dennis, & W. Kintsch (Eds.), Latent semantic analysis: A road to meaning (pp. 1-15). Hillsdale, NJ: Eribaum.

Strijbos, J.-W., & De Laat, M. F. (2010). Developing the role concept for computer-supported collaborative learning: An explorative synthesis. Computers in Human Behavior, 26(4), 495-505. https://doi.org/10.1016/j.chb.2009.08.014.

Strijbos, J.-W. (2016). Assessment of collaborative learning. In G. T. L. Brown & L. R. Harris (Eds.), Handbook of human and social conditions in assessment (pp. 302-318). New York, NY: Routledge Handbooks Online. Retrieved from https://www-routledgehandbooks-com.proxy.lib.umich.edu/doi/10.4324/9781315749136.ch17.

Suthers, D. (2006). A qualitative analysis of collaborative knowledge construction through shared representations. Research and Practice in Technology Enhanced Learning, 1(2), 315-337. https://doi.org/10.1142/S1793206806000147.

Suthers, D. D. (2006). Technology affordances for intersubjective meaning making: A research agenda for CSCL. International Journal of Computer-Supported Collaborative Learning, 1(3), 315-337. https://doi.org/10.1007/s11412-006-9660-y.

Tausczik, Y. R., & Pennebaker, J. W. (2010). The psychological meaning of words: LIWC and computerized text analysis methods. Journal of Language and Social Psychology, 29(1), 24-54. https://doi.org/10.1177/0261927X09351676.

Tuomela, R., & Tuomela, M. (2005). Cooperation and trust in group context. Mind & Society, 4(1), 49-84. https://doi.org/10.1007/s11299-005-0008-5.

Valle, R. del, & Duffy, T. M. (2007). Online learning: Learner characteristics and their approaches to managing learning. Instructional Science, 37(2), 129-149. https://doi.org/10.1007/s11251-007-9039-0.

Van Boxtel, C. (2004). Studying peer interaction from three perspectives. In J. van der Linden & P. Renshaw (Eds.), Dialogic learning (pp. 125-143). New York, NY: Springer Netherlands. https://doi.org/10.1007/1-4020-1931-9_7.

Van Bruggen, J. M., Kirschner, P. A., & Jochems. W. (2002). External representation of argumentation in CSCL and the management of cognitive load. Learning and Instruction, 12(1), 121-138. https://doi.org/10.1016/S0959-4752(01)00019-6.

Van den Bossche, P., Gijselaers, W. H., Segers, M., & Kirschner, P. A. (2006). Social and cognitive factors driving teamwork in collaborative learning environments team learning beliefs and behaviors. Small Group Research, 37(5), 490-521. https://doi.org/10.1177/1046496406292938.

Van Drie, J., van Boxtel, C., Jaspers, J., & Kanselaar, G. (2005). Effects of representational guidance on domain specific reasoning in CSCL. Computers in Human Behavior, 21(4), 575-602. https://doi.org/10.1016/j.chb.2004.10.024.

Volet, S., Summers, M., & Thurman, J. (2009), High-level co-regulation in collaborative learning: How does it emerge and how is it sustained? Learning and Instruction, 19(2), 128-143. https://doi.org/10.1016/j.learninstruc.2008.03.001.

Volet, S., Vauras, M., Salo, A.-E., & Khosa, D. (2017). Individual contributions in student-led collaborative learning: Insights from

(56) References Cited

OTHER PUBLICATIONS two analytical approaches to explain the quality of group outcome. Learning and Individual Differences, 53, 79-92. https://doi.org/10.1016/j.lindif.2016.11.006.

Von Davier, A., & Halpin, P. (2013). Collaborative problem solving and the assessment of cognitive skills: psychometric considerations (Research Report No. ETS RR-13-41) (pp. 1-42). Educational Testing Service, Retrieved from http://www.ets.org/research/contact.html.

Voogt, J., Erstad, O., Dede, C., & Mishra, P. (2013). Challenges to learning and schooling in the digital networked world of the 21st century. Journal of Computer Assisted Learning, 29(5), 403-413. https://doi.org/10.1111/jcal.12029.

Weinberger, A., & Fischer, F. (2006). A framework to analyze argumentative knowledge construction in computer-supported collaborative learning. Computers & Education, 46(1), 71-95. https://doi.org/10.1016/j.compedu.2005.04.003.

Wen, M., Yang, D., & Rose, C. (2014). Linguistic reflections of student engagement in massive open online courses. In Proceedings 14th International Conference on Web and Social Media (pp. 525-534). Ann Arbor, MI: AAAI. Retrieved from http://meefen.github.io/notes/2014/05/01/Wen2014/.

Winne, P. H. (2013). Metacognition in computer-supported collaborative inquiry. In C. Hmelo-Silver, C.A. Chinn, C. K. K. Chan, & A. O'Donnell (Eds.), The International handbook of collaborative learning (pp. 462-479). New York, NY: Taylor & Francis.

Wise, A. F., Speer, J., Marbouti, F., & Hsiao, Y.-T. (2012). Broadening the notion of participation in online discussions: examining patterns in learners' online listening behaviors. Instructional Science, 41(2), 323-343. https://doi.org/10.1007/s11251-012-9230-9.

Wittenbaum, G. M., & Stasser, G. (1996). Management of information in small groups. In J. L. Nye & A. M. Brower (Eds.), What's social about social cognition?: research on socially shared cognition in small groups (pp. 3-28). Thousand Oaks, Ca.: Sage Publications. Retrieved from http://hdl.handle.net/2027/.

Wittenbaum, G. M., Hollingshead, A. B., & Botero, I. C. (2004). From cooperative to motivated information sharing in groups: moving beyond the hidden profile paradigm. Communication Monographs, 71(3), 286-310. https://doi.org/10.1080/0363452042000299894.

YiLan, L., & RuTong, Z. (2015). clustertend: Check the Clustering Tendency (Version 1.4). Retrieved from https://cran.r-project.org/web/packages/clustertend/inclex.html.

Yoo, J., & Kim, J. (2014). Can online discussion participation predict group project performance? investigating the roles of linguistic features and participation patterns. International Journal of Artificial Intelligence in Education, 1-25. https://doi.org/10.1007/s40593-013-0010-8.

Zumel, N., Mount, J., & Porzak, J. (2014). Practical data science with R (1st edition). Shelter Island, NY: Manning.

\* cited by examiner

Figure 1

COMPUTATIONAL LINGUISTIC ANALYSIS OF LEARNERS' DISCOURSE IN COMPUTER-MEDIATED GROUP LEARNING ENVIRONMENTS

RELATED APPLICATIONS

This application claims the benefit of U.S. Patent Application No. 62/538,413, filed Jul. 28, 2017.

TECHNICAL FIELD

The disclosure herein involves an analysis of collaborative learning environments, under an embodiment.

BACKGROUND

The required scope and depth of literacy skills are rapidly increasing as we shift from an industrial economy toward a more global, knowledge-based, innovation-centered economy and society (Araya & Peters, 2010; Devine, Clayton, Philips, Dunford, & Melner, 1999). This shift has placed a high demand on learners who are faced with more complex technologies, social systems, and information. Communication, collaboration and the social co-construction of knowledge are now considered critical 21st century skills and have taken a principal role in recent theoretical and technological developments in education research (Binkley et al., 2011; Care, Scoular, & Griffin, 2016; Dede, 2009, 2015; Griffin, Care, & McGaw, 2012; OECD, 2013; Rosen & Rimor, 2012).

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows a semi-unstructured log file data that is a typical artifact of CSCL interactions, under an embodiment.

DETAILED DESCRIPTION

Section 1

Figure 2:
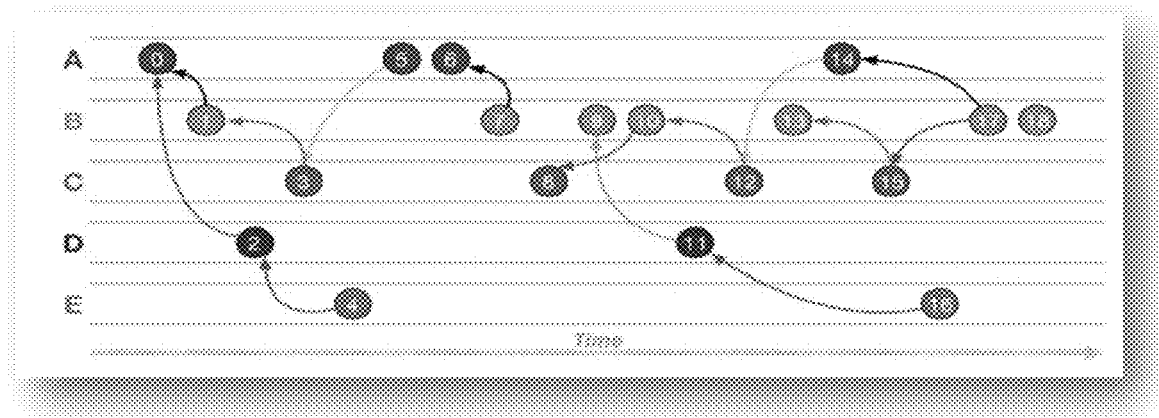
FIG. 2 provides a schematic representation of inferring the semantic relationship among students' contributions in group interactions, under an embodiment. The letters (i.e., A, B, C, D, E) on the vertical axis refer to students within a group interaction, and the numbers represent the sequential order of their discourse contributions.

Communication, collaboration and the social co-construction of knowledge are now considered critical 21st century skills and have taken a principal role in recent theoretical and technological developments in education research. The systems and methods described herein investigate collaborative learning to gain insight on why some groups are more successful than others. In such discussions, group members naturally assume different roles. These roles emerge through participants' interactions without any prior instruction or assignment. Different combinations of these roles can produce characteristically different group outcomes, being either less or more productive towards collective goals. However, there has been little research on how to automatically identify these roles and fuse the quality of the process of collaborative interactions with the learning outcome.

The systems and methods described herein develop a group communication analysis (GCA) framework, a novel methodology that applies automated computational linguistic techniques to the sequential interactions of online group communication. The GCA involves computing six distinct measures of participant discourse interaction and behavioral patterns and then clustering participants based on their profiles across these measures. The GCA was applied to several large collaborative learning datasets, and identified roles that exhibit distinct patterns in behavioral engagement style (i.e., active or passive, leading or following), contribution characteristics (i.e., providing new information or echoing given material), and social orientation. Through bootstrapping and replication analysis, the roles were found to generalize both within and across different collaborative interaction datasets, indicating that these roles are robust constructs. A multilevel analysis shows that the social roles are predictive of success, both for individual team members and for the overall group. Furthermore, the presence of specific roles within a team produce characteristically different outcomes; leading to specific hypotheses as to optimal group composition.

The systems and methods described herein contribute to an understanding of how individuals learn together as a group and thereby advance the learning and discourse sciences. More broadly, GCA provides a framework to explore the intra- and inter-personal patterns indicative of the participants' roles and the sociocognitive processes related to successful collaboration.

The importance of collaborative skills is reflected in the evolution of higher education where, over the past decades, the focus of learning has been evolving from traditional, highly individualistic processes and products to more interactive learning in groups and social networks (Binkley et al., 2011; Dede, 2009; Voogt, Erstad, Dede, & Mishra, 2013). For instance, technology-enriched collaborative environments have become pervasive in both formal and informal educational contexts (Greenhow, Robelia, & Hughes, 2009). This is evident in emerging educational trends towards computer-mediated collaborative learning environments, intelligent tutoring systems (ITSs), and most recently massive open online courses (MOOCs) (Siemens, Gasevic, & Dawson, 2015). These educational technologies, when leveraged appropriately, have the potential to develop the cognitive and social competencies that groups of learners need for successful performance and group interactions (Dede, 2014; Graesser et al., 2016; Jenkins, Clinton, Purushotma, Robison, & Weigel, 2006; Rosen & Mosharraf, 2015; Shaffer, 2006; Shaffer et al., 2009; Voogt et al., 2013).

However, despite the potential success of collaborative interactions, research and practice suggests circumstances where they are not consistently effective (Barron, 2003; Dillenbourg, Baker, Blaye, & O'Malley, 1996; Liu, von Davier, Kyllonen, & Zapata-Rivera, 2015; Sawyer, 2014). For example, there can be large variations in performance between groups that appear to have no difference in composition and assigned tasks (Barron, 2000). It has become quite evident that successful collaboration involves more than simply combining individuals with relevant knowledge together (Kirschner & Erkens, 2013; Stahl, Law, Cress, & Ludvigsen, 2014), because that approach does not guarantee that team members will work together (Hughes, 1998), coordinate their activities (Erkens, Prangsma, & Jaspers, 2006), participate in critical discussions (Weinberger & Fischer, 2006) or lead to positive outcomes (Mäkitalo, Weinberger, Hakkinen, Järvelä, & Fischer, 2005; van Bruggen, Kirschner, & Jochems, 2002; van Drie, van Boxtel, Jaspers, & Kanselaar, 2005). Consequently, a deeper understanding of the factors that make up successful collaboration is needed in order to develop methods for assessing and improving collaborative learning outcomes and processes (Van den Bossche, Gijselaers, Segers, & Kirschner, 2006).

The disclosure set forth herein includes address these issues in two parts. The first is to investigate learners' language, discourse and conversation patterns and the individual roles that learners take on during collaborative learning interactions. Towards this effort, a framework is designed called group communication analysis (GCA) by combining computational linguistic techniques with sequential interaction analyses of group communication. The GCA captures relevant sociocognitive processes that characterize the social roles students occupy in group interactions. Tracking the communication dynamics during learners' ongoing group interactions can reveal important patterns about how individual learners and group processes emerge and unfold over time. The second part is to use the initial findings on language, discourse, and group dynamics to explore how the individual-level roles and overall group compositions influence both student and group performance during collaborative interactions. The systems and methods described herein are at the intersection of collaborative learning, discourse processes, educational data mining, and learning analytics. This interdisciplinary approach provides insights and redefines the nature of collaborative learning research in the context of big data (Dede, 2015). Specifically, the systems and methods described herein analyzes two large, collaborative learning datasets (Traditional CSCL learner N=854, group N=184; SMOC learner N=1,713, group N=3,297), and one collaborative problem solving data set (Land Science learner N=38; group N=630).

This disclosure is organized into 10 main sections. Section 2 presents an overview of group interaction theory and research. An overview of the current research is provided in section 3. Section 4 provides the theoretical motivation for the GCA, including a detailed description of the technical details involved in the construction of the GCA. The methodological details of the systems and methods described herein are presented in section 5. Sections 6 and 7 cover the theoretical background and statistical analyses involved in detecting student roles. In section 8, the disclosure explores how the identified roles are related to both student and group learning. Section 9 explores whether the roles are a product of trait-based characteristics of students or emergent properties of group interactions. Finally, Section 10 provides a broader discussion, including a discussion of the limitations and methodological, theoretical, practical implications of this research.

Section 2: Learning in Groups: Theory and Research

The study of group learning began long before studies of collaborative learning, collaborative problem solving, and computer-supported collaborative learning (CSCL). Research on small group interactions has a long history that has stretched across multiple fields that include contributions from psychology, sociology, education, philosophy, computer science, mathematics, and business management (Dillenbourg, 1999; Hesse, Care, Buder, Sassenberg, & Griffin, 2015; Letsky, 2008; OECD, 2013; Eduardo Salas, Cooke, & Rosen, 2008; Sawyer, 2014). More than three decades of research has dissected the social and discourse interactions in collaborations, following the assumption that knowledge is constructed together in a social context (Sawyer, 2014). Social interaction with learning and performance orientations have been explored, for example, in studies on cooperation (Johnson & Johnson, 2014), team effectiveness (Cooke, Gorman, Myers, & Duran, 2013; Fiore et al., 2010; Foltz & Martin, 2009; Kozlowski, 2015), peer and group learning (O'Donnell, 2006), group cognition (Stahl, 2006), and collaborative learning (Barron, 2003; Dillenbourg & Traum, 2006; F. Hesse et al., 2015; Howley, Mayfield, & Rosé, 2013; Liu et al., 2015; Roschelle & Teasley, 1995; Roséet al., 2008; Sawyer, 2014; Shaffer et al., 2009; Von Davier & Halpin, 2013).

This disclosure focuses on collaborative learning. It is useful to follow Dillenbourg's (1999) distinction between cooperative and collaborative learning when differentiating collaborative learning from earlier explorations of group learning. The frequently cited distinction between these approaches pertains to the division of labor, where the cooperative form of learning interaction is more focused on working together to create an end-product through the division of sub-tasks and responsibilities. Collaboration, in contrast, involves participants sharing in the process of knowledge creation, and thus is characterized by direct interaction among individuals to produce a product and engage through discussions, negotiations, and accommodating others' perspectives (Dillenbourg, Järvelä, & Fischer, 2009; Roschelle & Teasley, 1995).

Collaborative learning is a special form of learning and interaction that affords opportunities for groups of students to combine cognitive resources and synchronously or asynchronously participate in tasks to accomplish shared learning goals (Sawyer, 2014; Slavin, 1995). Within the learning sciences, collaboration has been conceptualized as a "process by which individuals negotiate and share meaning relevant to the task at hand . . . Collaboration is a coordinated activity that is the result of a continued attempt to construct and maintain a shared conception of the problem" (Dillenbourg, 1999, p. 70; Roschelle & Teasley, 1995). Within these perspectives, the ideas of co-construction of knowledge and mutual engagement as well as coordination are highlighted (Dillenbourg et al., 2009; Jeong & Chi, 2006; Kirschner, Beers, Boshuizen, & Gijselaers, 2008; Roschelle, 1992). Collaborative learning groups can range from a pair of learners (called a dyad), to small groups (3-5 learners), to classroom learning (25-35 learners), and more recently large-scale online learning environments with hundreds or even thousands of students (McLaren, 2014, p. 3; Von Davier & Halpin, 2013).

The initial research in the area of collaborative learning focused on whether and when collaborative learning is more effective than learning alone (Dillenbourg et al., 1996; Roschelle & Teasley, 1995). In this context, the researchers typically focused on controlling several external independent variables, such as the size and composition of the group (e.g., gender, age, heterogeneity) and the nature of the task and the communication media used for learning and interaction. However, these factors interacted in ways that made it difficult to establish causal links between the conditions and the effects of group collaboration. This resulted in a shift from focusing on the individual characteristics and external factors to directing research efforts toward understanding the interpersonal interactions that occur, the conditions under which they occur and the influence of these interactions (i.e., from the condition paradigm to the interactions paradigm; see Dillenbourg et al., 1996). The theoretical questions addressed in this disclosure fall under this interactions paradigm. The interactions paradigm has produced a significant number of cross-disciplinary theoretical perspectives and frameworks stemming from the literature in computer-supported collaborative learning (Barron, 2003; Dillenbourg & Traum, 2006; Hesse et al., 2014; Howley, Mayfield, & Rosé, 2013; Liu et al., 2015; Roschelle & Teasley, 1995; Rosé et al., 2008; Shaffer et al., 2009; Stahl et al., 2014; Von Davier & Halpin, 2013), team effectiveness (Cooke et al., 2013; Fiore et al., 2010; Foltz & Martin, 2009; Kozlowski, 2015), and the PISA 2015 Collaborative Problem-Solving (CPS) Framework (Graesser, Forsyth, & Foltz, 2017; OECD, 2013). These frameworks document the individual, cognitive, and social processes and products that influence knowledge construction during group interactions, which provides a basis for the analysis of collaborative learning processes. The social and cognitive processes involved in collaborative learning are manifested in the interactions between group members. That is, these processes can be inferred from the actions performed by the individual, and the communicative interactions with others. The following section reviews the role of language and discourse in the analysis of computer-mediated collaborative learning (CMCL) processes.

Language, Discourse and Communication

Communication is one of the main factors that differentiates collaborative learning from individual learning (Dillenbourg & Traum, 2006; Fiore et al., 2010). Language and discourse can reveal information about both the structure of the group and the information flowing through the group. The structure of the group can indicate such things as individual participant roles, paths of information flow and levels of connectedness within and across groups. Thus, language, discourse, and communication can provide information about individual learner-level processes and overall group-level processes.

The nature of the computer-mediated collaborative interaction platforms allows valuable learning dynamics and processes to be tracked at unprecedented resolution and scale. Specifically, the digital-based platform captures the high degree of learner-learner and learner-system interaction and hence generates a large amount of information usually maintained in the form of events aggregated in log files (Daradoumis, Martinez-Monés, & Xhafa, 2006). These digital traces left by learners are regarded as a goldmine that can offer powerful insights into the learning process. One of the richest sources of information about cognitive and social processes in collaborative groups is their language, discourse, and communication (Foltz, Lavoie, Oberbreckling, & Rosenstein, 2007). Language refers to the words, syntax, and semantics of individual speech acts, whereas discourse addresses connections between speech acts within a turn and between turns. When communication is successful, there is shared knowledge (common ground) between or among students in a group. To help ground the discussion, an excerpt from a collaborative interaction on personality disorders is presented in Table 1. The discussion is annotated to note theoretically interesting characteristics.

In this excerpt, Student A (Line 1) initiates the conversation with a topic centering comment followed by a question. Two turns later (Line 3), Student C provides an acknowledgment and reaction to Student A thereby creating communicative common ground through the discourse connection of the speech acts between the turns. Student B adds to the discussion with an on-topic statement (Line 2) that introduces information about specific attributes and qualifiers of personality disorders. Additionally, the excerpt illustrates the dynamic nature of discourse (Mercer, 2008). Specifically, the dynamic property refers to the fact that conversations are not completely planned ahead of time but rather they emerge (Mercer, 2008). Learners' contributions are contingent on what the other group members contribute, and as such, they do not know in advance what they will contribute (Mercer, 2008). This is illustrated as the interaction continues with statements (Lines 4-11) that emerge from the previous discourse and communication. Here we see Student D's statement (Line 5: also, they have to have like unrealistic fantasies) is building on Student A's previous statement (Line 4: and it also mentioned it can't be because of drug) by providing additional information not previously stated. That is, the previous contribution serves as a context for further discussion on personality disorders.

TABLE 1

Sample Excerpt from a Collaborative Interaction on Personality Disorders

| Student | Line | Chat Contribution |
|---|---|---|
| Student A | 1 | okay so certain characteristics: doesn't it have to be like a stable thing? <Question> |
| Student B | 2 | I think the main thing about having a disorder is that its disruptive socially and/or makes the person a danger to himself or others <Statement> |
| Student C | 3 | Yes <Acknowledgement> stable over time <Reaction> |
| Student A | 4 | Yeah <Acknowledgement>, and it also mentioned it can't be because of drugs <Statement> |
| Student D | 5 | also they have to have like unrealistic fantasies <Statement> |
| Student E | 6 | Yeah <Acknowledgement> and not normal in their culture <Statement> |
| Student B | 7 | no drugs or physical injury <Statement> |
| Student D | 8 | begins in early adulthood or adolescence <Statement> |

TABLE 1-continued

Sample Excerpt from a Collaborative Interaction on Personality Disorders

| Student | Line | Chat Contribution |
|---|---|---|
| Student A | 9 | I think that covers them? Haha <Question> |
| Student D | 10 | ok, so arrogance doesn't just define it, they have to have most of these characteristics <Statement> |
| Student D | 11 | yeah <Acknowledgement> I think we got them <Reaction> |

There have been several analytical approaches to exploring language, discourse and communication in CSCL. Table 2 shows a list of methods applied to evaluate aspects of CSCL. With regard to analytical approaches, scholars typically rely on human coding that use content analysis schemes or surface level communication features. For example, content analysis schemes that researchers frequently use are the interaction analysis model (IAM) (Gunawardena, Lowe, & Anderson, 1997) and multi-dimensional framework (Weinberger & Fischer, 2006). Surface level communication features focus on features such as the level of student participation, the number of logs made by each student, the number of messages belonging to each student, or the number of posts in each thread (for a review, see De Wever, Schellens, Valcke, & Van Keer, 2006; Lucas, Gunawardena, & Moreira, 2014). Table 3 shows an example of one of these popular coding schemes, the IAM proposed by Gunawardena et al. in 1997, which is widely used to evaluate the level of knowledge construction during online discussions.

TABLE 2

Summary of Methods for Examining CSCL Discussions

| Method | Description | Strengths/weaknesses |
|---|---|---|
| Participation measures | Examines who has participated and how frequently. | Participation is necessary for obvious reasons, but the mere posting of messages does not indicate that learning has taken place, nor does it indicate interrelatedness of messages in a dialogue. |
| Content analysis | Examines topics of discussion, often counting frequency of occurrence. | An examination of content is good for determining major concerns of participants and focus (administrative, topical, social, technological). Content analyses can be reductionist in the codes and there is no widely accepted coding scheme. |
| Structural analysis | Examines structure of discussion (who talks to whom, who has power, patterns of message types); includes social network analysis and sequential analysis. | These analyses are useful for noting dynamics amongst participants and types of messages. They are too structural and organized to truly capture content-based nuances, and can a bit reductionist (provides limited information) in terms of coding. |
| Discourse analysis | Interpretive qualitative analyses of the dialogue itself; includes conversation analysis and discourse analysis. | These analyses address the context, complexity and interrelatedness of messages within a multiparty conversation. Requires close, detail-oriented analysis and can be highly interpretive. |
| Discourse processes | Investigates the structures, patterns, mental representations, and processes that underlie written and spoken discourse. | These analyses take a scientific approach to analyzing content (including interjudge reliability) and processes (such as state transition analyses). These analyses are objective and scalable, but can miss important nuances related to the context. |
| Machine learning analysis | Statistical techniques for identifying some aspect of text (parts of speech, syntax, named entities, sentiment, topic | These analyses are objective and scalable, but can miss important details related to the content and context. Some components of language and discourse cannot be automated at this point in the science. |

TABLE 3

Coding Scheme for the Content Analysis of Knowledge Construction, Interaction Analysis Model (IAM)

| Phrase | Description |
| --- | --- |
| Sharing and comparing of information | Presenting new information to team members; a statement of observation or opinion. |
| The discovery and exploration of dissonance or inconsistency among ideas, concepts or statements | Identifying areas of disagreement; asking and answering questions to clarify disagreement. |
| Negotiation of meaning or co-construction of knowledge | Negotiating meanings of terms and negotiation of the relative weight to be used for various agreements. |
| Testing and modification of proposed synthesis or co-construction | Testing the proposed new knowledge against existing cognitive schema, personal experience or other source. |
| Agreement statement/applications of newly-constructed meaning | Summarizing agreements and meta-cognitive statements that show new knowledge construction. |
| Content irrelevant to the learning task | Content that is completely irrelevant to the learning discussion task. |

While there has been extensive knowledge gleaned from manual content analyses, manual methods are no longer a viable option with the increasing scale of educational data (Daradoumis et al., 2006). Attempts have been made to automate the content analysis of collaborative online discussions, namely TagHelper (Donmez, Rosé, Stegmann, Weinberger, & Fischer, 2005), its successor SIDE (Mayfield & Penstein-Rosé, 2010), and the Automatic Classification of Online Discussions with Extracted Attributes framework (ACODEA) (Mu, Stegmann, Mayfield, Rosé, & Fischer, 2012). Nevertheless, there have been some important technical obstacles that still hinder the content analysis from being conducted in a fully automatic way using these methods. Additionally, content analysis based on CSCL coding, including manual and semi-automated approaches, has been criticized for relying on preconceived categories of behavior for the phenomenon of interest rather than seeking to discover those phenomena in their unique situations (Stahl, 2006; Stahl et al., 2014).

Researchers have been incorporating other automated linguistic analysis, ranging from more shallow level word counts, to deeper level computational analyses. Shallow level approaches include dictionary-based methods that provide a simple glimpse of learners' participation levels through the assessment of specific words. One popular tool in the category is Pennebaker's *Linguistic Inquiry and Word Count* (LIWC) (Pennebaker, Booth, & Francis, 2007; Pennebaker, Boyd, Jordan, & Blackburn, 2015). In this approach, words in a language are scaled by human judges on several dozen psychologically meaningful categories, such as cognitive (e.g., cause, think, should, effect) and affective (e.g., happy, worried, hurt, nice) processes (Pennebaker et al., 2015; Pennebaker, Francis, & Booth, 2001; Tausczik & Pennebaker, 2010).

Intermediate level automated text analysis methods go beyond classifying words on various categories and computing percentages of particular categories in a text. Intermediate level methods typically include shallow and intermediate natural language processing techniques, such as the computation of discourse cohesion and syntactic parsing. The automated text analysis tool, Coh-Metrix, would fall in this intermediate level category. Coh-Metrix is a theoretically grounded computational linguistics facility that analyzes texts on multiple levels of language and discourse (Graesser, McNamara, Louwerse, & Cai, 2004; McNamara, Graesser, McCarthy, & Cai, 2014): word abstractness, syntax, cohesion, genre (narrative versus informational), and formality of language (Graesser, McNamara, et al., 2014). Recently, Coh-Metrix has been applied in the context of computer mediated collaborative learning (Cade, Dowell, Graesser, Tausczik, & Pennebaker, 2014; Dowell et al., 2015; Dowell, Cade, Tausczik, Pennebaker, & Graesser, 2014; Dowell, & Graesser, 2015; Joksimović et al., under review, 2015; Yoo & Kim, 2014). A deep level analysis would perform deeper semantic and discourse analyses than systems like Coh-Metrix. Deeper analyses include binding pronouns to referents, semantic analyses that identify propositions and epistemic categories of propositions (e.g., assertion, refutation, hypothesis, opinion), and analysis of rhetorical patterns (argument, claim+evidence, problem+solution). The systems and methods described herein incorporate one or more of these intermediate computational linguistics approaches.

Section 3: Overview of Present Research

The systems and methods described herein analyze (a) how the learners' language, discourse and conversation patterns might predict their individual roles (Captain, Drivers, Lurkers, Over-rider, Free-rider, Ghost, Cooperative members, and Saboteurs) during collaborative learning interactions and (b) how individual student and group performance might be predicted by the analyses in (a). To achieve these two objectives, a group communication analysis (GCA) approach combines intermediate-level computational linguistic techniques with sequential interaction analyses of group communication (described in the following section). The GCA identifies the patterns associated with student roles, under an embodiment. The GCA approach is theoretically guided by the previous psychological models of the discourse comprehension, learning, and CSCL literature (Barron, 2003; Dillenbourg & Traum, 2006; Hesse et al., 2015; Howley, et al., 2013; Liu et al., 2015; Roschelle & Teasley, 1995; Roséet al., 2008; Sawyer, 2014; Shaffer et al., 2009; Von Davier & Halpin, 2013), research on team effectiveness (Cooke et al., 2013; Fiore et al., 2010; Foltz & Martin, 2009; Kozlowski, 2015), and the PISA 2015 Collaborative Problem-Solving (CPS) Framework (Graesser et al., 2017; OECD, 2013).

Machine learning techniques, such as clustering, classification, and generalization methods are leveraged to assess validity of the GCA. Advanced statistical techniques, such as cluster analysis and linear mixed-effects modeling, are used to assess the influence of learner roles on individual student performance and overall group performance. Combining these techniques and applying them to collaborative learning communication data guides creation of predictive models of student roles and other sociocognitive processes (Salas, Goodwin, & Burke, 2008). The concepts, methods, and research ideas are located at the intersection of collaborative learning, discourse processing, educational data mining, and learning analytics.

Research Questions

1. Can individual roles be identified through learners' communication and participation patterns during collaborative interactions in a particular context?

2a. Do the patterns, if any, observed from research question 1 generalize meaningfully to unseen computer-mediated collaborative learning data within the same data set?

2b. Do the patterns, if any, observed from research question 1 generalize meaningfully to other computer-mediated collaborative learning contexts?

3a. How do learners' communication patterns and individual roles influence individual learners' performance?

3b. How do learners' communication patterns and individual roles influence overall group performance?

4. Are learners' social roles an emergent property of collaborative interactions?

Section 4: Group Communication Analysis
Theoretical Motivation for the GCA Measures Social and cognitive processes are the fabric of collaborative learning. The ultimate goal for collaborative learning resides within the co-constructed knowledge that results from sharing information in groups for solving particular tasks (Alavi & Dufner, 2004; Dillenbourg & Fischer, 2007). Learning as a social process is supported by several theoretical perspectives including the social cognitive theory (Bandura, 1994), social-constructivist framework (Doise, 1990), socio-cultural framework (Vygotsky, 1978), group cognition models (Stahl, 2005), shared cognition theory (Lave & Wenger, 1991), and connectivism (Siemens, 2005). Research on the sociocognitive aspects of CSCL have noted some of the important mechanisms (e.g., social presence, explanation, negotiation, monitoring, grounding, and regulating) and processes (e.g., convergence, knowledge co-construction, meaning-making) that facilitate successful collaborative interaction outcomes, such as knowledge co-construction (Dillenbourg et al., 2009).

The Group Communication Analysis framework incorporates definitions and theoretical constructs that are based on research and best practices from several areas where group interaction and collaborative skills have been assessed. These areas include computer-supported cooperative work, team discourse analysis, knowledge sharing, individual problem solving, organizational psychology, and assessment in work contexts (e.g., military teams, corporate leadership). The framework further incorporates information from existing assessments that can inform the investigation of social roles, including the PISA 2015 CPS Assessment. Specifically, the current research draws on aspects of these theoretical frameworks to guide the design and analysis of students' cognitive and social processes that characterize the different roles in collaborative interactions. Despite differences in orientation between the disciplines where these frameworks have originated, the conversational behaviors that have been identified as valuable are quite similar. The following sections review the theoretical perspectives and sociocognitive processes that were the foundation the GCA framework and resulting metrics (i.e., Participation, Internal Cohesion, Social Impact, Newness and Communication Density). In the presentation of the theoretical principles and sociocognitive processes supporting the GCA metrics, empirical findings are presented whenever possible as illustrations and initial support.

Participation. Participation is obviously a minimum requirement for collaborative interaction. It signifies a willingness and readiness of participants to externalize and share information and thoughts (Care et al., 2016; Hesse et al., 2015). Previous research has confirmed that participation, measured as interaction with peers and teachers, has a beneficial influence on perceived and actual learning, retention rates, learner satisfaction, social capital, and reflection (Hew, Cheung, & Ng, 2010; see Hrastinski, 2008 for a review). Within collaborative groups, individual students who withdraw their participation from group discussion or only minimally participate can undermine learning, either because of lost opportunities for collaboration or by provoking whole group disengagement (Van den Bossche et al., 2006). In CSCL research, typical measures of student participation include students' given number of contributions (Lipponen, Rahikainen, Lallimo, & Hakkarainen, 2003), length of posts in online environments (Guzdial & Turns, 2000), or whether contributions are more social (i.e., off-task) rather than around content ideas (Stahl, 2000). More recently, Wise and colleagues (2012) have argued that a more complete conception of participation in online discussions requires attention not only to learners' overt activity in making posts, but also to the less public activity of interacting with the posts of others, which they have coined as "online listening behavior" (Wise, Speer, Marbouti, & Hsiao, 2012). Taken together, this research highlights how individual learners may vary in the amount, type, and quality of participation within a group. Therefore, participation is an important metric to characterize the social roles learners occupy during interactions. In the current research, participation is conceptualized as a necessary, but not sufficient, sociocognitive metric for characterizing learners' social roles.

Internal cohesion, responsiveness, & social impact. Simply placing students in groups does not guarantee collaboration or learning (Kreijns, Kirschner, & Jochems, 2003). For collaboration to be effective, learners must participate in shared knowledge construction, have the ability to coordinate different perspectives, commit to joint goals, and evaluate together their collective activities (Akkerman et al., 2007; Beers, Boshuizen, Kirschner, & Gijselaers, 2007; Blumenfeld, Kempler, & Krajcik, 2006; Fiore & Schooler, 2004; F. Kirschner, Paas, & Kirschner, 2009; Roschelle & Teasley, 1995). This raises an important question that has been reoccurring theme in the CSCL literature: What makes collaborative discourse productive for learning? (Stahl & Rosé, 2013). Table 4 provides a description of the characteristics of discourse, with their associated names in the literature, that are assumed to be beneficial for collaborative interactions and learning.

TABLE 4

Alignment of GCA Dimensions with Theoretical and Empirical Support

| GCA Dimensions | Psychological & Discursive Processes | Description/Example Behavioral Makers | Relevant Theoretical Frameworks & Constructs | Empirical Evidence/ Theoretical Support |
|---|---|---|---|---|
| Participation | Engagement | General level of participation of student, irrespective of whether this action is in any way coordinated with the efforts of other group members | Activity theory; Social presence; Socio-constructivist | Hesse et al., 2015; Hrastinski, 2008; Hew, Cheung, & Ng, 2010; Kumpulainen & Mutanen, 1999 |
| Internal Cohesion | Monitoring and reflecting | Reflecting on the learning process to keep track of the conceptual understanding | Common ground, self-regulation and metacognitive processes; Joint attention | Chan, 2012; Zimmerman, 2001; Barron, 2000; OECD, 2013; |
| Responsivity | Uptake and Transactivity | The act of a participant taking traces of prior or ongoing action forward into an ongoing process of meaning-making | Meaning-making; co-regulation; Co-construction; Social coordination; Knowledge building; Common Ground; Knowledge convergence | Berkowitz & Gibbs, 1983; Teasley, 1997; Hesse et al., 2014; Suthers, 2006; Volet et al. 2009 |
| Social Impact | Productive or popular communication | When a participant's contributions are perceived as important enough to warrant further discussion by other group members and thus be incorporated into the groups discourse | Social coordination; Knowledge building; Common Ground; co-construction; | Volet et al. 2009; Hesse et al., 2014; Suthers, 2006 |
| Newness | Type of information shared | Providing new unshared information or echoing previously stated information | Monitoring; Information sharing | Chi, 2009; Hesse et al., 2014; Mesmer-Magnus & Dechurch, 2009 |
| Communication Density | Concise communication | The extent to which participants convey information in a concise manner | Common ground; Effective communication | Gorman et al. 2003; 2004 |

Collaborative knowledge construction is understood as an unequivocally interpersonal and contextual phenomenon, but the role of an individual interacting with themselves should also be taken into account (Stahl, 2002). Successful collaboration requires that each individual monitor and reflect on their own knowledge and contributions to the group (Barron, 2000; OECD, 2013). This points to the importance of self-regulation in collaborative interactions (Chan, 2012; Zimmerman, 2001). Self-regulation is described as an active, constructive process in which students set goals, and monitor and evaluate their cognition, affects, and behavior (Azevedo, Winters, & Moos, 2004; Pintrich, 2000; Winne, 2013). During collaborative interactions, this is necessary for students to appropriately build on and integrate their own views with those of the group (Kreijns et al., 2003; OECD, 2013). The process of students engaging in self-monitoring and reflection may be reflected in their internal cohesion. That is, a student's current and previous contributions should be, to some extent, semantically related to each other, which might indicate integration and evolution in their thoughts through monitoring and reflecting (i.e., self-regulation). However, very high levels of internal cohesion might also suggest students are not building on and evolving their thoughts, but instead are reciting the same static view.

Students must also monitor and build on the perspectives of their collaborative partners to achieve and maintain a shared understanding of the task and its solutions (Dillenbourg & Traum, 2006; Graesser et al., in press; Hmelo-Silver & Barrows, 2008; OECD, 2013; Stahl & Rosé, 2013). In the CSCL literature this shared understanding has been referred to as knowledge convergence, or common ground (Clark, 1996; Clark & Brennan, 1991; Fiore & Schooler, 2004; Roschelle, 1992). It is achieved through communication and interaction, such as building a shared representation of the meaning of the goal, coordinating efforts, understanding the abilities and viewpoints of group members, and mutual monitoring of progress towards the solution. These activities are supported in several collaborative learning perspectives (e.g., cognitive elaboration, Chi, 2009; socio-cognitive conflict, Doise, 1990; Piaget, 1993; co-construction, Hatano, 1993; Van Boxtel, 2004) that stress different mechanisms that facilitate learning during group interactions (giving, receiving and using explanations, resolving conflicts, co-construction). However, all these perspectives are in alignment on the idea that students' elaborations on one another's contributions support learning.

This social level of awareness, monitoring, and regulatory processes fall under the umbrella of co-regulation. Volet, Summers, and Thurman (2009) proposed co-regulation as an extension of self-regulation to the group or collaborative context, wherein co-regulation is described as individuals working together as multiple self-regulating agents socially monitoring and regulating each other's learning. In a classroom study of collaborative learning using hypermedia, Azevedo et al. (2004) demonstrated that collaborative outcomes were related to the use of regulatory behaviors. In this process, the action of one student does not become a part of the group's common activity until other collaborative partners react to it. If other group members do not react to a student's contribution, this suggests the contribution was not seen as valuable by the other group members and would be an 'ignored co-regulation attempt' (Molenaar, Chiu, Sleegers, & Boxtel, 2011). Therefore, the concepts of transactivity and uptake (Table 4) in the CSCL literature are important in this context of co-regulation and active learning, in the sense that a student takes up another student's contribution and continues it (Berkowitz & Gibbs, 1983; D. Suthers, 2006; Teasley, 1997). Students can engage in higher or lower degrees of co-regulation through monitoring and coordinating. These processes will be represented in their discourse.

Monitoring and regulatory processes are hopefully externalized during communication with other group members. We can capture the degree to which as student is monitoring and incorporating the information provided by their peers by examining the semantic relatedness between a student's contribution and the previous contributions of their collabrative partners. This measure is called responsivness in the current research. For example, if a student's contributions are, on average, only minimally related to those of their peers, than we would say this student has low responsivity. Similarly, we can capture the extent to which a student's contributions are seen as meaningful by the other members or worthy of further discussion (i.e. uptake) by measuring the semantic relatedness between a student's contribution and the contributions that follow from their collaborative partners. This measure is called social impact in the current research. Students have high social impact to the extent that their contributions are often semantically related to the subsequent contributions from the other collabrative group members.

In the collaborative learning literature, the results highlight the value of students clearly articulating arguments and ideas, elaborating this content, and making connections between contributions. For instance, Rosé and colleagues' work has concentrated explicitly on properties like transactivity (Gweon, Jain, McDonough, Raj, & Rosé, 2013; Joshi & Rosé, 2007; Roséet al., 2008), as well as the social aspects and conversation characteristics that facilitate the recognition of transactivity (Howley et al., 2011; Howley, Mayfield, & Rosé, 2013; Howley, Mayfield, Rosé, & Strijbos, 2013; Wen, Yang, & Rose, 2014). Their research adopts a sociocognitive view (Howley, Mayfield, Rosé, et al., 2013) that emphasizes the significance of publically articulating ideas and encouraging students to listen carefully to and build on one another's ideas. Students engaging in this type of activity have the chance to notice discrepancies between their own mental model and those of other members of the group. The discussion provides opportunities to engage in productive cognitive conflict and knowledge construction (Howley, Mayfield, Rosé, et al., 2013). Additionally, students benefit socially and personally from the opportunity to take ownership over ideas and position themselves as valuable sources of knowledge within the collaborative group (Howley & Mayfield, 2011).

Newness and communication density. For collaboration to be successful, learners must also engage in effective communication. One aspect of effective communication concerns information sharing within a group. A primary advantage of collaborative interactions and teams is that they provide the opportunity to expand the pool of available information, thereby enabling groups to reach higher quality solutions than could be reached by any one individual (Hesse et al., 2015; Mesmer-Magnus & Dechurch, 2009). However, despite the intuitive importance of effective information sharing, a consistent finding from this research is that groups predominantly discuss information that is shared (known to all participants) at the expense of information that is unshared (known to a single member) (Stasser & Titus, 1985; see Wittenbaum & Stasser, 1996 for a review). This finding has been called bias information sharing or bias information pooling in the Collective Information-Sharing Paradigm. It shares some similarities with the groupthink phenomena (Janis, 1983), which is the tendency for groups to drive for consensus that overrides critical appraisal of decision alternatives. The collective preference for redundant information can detrimentally affect the quality of the group interactions (Hesse et al., 2015) and decisions made within the group (Wittenbaum, Hollingshead, & Botero, 2004). However, collaborative interactions benefit when the members engage in the constructive discourse of inferring and sharing new information and integrating new information with existing prior knowledge during the interaction (Chi, 2009; Chi & Menekse, 2015).

The distinction between given (old) information versus new information in discourse is a foundational distinction in theories of discourse processing (Haviland & Clark, 1974; Prince, 1981). Given information includes words, concepts, and ideas that have already been mentioned in the discourse, in this case a collaborative conversation; new information builds on the given information or launches a new thread of ideas. In the current research, the extent to which learners provide new information, compared to previously shared information, will be captured with a measure called newness.

In addition to information sharing, the team performance literature also advocates for concise communication between group members (Gorman, Cooke, & Kiekel, 2004; Gorman, Foltz, Kiekel, Martin, & Cooke, 2003). In particular, the research suggests that for team communication to be optimally effective, information should be conveyed in a concise manner (Salas, Rosen, Burke, Nicholson, & Howse, 2007). This is one of the reasons more formal teams, like military units, typically adopt conventionalized terminology and standardized patterns of communication (Salas et al., 2007). It is suggested that this concise communication is possible when there is more common ground within the team and the presence of shared mental models of the task and team interaction (Klein, Feltovich, Bradshaw, & Woods, 2005). The communication density measure used in the current research, was first introduced by Gorman et al. (2003) in team communication analysis to measure the extent to which a team conveys information in a concise manner. Specifically, the rate of meaningful discourse is defined by the ratio of meaningfulness to number of words spoken. Using this measure, we will be able to further characterize the social roles that learners take on during collaborative interactions.

Taken together, we see that the sociocognitive processes involved in collaboration are internal to the individual but they are also manifested in the interactions with others in the group (Stahl, 2010). In particular, during group interactions, learners need to self-regulate their own learning and contributions, and co-regulate the learning of others in the group. Reciprocally, the discourse of group members influences learners' own monitoring and cognition (Chan, 2012; Jarvela, Hurme, & Jarvela, 2011). The social roles explored in this research are not necessarily reducible to processes of individual minds nor do they imply the existence of some sort of group mind. Rather, they are characterized by and emerge from the sequential interaction and weaving of semantic relations within a group discourse. The output of communication during collaborative interactions provides a window into the cognitive and social processes related to learners' social roles. Thus, communication among the group members can be assessed to provide measures of participation, social impact, internal cohesion, responsiveness, newness, and communication density. The GCA framework will allow us to see how collaborative partners contribute to the dialogue and quality of the interaction in different ways, exhibiting more, or less internal cohesion, responsiveness, social impact, new information, and communication density. The roles that students take on will be revealed through different combinations and distinct patterns in behavioral engagement style and contribution characteristics.

Figure 1:
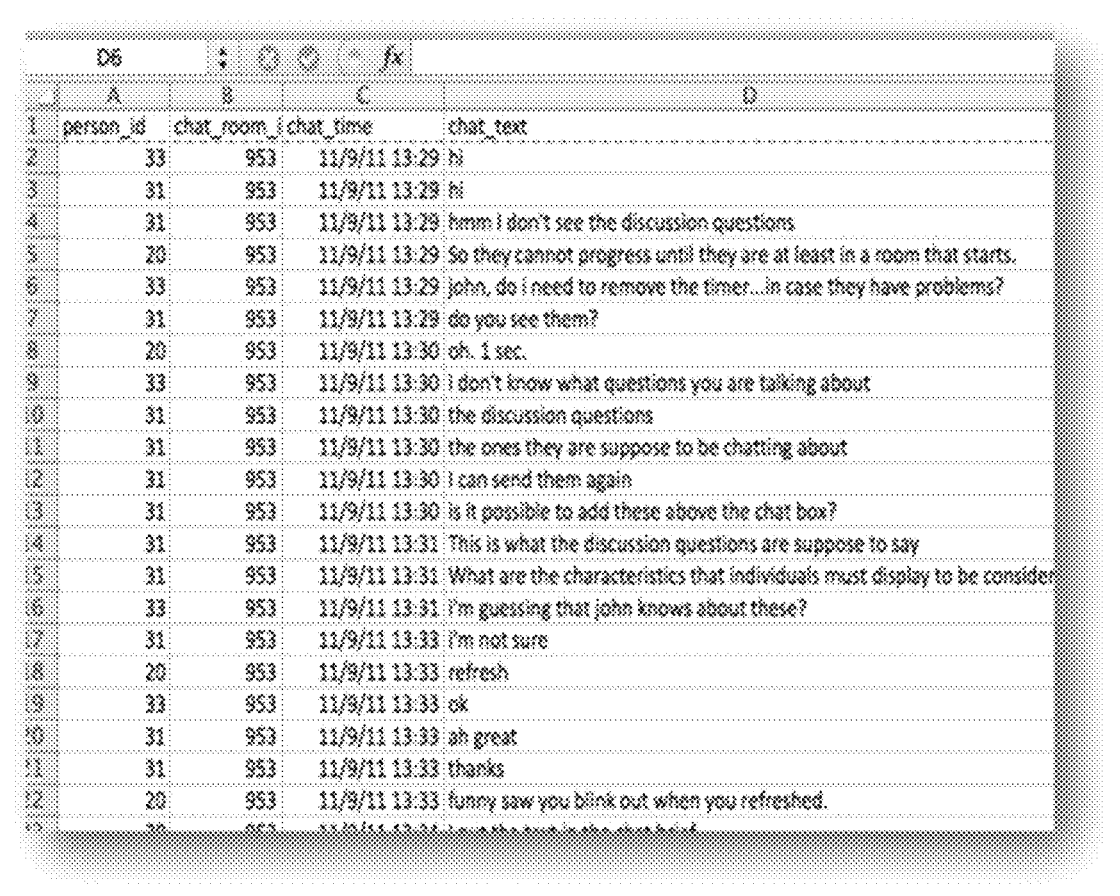

Construction of Group Communication Analysis (GCA) and Group Performance Measure The discourse and communication analyses included in this disclosure focus on capturing the intrapersonal and interpersonal collaborative interaction dynamics over time. To perform automated communication analyses, it is necessary to first distinguish the types of communication data that can be analyzed (Foltz & Martin, 2009). First, participation data describe the pattern of interactions among group members. This type of data includes who is talking, when they are talking, and how much. Second, the content focuses on what was actually contributed, including the content of the whole group discourse, individual student contributions, and the semantic relationships among the contributions between students. This involves taking semi-unstructured log file data, as depicted in FIG. 1, and transforming it into a more meaningful representation by inferring the semantic relationship among student's contributions in group interactions, as depicted in FIG. 2. Through this process, we can quantify the sociocognitive processes taking place throughout an interaction. More specifically, the analytical process for the GCA comprises two main steps: (1) identifying measures of participation dynamics and (2) cohesion-based discourse analysis using an approach similar to lag sequential analysis. In addition to the GCA measures, the identification of covered topics is of particular interest for the current analyses because it affords assessment of the overall group performance that is independent of the individual student performance (i.e., pre- and post-test scores). This section describes the technical details involved in the construction of both the GCA measure and the group performance measure (i.e., Topic Relevance).

Participation measures. The chat logs of a group discussion can be thought of as a sequence of individual contributions (i.e., verbal expressions within a conversational turn). In this sense, the boundaries of a contribution are defined by the nature of the technology that mediates the group discussion. A single contribution is a single message transmitted from a single user to other users by way of a messaging service, or a single posting by a single user to a discussion forum. There may be multiple speech acts within a single contribution, but these will be treated as a single contribution. Further, a single user may transmit further contributions immediately subsequent to their first, but these will be treated as separate contributions. So, the primary unit of analysis is a single contribution from a single user.

Let C represent the sequence of contributions, with $c_t$ representing the $t^{th}$ contribution in the sequence. Let $|C|=n$ denote the length of the sequence. Since contributions represent turns in the discussion over time, the variable t will be used to index individual contributions and will also be referred to as "time". The values of t will range from 1 to n:

$$t \in \mathbb{Z}; \ 1 \leq t \leq n \quad (1)$$

Let P be the set of participants in the discussion, of size $k=|P|$. Variables a and b in the following will be used to refer to arbitrary members (participants) in this set. In order to identify the contributor (or participant) that originated each statement, we define the following participation function, as depicted in Equation 2:

$$p_t(a) = \begin{cases} 1, & \text{if contribution } c_t \text{ was made by participant } a \in P \\ 0, & \text{otherwise} \end{cases} \quad (2)$$

Using this participation function, it is relatively simple to define several useful descriptive measures of participation in the discussion. The number of contributions made by any participant is:

$$\|P_a\| = \Sigma_{t=1}^n p_t(a) \quad (3)$$

The sample mean participation of any participant is the relative proportion of their contributions out of the total:

$$\overline{p_a} = \frac{1}{n}\|P_a\| \quad (4)$$

and the sample variance in that participation is:

$$\sigma_a^2 = \frac{1}{n-1}\sum_{t=1}^n (p_t(a) - \overline{p_a})^2 \quad (5)$$

The participation function for any participant, a, effectively defines a sequence, $P_a$:

$$P_a = \{p_1(a), p_2(a), p_3(a), \ldots, p_n(a)\} \quad (6)$$

of the same length, n, as the sequence of contributions C, which has the value 1 whenever participant a originated the corresponding contribution in C, and 0 everywhere else. By the definition of contributions given above, each contribution $c_t$ was originated by one and only one participant, so the participation function, $P_t$, will take on a value of 1 for exactly 1 participant at each time t, and be 0 for all other participants. One can see that the product of participation for different participants at the same time must always be 0:

$$p_t(a) \cdot p_t(b) = 0; \ a \neq b \quad (7)$$

We can, equivalently, represent the sequences of all participants as a k×n matrix, M, by stacking the k participation sequences as rows, in any arbitrary ordering (such that i is an index on participants). Under this representation, the $(i,j)^{th}$ entry of the matrix is:

$$M_{ij} = p_j(a_i); \ a_i \in P \quad (8)$$

It follows that the sum of each column would be exactly 1. Consequently, there is never any co-occurrence of contributions at any instance of time. Since each participation sequence is, in effect, a time series of participant contributions, our goal to characterize the interactions between participants is a problem of characterizing their corresponding participation time series. The field of time series analysis gives us tools that we can either use directly or adapt to our needs. Specifically, we can make use of the cross-correlation between any two participants a and b:

$$\rho_\tau(a, b) = \frac{1}{(n-1)\sigma_a \cdot \sigma_b} \sum_{t=\tau+1}^{n} p_t(a) \cdot p_{t-\tau}(b) - n \cdot \overline{p_a} \cdot \overline{p_b} \quad (9)$$

where the parameter τ, defined in 10:

$$\tau \in \mathbb{Z} ; \tau \geq 0 \quad (10)$$

is some fixed interval of time (or "lag") between the initial contribution of b and then some subsequent contribution of a. A lag-1 cross-correlation between two participants will give a measure of how frequently one participant contributes directly after the other participant. A lag-2 cross-correlation will give a measure of the responsiveness of the one participant after a single intervening contribution. It is, of course, possible and even likely that any two participants may have some contributions separated by any particular lag τ, simply by chance. The cross-correlation function considers the correlations for all such lagged contributions and yields statistically significant values when such a pattern is consistent across the entire discussion. By plotting the values of a cross correlation at different values of τ (typically from 1 up to some reasonably large value), one can identify if there is any statistically significant time-dependent relationship between the variables being examined. Such cross-correlation plots are a common step in the qualitative exploration of time series data. By looking at these functions for all pairs of users, one can examine the overall responsiveness patterns for the entire group.

Conversations, including collaborative discussions, commonly follow a statement-response structure, in which new statements can be in response to previous statements, and also trigger subsequent statements in response. The structure of different online communications and discussion systems provide different affordances to the analyst to attribute a specific contribution as a response to some prior contribution. Regardless of the structure of the system, participants may, in a single contribution, refer to concepts and content presented in multiple previous contributions, made throughout the conversation either by themselves or other group members. Thus, a single contribution may be in response to, varying degrees, to many previous contributions, and it may in turn trigger, to varying degrees, multiple subsequent responses.

A fine-grained measure of the similarity of participants' contributions is needed to capture these multi-responsive and social impact dynamics that may be present in collaborative interactions. There are different techniques for calculating the semantic similarity between two contributions. Two popular methods are content word overlap and Latent Semantic Analysis (LSA). Both content word overlap and LSA have strengths and weaknesses that are outlined in previous publications (Hu, Cai, Wiemer-Hastings, Graesser, & McNamara, 2007), however, these methods typically produce comparable results. The systems and methods set forth herein measure similarity using Latent Semantic Analysis (LSA).

Latent semantic analysis. LSA represents the semantic and conceptual meanings of individual words, utterances, texts, and larger stretches of discourse based on the statistical regularities between words in a large corpus of natural language (Landauer, McNamara, Dennis, & Kintsch, 2007). The first step in LSA is to create a word-by-document co-occurrence matrix, in which each row represents a unique word and each column represents a "document" (in practice this typically means a sentence, paragraph, or section of an actual document). The values of the matrix represent counts of how many occurrences there were of each word in each document. For example, if the word "dog" appears once each in documents 1 and 9 and twice in document 50, and is considered the first word in the dataset, then the value of 1 will be in cells (1,1) and (1,9), and the value of 2 in cell (1,50). The occurrence matrix will then be weighted. Each row is weighted by a value indicating how important a word is. A row corresponding to a word that appears almost equally in all documents gets a very small weight, while a row corresponding to a word that appears only in a few documents gets a high weight. Cells on each column are again weighted based on the number of times a word appears in the corresponding document. Words with higher frequency in the given document get a higher weight. The most widely used weighting methods are TFIDF and Log-Entropy. A principal components analysis (PCA) is then performed on the weighted matrix by means of singular-value decomposition (SVD) matrix factorization. PCA is a procedure that allows one to reduce the dimensionality of a set of data such that it minimizes distortions in the relationships of the data. In the context of LSA, PCA allows us to reduce the word-by-document matrix to approximately 100-500 functional dimensions, which represent in compact form the most meaningful semantic relationships between words. The SVD procedure also yields a matrix which can be used to map the words from the original text corpus into vectors in a semantic space described by these semantic dimensions (i.e., LSA space).

When building an appropriate LSA space, it is necessary to have a corpus that broadly covers the topics under investigation. The Touchstone Applied Science Associates (TASA) corpus is a good example of a comprehensive set of tens of thousands of texts across numerous subject areas and spanning a range of levels of complexity (grade levels), which is suitable for building a general semantic space. In some instances, however, researchers desire a more custom corpus covering a specific domain, which is the case in the current research. The source corpora used by the systems and methods described herein are conversational transcripts of collaborative interactions, which are not large enough to construct an LSA space. Furthermore, these transcripts refer to ideas and concepts that are not explicitly described in the transcripts. To obtain an appropriate representation of the semantic space we need to include external material that covers the topics of the conversations. One way to handle this problem is to enrich the source corpus with additional material that can provide appropriate background knowledge for key terms represented in the conversational transcripts (Cai, Li, Hu, & Graesser, 2016; Hu, Zhang, Lu, Park, & Zhou, 2009). The process begins with collecting a "seed" corpus of representative material (Cai, Burkett, Morgan, & Shaffer, 2011). In the current research, this included the chat transcripts for each data set, and the associated assigned reading material for students. This was done separately for each of the three datasets (described in the Methods section) to produce a custom domain specific seed corpus. This seed corpus is then scanned for key terms, which are used to scan the internet for documents (i.e., Wikipedia articles) on the topics mentioned in the seed corpus. The identified documents are used to create the expanded LSA space that is more comprehensive than the underlying transcripts on their own. The details of the extended LSA spaces for each of the corpora used in this research are presented in the Methods section.

By translating text into numerical vectors, a researcher can then perform a number of mathematical operations to analyze and quantify the characteristics of the text. One key operation is to compute the semantic similarity between any two segments of text. In the context of interactive chat, the similarity contributions $c_i$ and $c_j$, can be computed by first projecting them into the LSA space, yielding corresponding document vectors $\vec{d}_i$ and $\vec{d}_j$. The projection is done by matching each word or term that occurs in the contribution, and locating the normalized term-vector for that word (calculated by the SVD process). These vectors are added together to get a vector corresponding to the entire contribution. If any term does not occur in the LSA space, it is ignored, and so does not contribute to the resulting vector. However, the construction of the space is such that this is very rare. Then, the cosine similarity of textual coherence (Dong, 2005), is computed on the document vectors $\vec{d}_i$ and $\vec{d}_j$, as described in equation 11. The cosine similarity ranges from approximately 0 to 1, with identical contributions having a similarity score of 1 and completely non-overlapping contributions (no shared meaning) having a score of 0 or below.

$$\cos(\vec{d}_i, \vec{d}_j) = \frac{\vec{d}_i \cdot \vec{d}_j}{\|\vec{d}_i\| \cdot \|\vec{d}_j\|} \quad (11)$$

The primary assumption of LSA is that there is some underlying or "latent" structure in the pattern of word usage across contexts (e.g., turns, paragraphs or sentences within texts), and that the SVD of the word-by-document frequencies will approximate this latent structure. The method produces a high-dimensional semantic space into which we can project participant contributions and measure the semantic similarity between them.

Using this LSA representation, students' contributions during collaborative interactions may be compared against each other in order to determine their semantic relatedness, and additionally, assessed for magnitude or salience within the high-dimensional space (Gorman et al., 2003). When used to model discourse cohesion, LSA tracks the overlap and transitions of meaning as they are used to compute semantic similarity of adjacent text segments throughout the discourse.

Using this semantic relatedness approach, the conceptual similarity score of any pair of contributions can be calculated as the cosine of the LSA document-vectors corresponding to each contribution. This works well as a measure of similarity between pairs of contributions. However, it must be aligned with the participation function in order to get a measure of the relationship between those participants in the discussion. As has been demonstrated above, the participation function can be used to select pairs of contributions related to a specific participant-participant interaction, and will screen out all other pairs of interactions. We therefore define a semantic similarity function:

$$s_{ij}(a,b) = p_i(a) \cdot p_j(b) \cdot \cos(\vec{d}_i, \vec{d}_j) \quad (12)$$

This will be the semantic similarity for contributions $c_i$ and $c_j$ only when contribution $c_i$ was made by participant a, and $c_j$ was made by participant b; otherwise it is zero (because in this case either $p_i(a)$ or $p_j(b)$, or both, would be 0). This product will form the foundation of several novel measures to characterize different aspects of participant involvement in the group discussion: the general participation, responsivity, internal cohesion, and social impact. These measures, described below, will be aligned with Strijbos and De Laat (2010) conceptual framework to identify student roles.

Participant to participant responsivity. This measure is similar in construction to the cross-correlation of the participation functions that was described earlier. This measure captures how responsive one participant's contributions are to another's over the course the collaborative interactions. Participant to participant responsivity is defined by averaging the semantic similarity of the contributions of the one participant to the others when they are lagged by some fixed amount, $\tau$, across all contributions:

$$r_\tau(a,b) = \begin{cases} 0, & \|p_\tau(a,b)\| = 0 \\ \frac{1}{\|p_\tau(a,b)\|} \sum_{t=\tau+1}^{n} s_{t,t-\tau}(a,b), & \|p_\tau(a,b)\| \neq 0 \end{cases} \quad (13)$$

It is normalized by the total number of $\tau$-lagged contributions between the two participants, as expressed in equation 14.

$$\|p_\tau(a,b)\| = \Sigma_{t=\tau+1}^{n} p_t(a) \cdot p_{t-\tau}(b) \quad (14)$$

We refer to $r_\tau(a, b)$ as the "responsivity of a to b at $\tau$" or as the "$\tau$-lagged responsivity of a to b". The responsivity function measures the average semantic similarity of all $\tau$-lagged contributions between two participants. As such, it gives an insight into the degree to which one user may be responding to the comments of another.

Responsivity is defined in a 3-dimensional space between pairs of participants and time. One dimension corresponds to the first participant (the respondent), whose contribution possibly responds to some part of a prior participant's contribution. Another dimension involves the second participant (the initiator), whose prior contribution potentially triggered the respondent's response. The last dimension is the time interval between the trigger and response, as measured by the number of intervening contributions.

For a conversation with $k = |P|$ participants, and given some arbitrary ordering of participants in P, we can see responsivity as a $k \times k$ matrix $R_\tau$, such that the element in row i, column j is given by the responsivity function $r_\tau(i, j)$. We refer to this matrix as "$\tau$-lagged responsivity", or "responsivity at $\tau$". The rows of the matrix represent the responding students, who we refer to as the respondents. The columns of the matrix represent the initiating students, referred to as the initiators. The responsivity at 1, or "immediate responsivity", represents the propensity for respondents to respond to the content of the initiator's immediately previous contribution. The propensity for respondents to comment on an initiator's contribution after 1 intervening contribution is characterized by the 2-lagged responsivity matrix, and so on.

Responsivity at a single time-interval may not be very insightful on its own, as it represents a very narrow slice of interaction. By averaging over a wider window of contributions, we can get a broader sense of the interaction dynamics between the participants. We define responsivity across a time window as follows:

$$\bar{R}_w = \frac{1}{w} \sum_{\tau=1}^{w} R_\tau \quad (15)$$

This will be referred to this as "w-spanning responsivity" or "responsivity across w". An individual entry in the matrix, $\bar{r}_w(a, b)$ is the "w-spanning responsivity of student a to b" or the "responsivity of student a to b across w". These measures form a moving-average of responsivity across the entire dialogue. The window for the average consists of a trailing subset of contributions, starting with the most current and looking backwards over a maximum of w prior contributions. Characteristics of an individual participant can be obtained by averaging over their corresponding rows or columns of the w-spanning responsivity matrix, and by taking their corresponding entry in the diagonal of the matrix.

Internal cohesion. Internal cohesion is the measure of how semantically similar a participant's contributions are with their own previous contributions during the interaction. The participant's "w-spanning internal cohesion" is characterized by the corresponding diagonal entry in the w-spanning responsivity matrix:

$$\bar{r}_w(a,a) \tag{16}$$

Overall responsivity. Each row in the w-spanning responsivity matrix is a vector representing how the corresponding participant has responded to all others. In order to characterize how responsive a participant is to all other group members' contributions during the collaborative interactions, we take the mean of these row vectors (excluding the participant of interest):

$$\bar{r}_w(a) = \frac{1}{k-1} \sum_{i=1; i \neq a}^{k} \bar{r}_w(a, i) \tag{17}$$

This is referred to as the "w-spanning responsivity of a", or just the "overall responsivity of a" for short.

Social impact. Each column in the w-spanning responsivity matrix is a vector representing how contributions initiated by the corresponding participant have triggered follow-up responses. In a similar fashion to the overall responsivity described above, a measure of each individual participant's social impact can be calculated by averaging over these column-vectors (excluding the participant of interest):

$$\bar{\iota}_w(a) = \frac{1}{k-1} \sum_{j=1; j \neq a}^{k} \bar{r}_w(j, a) \tag{18}$$

This is referred to as the "w-spanning impact of a", or just the "social impact of a" for short.

LSA Given-New. Participants' contributions can vary in how much new versus given information they contain (Hempelman et al., 2005; McCarthy et al., 2012). Note, for the purposes of the current research, we were more interested in a measure of the amount of new information provided by participants. This is motivated by the fact the responsivity measures capture the social equivalent of "givenness", which is more relevant in the contexts of group interactions. Establishing how much new information is provided in any given contribution can be meaningful to the dynamics of the conversation, as well as to characterize the ways in which different participants contribute. Following the method of Hu et al., 2003, the given information at the time of contribution t is a subspace of the LSA spanned by the document vectors of all previous contributions:

$$G_t = \text{span}\{\vec{d}_1, \vec{d}_2, \ldots, \vec{d}_{t-}\} \tag{19}$$

The semantic content of the current contribution can then be divided into the portion already given by projecting the LSA document vector for the current contribution onto the subspace defined in equation 20.

$$\vec{g}_t = \text{Proj}_{G_t}(\vec{d}_t) \tag{20}$$

There is also the portion of semantic content that is new to the discourse by projecting the same document vector onto the orthogonal complement of the given subspace, as defined in 21.

$$\vec{n}_t = \text{Proj}_{G_t^\perp}(\vec{d}_t) \tag{21}$$

This is the portion perpendicular to the given subspace. Of course, the semantic content of the contribution is completely partitioned by these projections, so:

$$\vec{d}_t = \vec{g}_t + \vec{n}_t \tag{22}$$

In order to get a useful measure of the total amount of new semantic content provided in any given contribution, we take the relative proportion of the size of the given vector to the total content provided:

$$n(c_t) = \frac{\|\vec{n}_t\|}{\|\vec{n}_t\| + \|\vec{g}_t\|} \tag{23}$$

This given-new value ranges between 0 (all given content, nothing new) to 1 (all new content).

Newness. We can characterize the relative new content provided by each individual participant by averaging over the given-new score of their contributions:

$$N(a) = \frac{1}{\|P_a\|} \sum_{t=1}^{n} p_t(a) \cdot n(c_t) \tag{24}$$

Communication Density. Another meaningful measure involves calculating the average amount of semantically meaningful information provided in a contribution. This measure was first established by Gorman et al. (2003) in their work examining team communication in a synthetic military aviation task. This measure differs from the Given-New measure in that it is entirely calculated from the contribution $c_i$ and its corresponding LSA vector, $\vec{d}_i$, and does not consider any prior contributions. The communication density is defined in 25.

$$D_i = \frac{\|d_i\|}{\|c_i\|} \tag{25}$$

$\|d_i\|$ is the norm of the LSA vector and $\|c_i\|$ is the length of the contribution in words. Thus, communication density gives the per-word amount of semantic meaning for any contribution. In order to characterize the communication density of a particular participant, we must calculate the average density over all of their contributions:

$$D(a) = \frac{\sum_{t=1}^{n} p_t(a) \cdot \|d_t\|}{\sum_{t=1}^{n} p_t(a) \cdot \|c_t\|} \quad (26)$$

Topic Modeling

The cohesion-based discourse measures described above capture important intrapersonal and interpersonal dynamics, but an additional data mining technique is needed to capture the communicative themes of the collaborative interactions. The identification of covered topics is of particular interest for the current analyses because it affords an assessment of the overall group performance that is independent of the individual student performance (i.e., pretest and post-test scores). Latent Dirichlet allocation (LDA; Blei, Ng, & Jordan, 2003), more commonly known as "topic modeling" (Steyvers & Griffiths, 2007), is a method of deriving an underlying set of topics from an unlabeled dataset.

Topic modeling allows researchers to discover the common themes in a large dataset and how pronounced those themes are in particular documents. LDA topic models are used to provide an inference mechanism of underlying topic structures through a generative probabilistic process. This generative process delivers a distribution over topics for each document in the form of a proportion. This distribution can be used to find the topics most representative of the contents of that document. These distributions can also be considered as data for future analyses, as every document's distribution describes the probability that that document belongs to a topic, thereby creating a document-topic "fingerprint". The topic model corpus for each of the three data sets (described in the Methods section) comprises the same extended corpora produced with the "seed method" described earlier (see the LSA section). The identified topics were inspected to see if any topics are considered "off-task" (details of this are described more in the Methods section). Several topics were classified as "off task" (see Methods section). Thus, the topics were divided into two groups, namely domain content relevant and irrelevant.

Topic Relevance. The measure of group performance was operationalized as the amount of on-topic discussion. To develop a meaningful measure of relevant or "on-task" discussions, we begin with the set of all topics, Q, constructed as described above. The topic score:

$$t_q(c_t) \quad (27)$$

gives the proportion of contribution $c_t$ that covers topic $q \in Q$. These proportions sum to 1 for any contribution:

$$\sum_{q \in Q} t_q(c_t) = 1 \quad (28)$$

The set of all topics will be manually partitioned into two subsets, Q' and Q°:

$$Q = Q' \cup Q°; \quad Q' \cap Q° = \{\emptyset\} \quad (29)$$

Q' represents those topics considered "relevant" or "on-task" for the subject matter of the course, and Q° consists of all other "off-task" topics (see Methods section). We can then construct a measure of the relative proportion of on-task material in each contribution by summing over the topic scores for topics in Q':

$$T'(c_t) = \sum_{q \in Q'} t_q(c_t) \quad (30)$$

We can get a measure of the degree to which the entire group discussion was on or off-task by averaging this across the entire discussion:

$$T' = \frac{1}{n} \sum_{t=1}^{n} T'(c_t) \quad (31)$$

We can also construct per-participant measures by averaging over the contributions of each participant, as specified in 32.

$$T'(a) = \frac{1}{\|P_a\|} \sum_{t=1}^{n} p_t(a) \cdot T'(c_t) \quad (32)$$

Section 5: Methods

The GCA was applied to three independent collaborative learning datasets. The first is a traditional computer-supported collaborative learning dataset. The second is a synchronous massive online course (SMOC) dataset called UT2014 SMOC. The third is a collaborative learning and problem solving data set collected from serious simulation game called "Land Science". The three datasets are described below.

Traditional CSCL Dataset

Participants. Participants were enrolled in an introductory-level psychology course taught in the Fall semester of 2011 at the University of Texas at Austin. While 854 students participated in this course, some minor data loss occurred after removing outliers and those who failed to complete the outcome measures. The final sample consisted of 840 students. Females made up 64.3% of this final sample. Within the population, 50.5% of the sample identified as Caucasian, 22.2% as Hispanic/Latino, 15.4% as Asian American, 4.4% as African American, and less than 1% identified as either Native American or Pacific Islander.

Course Details and Procedure. Students were told that they would be participating in an assignment that involved a collaborative discussion on personality disorders and taking quizzes. Students were told that their assignment was to log into an online educational platform specific to the University at a specified time (Pennebaker, Gosling, & Ferrell, 2012), where they would take quizzes and interact via web chat with one to four random group members. Students were also instructed that, prior to logging onto the educational platform, they would have to read material on personality disorders. After logging into the system, students took a 10-item, multiple choice pretest quiz. This quiz asked students to apply their knowledge of personality disorders to various scenarios and to draw conclusions based on the nature of the disorders.

After completing the quiz, they were randomly assigned to other students who were waiting to engage in the chatroom portion of the task. When there were at least 2 students and no more than 5 students (M=4.59), individuals were directed to an instant messaging platform that was built into the educational platform. The group chat began as soon as someone typed the first message and lasted for 20 minutes. The chat window closed automatically after 20 minutes, at which time students took a second 10 multiple-choice question quiz. Each student contributed 154.0 words on average (SD=104.9) in 19.5 sentences (SD=12.5). As a group, discussions were about 714.8 words long (SD=235.7) and 90.6 sentences long (SD=33.5).

Group Performance Measure. The group performance was operationally defined as the proportion of topic-relevant discussion during the collaborative interaction, as described in Equation 31. As a reminder, the corpus used for the topic modeling was the same extended corpus (i.e., using the seed method described earlier) used for creating the custom LSA spaces (Cai et al., 2011).

The topic modeling analysis revealed twenty topics, of which eight were determined to be relevant to the collaborative interaction task. Interjudge reliability was not used to determine the relevant topics. Instead, two approaches were used to determine the most relevant topics and validate a topic relevance measure for group performance. The first was the frequency of the topics discussed across all the groups and individual students, wherein more frequently discussed topics were viewed as more important. Second, correlations between the topics and student learning gains were used to help validate the importance of the topic. Once the important topics were determined, an aggregate topic relevance score was computed by summing up the proportions for those topics. The top 10 words for the relevant topics are reported in Table 5.

TABLE 5

Top Ten Words Representing Eight Relevant Topics

| Number | Psychological Disorders | General Psychology | Autism | Anxiety Disorder |
|---|---|---|---|---|
| 1 | Experience | Association | Child | Percent |
| 2 | Person | Psychology | Autism | Anxiety |
| 3 | Animal | Test | Syndrome | Treat |
| 4 | Schizophrenia | Journal | Autistic | Occur |
| 5 | Thought | Process | Parent | Fear |
| 6 | Study | Addiction | Movement | Blood |
| 7 | Bipolar | Psychiatry | Developmental | Cell |
| 8 | Disorder | Alcohol | Development | Severe |
| 9 | Mental | OCD | Attachment | Pneumonia |
| 10 | Many | Library | Disability | Infection |

| Number | Trauma | Psychotherapy | Personality Disorder | Health Care |
|---|---|---|---|---|
| 1 | Injury | Psychotherapy | Personality | Health |
| 2 | Loss | Technique | Criterion | Care |
| 3 | Bone | Therapist | Diagnostic | Nurse |
| 4 | Speech | Method | ADH | Hospital |
| 5 | Head | Counseling | Statistical | Physician |
| 6 | Surgery | Gun | Trait | Professional |
| 7 | Sound | Start | Sir | Education |
| 8 | Sign | Round | DSM | National |
| 9 | Transsexual | Intervention | Difference | Doctor |
| 10 | Muscle | Game | DSM-IV | Institute |

UT2014 SMOC Dataset

Participants. Participants were 1,713 students enrolled in an online introductory-level psychology course taught in the Fall semester of 2014 at the University of Texas at Austin. Throughout the course, students participated in a total of nine different computer-mediated collaborative interactions on various introductory psychology topics. This resulted in a total of 3,380 groups, with four to five students per group. However, 83 out of 3,380 chat groups were dropped because there was only one person, which was 2.45% of total dataset.

Course Details and Procedure. The collaborative interactions took place in a large online introductory-level psychology course. The structure of the class followed a synchronous massive online course (SMOC) format. SMOCs are a design variant that is based on massive open online course (MOOCs) (Chauhan, 2015), MOOCs are normally open to the public and typically free. SMOCs are limited to a total of 10,000 students, including those enrolled at the university and across the world, and are available to all the participants at a registration fee of $550 (Chauhan, 2015). The course that was analyzed in this dissertation was the second SMOC ever launched.

The course was a live-streamed online-course that required students to log in at specific times. Once students were logged into the university's online educational platform, students were able to watch live lectures and instructional videos, take quizzes and exercises, and participate in collaborative discussion exercises. Students interacted in collaborative discussions via web chat with randomly assigned group members. Once put into groups, students were moved into a chat room and told they had exactly 10 min to discuss the readings or video. Chat sessions lasted 10 min, with the timer beginning at the first chat entry. At the end of the discussion, students individually took a 10-item, multiple choice quiz that asked students to apply their knowledge of the topic for that day (e.g., personality disorders) to various scenarios and to draw conclusions based on the nature of the disorders (see Appendix A for an example quiz). Throughout the course, students (N=1,713) participated in a total of nine different computer-mediated collaborative interactions on various introductory psychology topics (see Appendix B for details). In total, there were 3,380 groups, with four to five students per group.

Land Science Dataset

Participants. A total of 38 participants interacted in 19 collaborative problem solving simulation games. Each game consisted of multiple rooms, and each room involved multiple chat sessions. There was a total of 630 distinct chat sessions. Of the 38 participants, n=29 were student players, n=13 were Mentors, n=10 were Teachers, and n=1 was a Non-Player Character (NPC). For the purposes of detecting the social roles of players, only the Players' and Mentors chat' were analyzed with the GCA.

Details and Procedure. Land Science is an interactive urban-planning simulation with collaborative problem solving in an simulation environment (Bagley & Shaffer, 2015; Shaffer, 2006; Shaffer & Graesser, 2010). The goal of the game is for students to think and act like STEM professionals. Players are assigned an in-game internship in which they act as land planners in a virtual city with the guidance of a mentor. During the game, players communicate with other members of their planning team, as well as with an adult mentor who sometimes role plays as a professional planning consultant.

Data Summaries

Table 6 provides the individual difference measures for each data set. Table 7 reports the performance outcome assessment and GCA measures for each dataset. Table 8 offers a description of the six GCA measures.

TABLE 6

Demographic and Individual Difference Measures for Each Dataset

| | Traditional CSCL | SMOC | Land Science |
|---|---|---|---|
| Demographic Variables | | | |
| Sex | Yes | Yes | No |
| Age | Yes | Yes | No |
| Ethnicity | Yes | Yes | No |

TABLE 6-continued

Demographic and Individual Difference Measures for Each Dataset

|  | Traditional CSCL | SMOC | Land Science |
|---|---|---|---|
| First language | Yes | Yes | No |
| Birth order | Yes | Yes | No |
| Years in college | Yes | Yes | No |
| Parents education | Yes | Yes | No |
| Computer literacy | Yes | Yes | No |
| Retaking course | Yes | Yes | No |
| Individual Differences |  |  |  |
| Big five personality | Yes | Yes | No |
| Number of clicks total | Yes | No | No |
| Anxiety level | Yes | No | No |

TABLE 7

Performance Assessment for Each Dataset

| Measure | Description | Traditional CSCL | SMOC | Land Science |
|---|---|---|---|---|
| Benchmark quizzes (BM) | Quiz given at the beginning of every class | No | Yes | No |
| Notebooks | Graded assessment | No | No | Yes |
| Mid class questionnaires (MCQ) | Quiz given after select CL interactions | No | Yes | No |
| Pretest | Pre-interaction assessment | Yes | No | No |
| Posttest | Post interaction assessment | Yes | No | No |
| Topic Relevance | Proportion of on-topic discussion for groups, as described in Equation 31 | Yes | No | No |

TABLE 8

Collaborative Interaction Process Measures from the GCA

| Measure | Description |
|---|---|
| Participation | Mean participation of any participant is the relative proportion of their contributions out of the group total contributions |
| Responsiveness | Measure of how responsive a student's contributions are to all other group members' contributions |
| Internal cohesion | Measure of how semantically similar a student's contributions are with their own previous contributions |
| Social impact | Measure of how contributions initiated by the corresponding student have triggered follow-up responses |
| Newness | The amount of new information in a learner's contribution |
| Communication density | The amount of semantically meaningful information |

Computing LSA Spaces

Each dataset was used to generate a distinct LSA space used for calculating the GCA measures on that dataset. This ensures that each corpus of chat transcripts is given an appropriate semantic representation for the material being discussed. The principal difficulty in generating an LSA space from chat transcripts is that subjects and topics referenced in natural conversations are not sufficiently defined to provide a comprehensive mapping of their semantic relationships. We take for granted that our conversational partners already have a well-developed understanding of a vast array of topics. For example, one may engage in a perfectly coherent conversation with a friend or colleague about careers, food, family or any number of other subjects, without ever needing to provide a comprehensive verbal description of any of these subjects. Therefore, we must supplement the chat transcripts with appropriate external documents in order to robustly represent the semantic space of subjects referenced in a conversation (Cai et al., 2011). To this end, we analyze the frequencies of terms used in the discussion in order to identify the most significant terms (keywords), and then query publicly available databases (i.e., Wikipedia) for documents on those topics. This process of scanning for keywords can be repeated with the newly added documents until a satisfactory number of documents has been obtained to generate a reasonable mapping of the semantic space. Finally, an LSA space of 300 dimensions was computed from each expanded corpus (as described in Section 4, above). Table 9 provides the descriptive information for the original chat corpora, the extended corpora, and LSA spaces for each data set.

TABLE 9

Total Terms and Unique Terms for each Data Set, Expanded Corpus, and LSA Space

| | Chat Transcripts | | Expanded Corpus | | LSA Space |
|---|---|---|---|---|---|
| Dataset | Total Terms | Unique Terms | Total Terms | Unique Terms | Unique Terms |
| Traditional CSCL | 130,946 | 6,010 | 2,703,978 | 91,613 | 32,297 |
| SMOC | 457,639 | 14,207 | 8,024,354 | 149,188 | 56,609 |
| Land Science | 401,652 | 9,932 | 1,981,589 | 73,702 | 25,417 |

Spanning Window Calibration

The size of the spanning window, w, can have significant effects on the GCA measures. We want to constrain the size of this window so as to capture the temporal dynamics of the conversation (a window as long as or longer than the entire conversation would just average everything together). However, very short windows may miss salient connections between remarks because they fall outside of the specified span. Certain students were such infrequent participants that small window lengths would make computing the w-spanning internal cohesion measure impossible, as all of their contributions were more than w turns apart. A window size of 20 was chosen as this was the shortest length that would allow for at least 95% of students, across all three datasets, to have at least 2 contributions inside the window. The remaining students (<5%) had their internal cohesion measures trivially set to 0.

Section 6: Social Roles in Collaborative Interactions

Prior Research on Student roles in Collaborative Interactions

The role concept has been a fundamental construct for facilitating and evaluating group interactions (Dillenbourg, 1999; Hoadley, 2010; Jahnke, 2010; Marcos-Garcia, Martinez-Mones, & Dimitriadis, 2015; Sarmiento & Shumar, 2010; Smith Risser & Bottoms, 2014; Stahl et al., 2014; Strijbos & De Laat, 2010; Volet, Vauras, Salo, & Khosa, 2017). Roles have been defined more strictly as stated functions and/or responsibilities that guide individual behavior and behavioral patterns exemplified by individuals in social contexts (Hare, 1994; Volet et al., 2017). There are two perspectives on roles that appear in the literature, namely scripted roles and emergent roles. Scripted roles are prearranged to facilitate collaboration and maximize learning gains, whereas emerging roles develop spontaneously as a result of collaborative activity (Strijbos & Weinberger, 2010). This dissertation focuses on the emergent roles that students may take on and how those influence the learning process for individuals, and the group as a whole.

Figure 3:
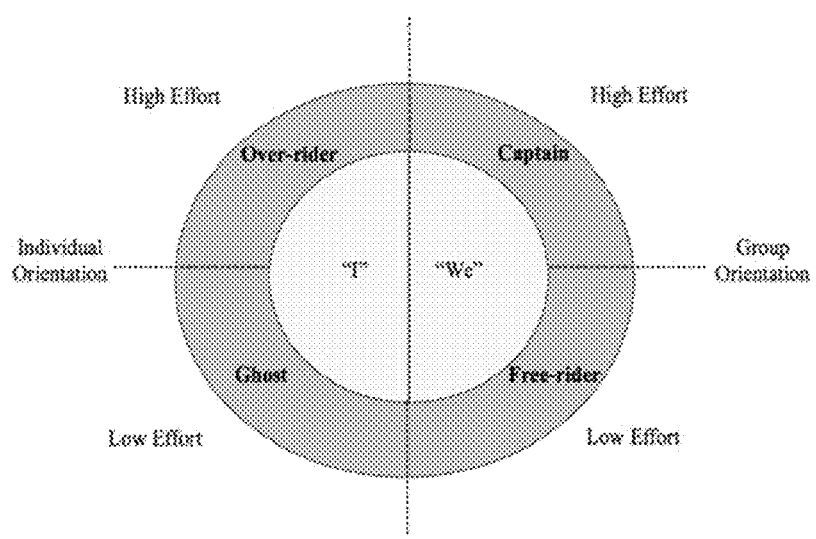
FIG. 3 shows four student roles in small groups, under an embodiment.

Emergent roles develop over time throughout the course of collaborative interactions and presumably influence both the interactions and learning outcomes. While no universally accepted role taxonomies exist (Stewart, Fulmer, & Barrick, 2005; Volet et al., 2017), different typologies of roles have been introduced. One taxonomy was the Strijbos and De Laat (2010) framework of roles in small group interactions. This dissertation initially adopted this framework, but the taxonomy was revised after the data were analyzed and interpreted. The Strijbos-DeLaat framework distinguishes eight roles. Four of the roles are reserved for large group interactions: Pillar, Generator, Hanger-on and Lurker. However, the remaining four are particularly relevant to small group interactions: Captain, Over-rider, Free-rider, and Ghost. The roles are differentiated along two dimensions that crosses orientation (individual, group) and effort (low, high). The first dimension of their framework consists of students' orientation during collaborative learning. A student tends to be oriented towards individual goals (i.e., focus on "I") or the group goals (i.e., focus on "We"). For instance, the participation by a Ghost is typically motivated by individual goals and what the student can learn from the group; a Free-rider is described as a student that specifically endorses the group's goal, but participates as little as possible. The second dimension involves the effort that students devote to the collaboration. A Free-rider typically devotes a limited amount of effort in the group interaction and the student's contributions are mostly product-oriented. The role of Captain, in contrast, is occupied by the more active and socially responsible learners. Captains, having a strong orientation towards the group, invest significant effort attempting to find and maintain group consensus, and facilitate the collaborative tasks. FIG. 3 displays Strijbos and De Laat's (2010) four student roles in small groups.

Alignment of GCA with Theoretical Framework

Strijbos and De Laat's (2010) conceptual framework was used as a guide to analyze the roles students occupy in CSCL, under an embodiment. While their model provided a starting point, there are some limitations in this conceptualization that suggested some additional categories. In particular, the conceptualization does not distinguish leaders from non-leaders who diligently collaborate to achieve group goals, nor does it identify saboteurs who attempt to dismantle the group from achieving group goals (see PISA framework, Graesser et al., 2017; OECD, 2013). Thus, the dissertation primarily considers the four Strijbos-DeLaat's roles, but also considers the possibility of identifying other types of roles.

The current research is expected to provide methodological improvements in role identification. Manual content analysis methods have been used to evaluate the discourse and participation patterns associated with student roles, although there are some notable exceptions (Burkett, Keshtkar, Graesser, & Li, 2012; Foltz & Martin, 2009; Keshtkar, Burkett, Graesser, & Li, 2012; Roséet al., 2008). The automated metrics that make up the GCA allow us to understand how roles are constructed and maintained through the sociocognitive processes within an interaction. This is expected to provide a more objective and deeper exploration of the micro-level intrapersonal and interpersonal patterns associated with student roles. Moreover, a substantially larger corpus of data can be analyzed than when humans need to annotate the data.

There were also some modifications to Strijbos-DeLaat's orientation and effort dimensions. The orientation dimension suggests a student is either oriented towards individual goals or the group goals. One way of measuring this is by observing the relative frequency of pronouns (e.g., "I" versus "We"), which are important identifiers of students' orientations (Tuomela & Tuomela, 2005). However, pronouns are merely a surface level indicator of orientation and run the risk of incorrectly classifying what is semantically a collective responsibility statement (e.g., "I can provide the answer to question three from my notes") as a selfish individual orientation (Hesse et al., 2015). Pronouns are under an embodiment removed as stop words in the LSA approach described herein. Thus, instead of pronouns, GCA measures of responsiveness and internal cohesion are used as an indicator of students' orientation during collaborative interactions. Students' internal cohesion and responsiveness are presumably a stronger indication of their orientation. That is, these measures are independent of surface level features, and should capture deeper constructs related to their self-monitoring and responding skills (Dehler, Bodemer, Buder, & Hesse, 2011; Hesse et al., 2014). The responsivity measure indicates a students' ability or willingness to integrate contributions of collaborators into their own thoughts and actions (i.e., responsiveness). Additionally, it captures a student's responsiveness with themselves (i.e., internal cohesion).

The second dimension in the framework is effort, which is the determined by the amount of participation from a given student (Knowlton, 2005). Participation is the minimum requirement for collaborative interaction, but not all participation is beneficial. Students can exhibit high effort and have very little, or even negative, impact on the group. For instance, a student can be a "chatty Cathy" but if his or her contributions are completely off topic, it is unlikely that the talk will initiate further discussion from other students. Strijbos and De Laat (2010) point out "It should be noted that effort is not the same as impact, meaning that even a group member with few contributions can still be very influential. Nevertheless, effort is relatively easier to determine than impact." The impact of student contributions on the group discourse seems to be an essential part of determining the roles students play in the group. Understanding participation of collaborators, and the roles or actions that they take to maintain participation of all group members, requires consideration of the actions that students take both in terms of the effort and impact of those contributions. The impact of students' contribution(s) can be understood in terms of the social impact it has on the collaborative discourse. For instance, contributions with higher social impact would be those that stimulate other members to respond and that advance the conversation to achieve the group goals. The dissertation addresses this measuring the impact of students' contributions during collaborative interactions.

The degree of rigid role behavior in the Strijbos-De Laat framework is expressed by the gray-scale coloring (see FIG. 3). Specially, in the outer ring participants are strongly acting according to one of the proposed roles: Captain, Over-rider, Free-rider, or Ghost. However, those students that are not exemplifying particularly strong role behavior may still be captured in the middle ring. The four student roles are described briefly below and operationalized in Table 10 along dimensions of participation, responsiveness, internal cohesion, social impact, newness, and communication density. It should be noted that Table 10 illustrates the initial hypotheses based on Strijbos and De Laat (2010) conceptual framework. However, the systems and methods described herein extend the Strijbos and De Laat (2010) framework with several new interaction dimensions, which reveals additional social roles during collaborative interactions. In line with this, more intricate interactions and tradeoffs between these dimensions may be observed. For instance, a learner who is responsive and has high newness will likely have high social impact that moves the conversation forward. However, the same learner might not exhibit much internal cohesion because there may be a tension between these aspects of collaboration.

- Captain. The Captain role is occupied by students who exhibit self-regulatory and social-regulatory skills. Learners with high social impact, responsivity, and active engagement in the discussion would be categorized as a Captain.
- Over-rider. An Over-rider would show high social impact, internal cohesion, and participation, but low responsivity to other group members. This is because the Over-rider is concerned with pushing his/her own agenda and is more product-oriented than collaborative process-oriented.
- Free-rider. A Free-rider would have high internal cohesion, but low scores for social impact and responsivity. The team member is either disengaged from the discussion or not making comments that others feel are relevant.
- Ghost. A Ghost has low engagement with the group and is also low on social impact, responsivity and internal cohesion. A Ghost's contributions are a reflection of the learner's own interests and problems, but are not connected to the group task so any newness would be irrelevant.

TABLE 10

Hypothesized Relationships Between Communication Profiles and Student Roles Based on Strijbos and De Laat (2010) Conceptual Framework

|  | Captain | Over-rider | Free-rider | Ghost |
| --- | --- | --- | --- | --- |
| Participation | High | High | Low | Low |
| Responsiveness | High | Low | Low | Low |
| Internal Cohesion | Low | High | High | High |

TABLE 10-continued

Hypothesized Relationships Between Communication Profiles and Student Roles Based on Strijbos and De Laat (2010) Conceptual Framework

|  | Captain | Over-rider | Free-rider | Ghost |
| --- | --- | --- | --- | --- |
| Social Impact | High | High | Low | Low |
| Newness | High | Low | Low | High |
| Communication Density | High | High | Low | Low |

Section 7: Detecting Social Roles

The following analyses focus on addressing the main questions raised in the Overview of Present Research section three. The implementation of these methods and statistical analyses were performed under R Studio version 3.3.0.

The analysis starts with the Traditional CSCL dataset, which was immediately partitioned into subgroups for training (84%) and testing (16%) data. Descriptive statistics for the GCA measures from the training data are presented in Table 11.

TABLE 11

Descriptive Statistics for GCA Measures

| Measure | Minimum | Median | M | SD | Maximum |
| --- | --- | --- | --- | --- | --- |
| Participation | −0.26 | −0.01 | 0.00 | 0.10 | 0.35 |
| Social Impact | 0.00 | 0.18 | 0.18 | 0.05 | 0.43 |
| Overall Responsivity | 0.00 | 0.18 | 0.18 | 0.05 | 0.50 |
| Internal Cohesion | −0.06 | 0.18 | 0.18 | 0.09 | 0.58 |
| Newness | 0.00 | 0.48 | 0.78 | 1.25 | 18.09 |
| Communication Density | 0.00 | 0.21 | 0.34 | 0.51 | 6.45 |

Note.
Mean (M).
Standard deviation (SD)

The data were normalized and centered to prepare them for analysis. Specifically, the normalization procedure involved Winsorising the data based on each variable's upper and lower percentile. Density and pairwise scatter plots for the GCA variables is reported in Appendix C. A cluster analysis approach was adopted to discover communication patterns associated with specific learner roles during collaborative interactions (i.e., Research Question 1). Cluster analysis is a common educational data mining technique that involves identifying subgroups or profiles of individuals within the larger population who share similar patterns on a set of variables (Baker, 2010). Cluster analysis has been applied in previous studies of social roles (Risser & Bottoms, 2014) and has proven useful in building an understanding of learners' behaviors in many digital environments more broadly (Mirriahi, Liaqat, Dawson, & Gašević, 2016; Valle & Duffy, 2007; Wise et al., 2012). Prior to clustering, collinearity was assessed using Pearson correlations and multicollinearity was assessed through inflation factor (VIF) statistics. Table 12 shows the Pearson correlations between the group communication variables ranged from $r=-0.10$ to 0.90. The rule-of-thumb is not to use variables correlated at $|r| \geq 0.7$. The VIF values for the group communication variables ranged from 1.65 to 7.34. A rule of thumb states that there is evidence of multicollinearity if VIF>10 (Fox & Weisberg, 2010). The VIF results support the view that multicollinearity was not an issue. However, there was evidence of moderate collinearity between two variables, newness and communication density. Therefore, the impact of collinearity on the cluster patterns is evaluated further below.

TABLE 12

Pearson Correlations Coefficients for GCA

| Measure | Participation | Social Impact | Responsivity | Internal Cohesion | Newness |
|---|---|---|---|---|---|
| Social Impact | 0.07 | | | | |
| Overall Responsivity | −0.01 | 0.69*** | | | |
| Internal Cohesion | 0.21*** | 0.57*** | 0.52*** | | |
| Newness | 0.64*** | 0.07 | −0.03 | 0.10** | |
| Communication Density | 0.56*** | −0.10*** | −0.19*** | −0.06 | 0.90*** |

Note:
***p < .001,
**p < .01,
*p < .05.

Cluster Tendency

The first step in the clustering process is to assess the cluster tendency (Han, Pei, & Kamber, 2011). Cluster tendency assessment determines whether a given dataset has a non-random structure, which may lead to meaningful clusters. This is a particularly important in the context of unsupervised machine learning because clustering methods will return clusters even if the data does not contain any inherent clusters. The Hopkins statistic is most common method for testing the intrinsic ability of a data to be clustered (Han et al., 2011). The Hopkins statistic is a spatial statistic that tests the spatial randomness of data as distributed in space. The values of the Hopkins statistic (H) ranges from 0 to 1. It tests the null hypothesis that the data are uniformly distributed and thus contains no meaningful clusters. When a dataset is random, implying a lack of underlying structure, the value of H is about 0.5 or greater. However, when the data exhibit some inherent clustering the H is closer to 0 (Han et. al., 2011, p. 486). In the current project, the Hopkins statistic was implemented, using the R library clusterend (YiLan & RuTong, 2015), to evaluate the cluster tendency for the Traditional CSCL data set prior to conducting the actual cluster analyses. A random uniform simulated dataset was generated with the same dimension as the Traditional CSCL dataset to serve as an illustrative baseline comparison. As expected the random dataset did not exhibit any meaningful clusters, H=0.51. However, the Traditional CSCL dataset did show evidence of clustering, H=0.11, which is well below the threshold of H>0.5.

Determining the Number of Clusters

Figure 4:
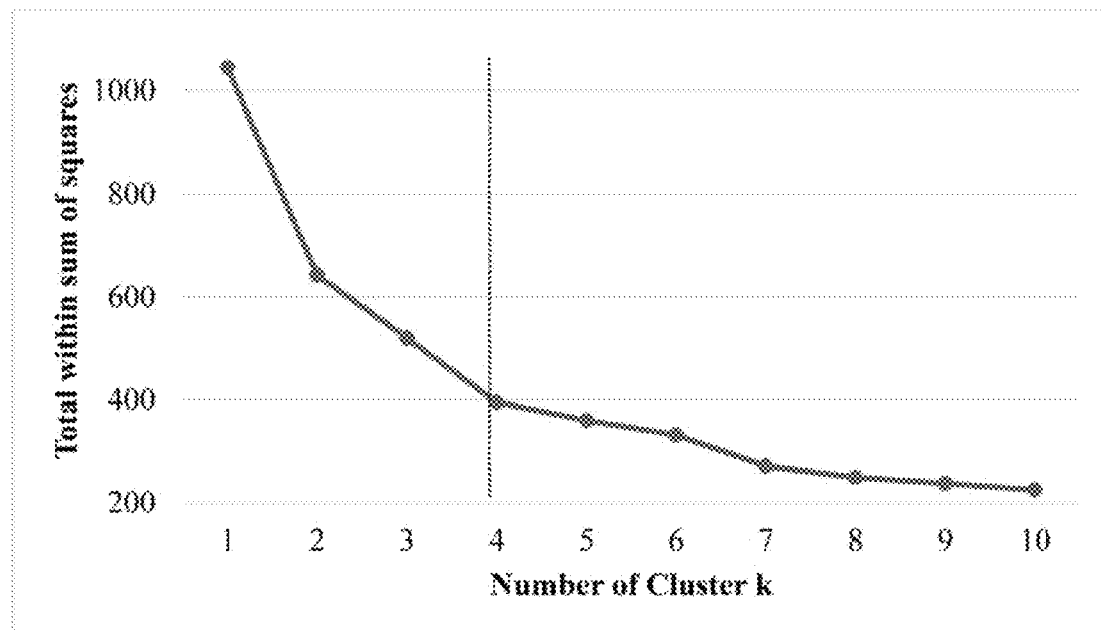
FIG. 4 displays number of clusters solutions against within-groups sum of squares for Traditional CSCL data set GCA variables, under an embodiment. The embodiment of FIG. 4 shows a proposed number of clusters of four (4).

The next step in the cluster analysis is to determine the number of cluster to be used in the analysis. There are several methods suggested in the literature for determining the optimal number of clusters (Han et al., 2011). A basic idea in cluster analysis methods is to delimitate clusters such that the total intra-cluster variation or total within-cluster sum of square (wss) is minimized (Kaufman & Rousseeuw, 2005). In general, as the number of clusters increases, the wss should decrease because clusters are smaller. In the current research, both visual approaches such as the 'Elbow' method, and a group of other statistical approaches were explored. The Elbow method is a useful visual way to choose the appropriate number of clusters. The Elbow method involves plotting the wss against a series of sequential cluster levels. The most appropriate cluster solution is defined as the solution at which the reduction in wss slows considerably. This produces an "elbow" in the plot of wss against cluster solutions. To identify the appropriate number of clusters in the Traditional CSCL data set the wss was compared with the number of clusters ranging from 1 to 10. By plotting the number of clusters against the within-groups sum of squares for the group communication variables (FIG. 4) it is possible to not only quantitatively, but also visually identify a representative number of clusters. FIG. 4 shows that similar values of the within-groups sum of squares appear for values of k greater than four, therefore indicating that four seems to be an appropriate value for the number of clusters to consider. This is in line with on Strijbos and De Laat (2010) conceptual model of student roles.

Figure 5:
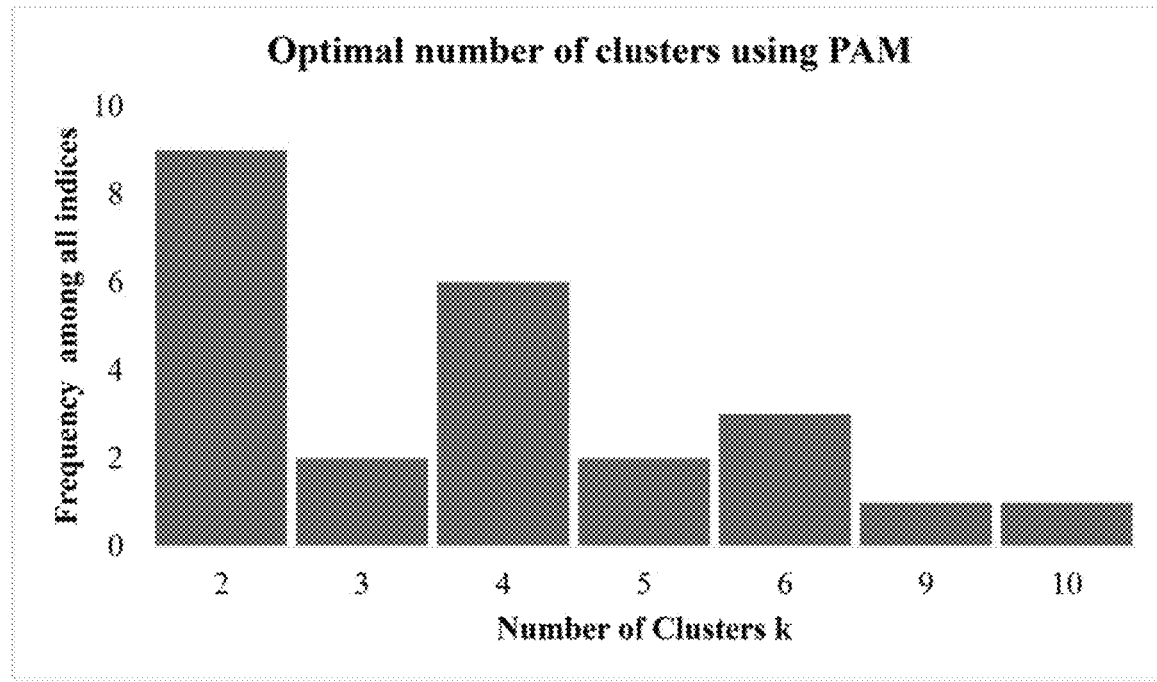
FIG. 5 shows frequency for recommended number of clusters using Partitioning Around Medoids (PAM), ranging from 2 to 10, using 26 criteria provided by the NbClust package, under an embodiment. The embodiment of FIG. 5 shows 9 of the 26 indices proposes the number 2 as the optimal number of clusters in the Traditional CSCL dataset.
Figure 6:
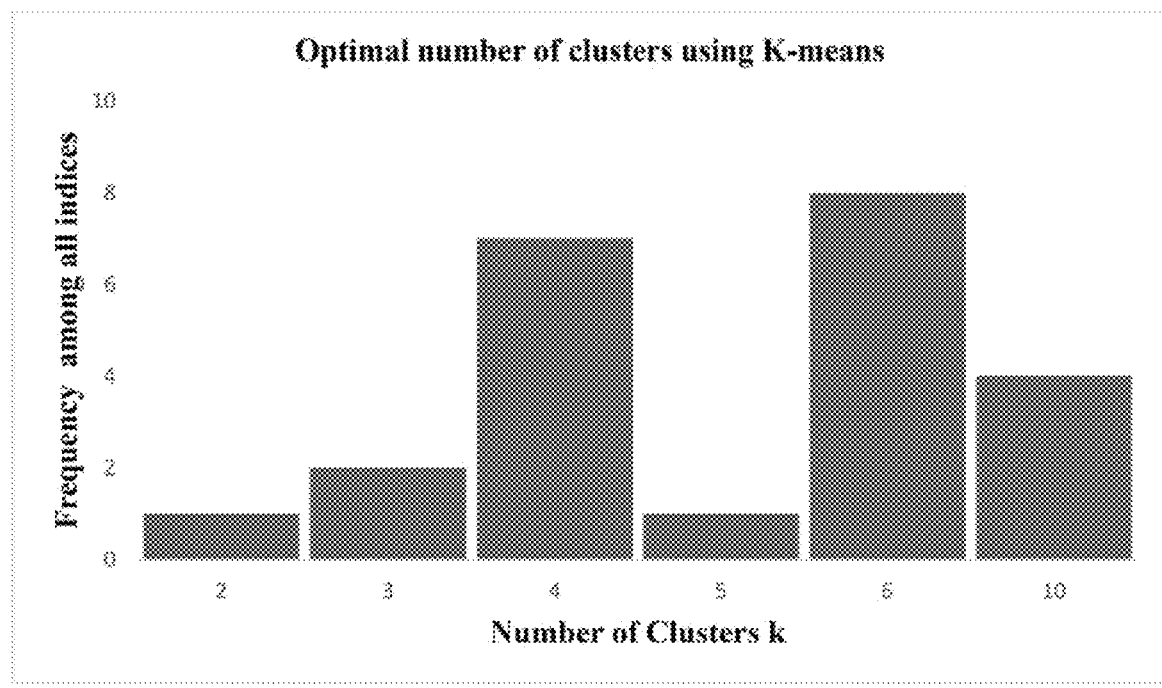
FIG. 6 shows frequency for recommended number of clusters using K-means, ranging from 2 to 10, using 26 criteria provided by the NbClust package, under an embodiment. The embodiment of FIG. 6 shows that 8 of the 26 indices propose 6 as the optimal number of clusters in the Traditional CSCL dataset.

The disadvantage of elbow and similar methods (i.e., average silhouette method) is that they provide only a visual impression of clustering without quantitatively measuring the inflection point of the elbow. As mentioned earlier, several indices have been proposed in the literature for determining the optimal number of clusters (Han et al., 2011). Thus, a more precise and comprehensive evaluation would involve exploring the best clustering scheme from the different results obtained by varying all combinations of number of clusters, distance measures (e.g., Manhattan distance for k-medoids, Euclidean distances for k-centroids) and clustering methods. The NbClust package provides 26 indices for determining the relevant number of clusters (Charrad, Ghazzali, Boiteau, & Niknafs, 2014). They are described comprehensively in the original paper of Charrad et al. (2014). An important advantage of NbClust is that researchers can simultaneously compute multiple indices and determine the number of clusters using a majority rule. The majority rule is based on the evaluation of the cluster size proposed across the 26 indices with the final suggested number of clusters based on the majority. Under the systems and methods set forth herein, the optimal number of clusters was explored for two clustering partitioning approaches, Partitioning Around Medoids (PAM) and Partitioning Around Centroids (K-means). FIGS. 5 and 6 reveal that the optimal number of clusters, according to the majority rule, is 2 for the PAM approach and 6 for the K-means approach. However, the total within-cluster sum of squares (wss) suggested a four-cluster solution. Based on this discrepancy, three models (i.e., the two-, four- and six-cluster solutions) were constructed and compared.

Partitioning Clustering Analysis (Unsupervised Analysis)

Figure 8:
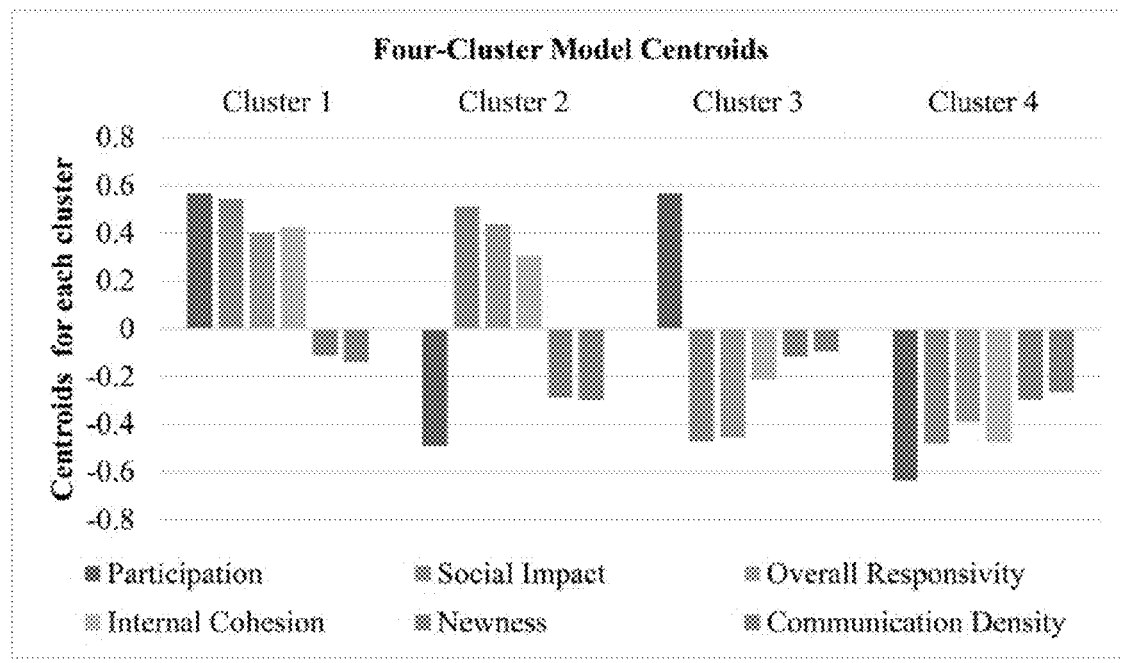
FIG. 8 shows centroids for a four-cluster solution across GCA variables, under an embodiment.
Figure 9:
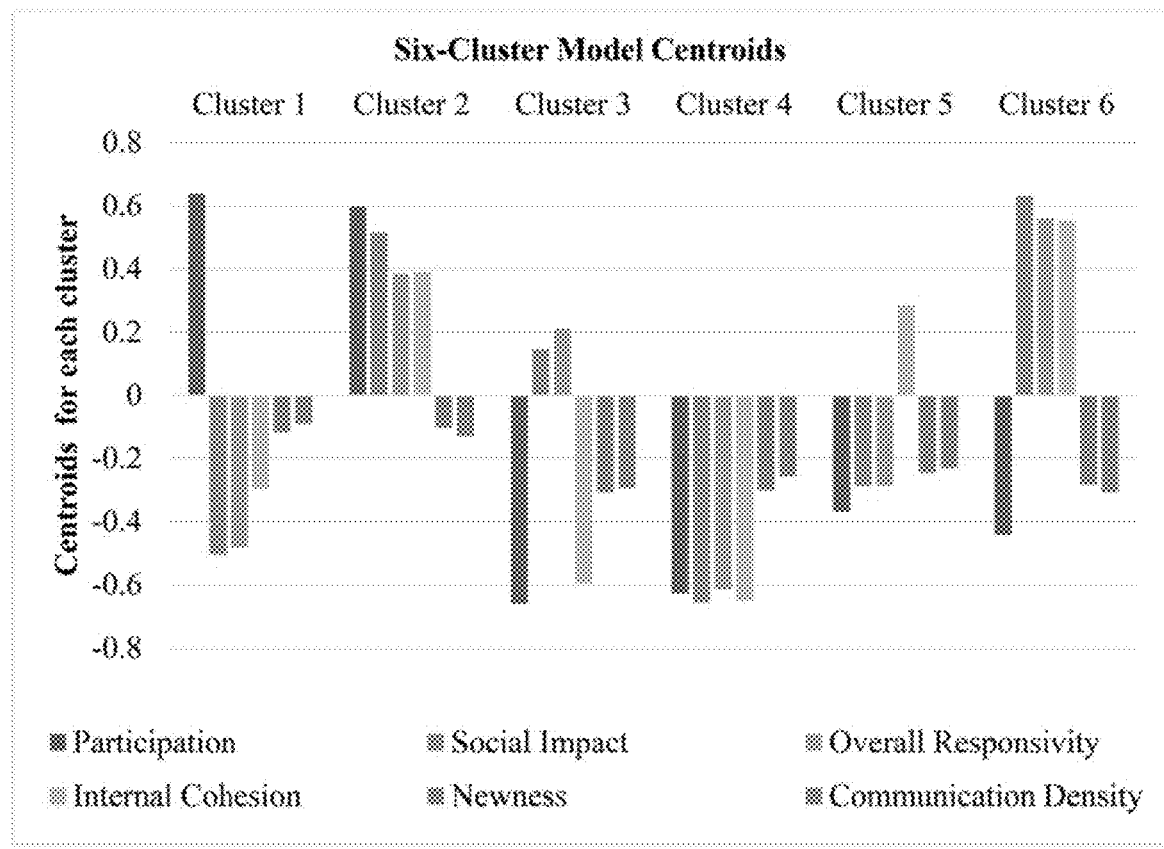
FIG. 9 shows centroids for a six-cluster solution across GCA variables, under an embodiment.

Partitioning based clustering methods include two major categories, namely k-means and k-medoids. While several partitioning methods were explored in the current dissertation (including PAM, fuzzy, hierarchical, density, hybrid k-means and regular k-means clustering), PAM and k-means provided the most stable clusters. Thus, the PAM and k-means methods were used to group learners with similar group communication profiles into clusters. Three separate cluster analyses were performed to assess the degree to which the data resembled a two-, four- or six-cluster solution. A first step in interpreting the clusters involves inspecting the cluster centroids for k-means, or medoids for PAM, as this sheds light on whether the segments are conceptually distinguishable. Centroids are representative objects, or in this context learners, of a cluster whose average dissimilarity to all the other learners in the cluster is minimal. Centroids are conceptually similar to means. In contrast to the centroids used in the k-means algorithm, the medoids from PAM are represented by actual data points that best characterize the cluster. The medoids for the two cluster PAM solution, and centroids for the four- and six-cluster k-means solution are presented in FIGS. 7-9, respectively.

As discussed earlier, there was evidence of moderate collinearity between two variables, newness and communication density. The potential harm of collinearity in cluster analysis is that it can change the observed pattern of the clusters. The impact of collinearity was evaluated in the current research by running the cluster analyses with and without the communication density measure to ensure the same cluster pattern was observed. This evaluation showed that collinearity was not impacting the cluster pattern for the two-, four-, or six-cluster models. Specifically, the same cluster pattern was observed across the variables when the cluster analysis was conducted without the communication density measure (see Appendix D, Appendix E, and Appendix F).

Figure 7:
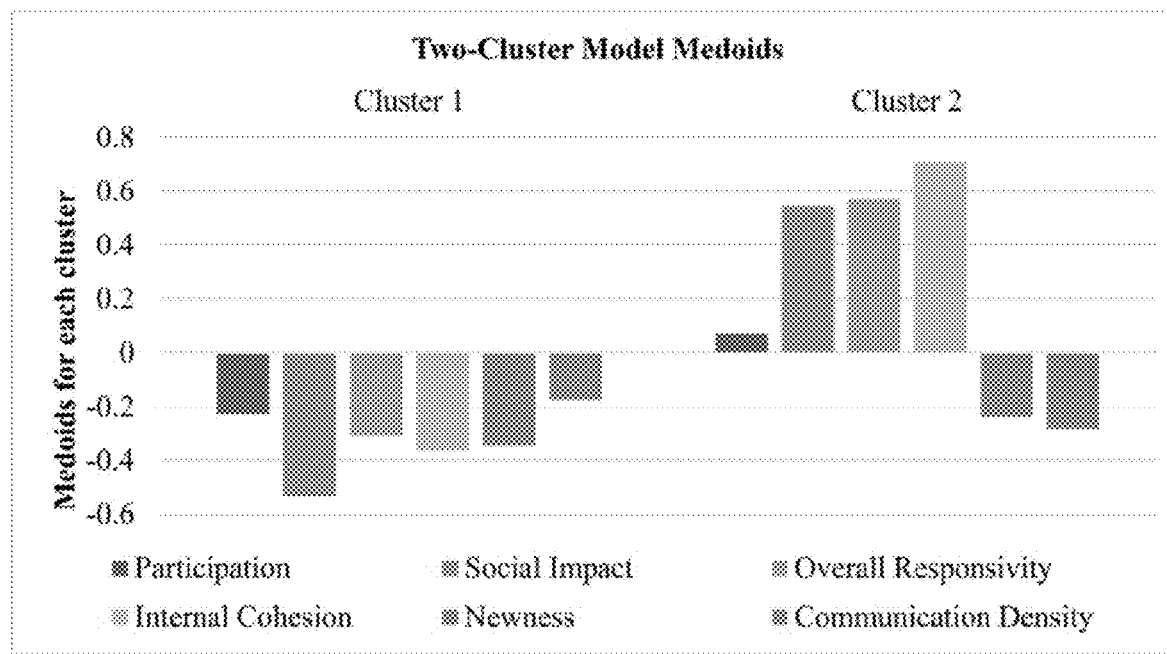
FIG. 7 shows medoids for a two-cluster solution across GCA variables, under an embodiment.

We see some similar patterns across the two-, four-, and six-cluster solutions, which suggest stability in the cluster analysis. FIG. 7 shows the two-cluster solution segmented learners who did not productively engage in the collaborative interaction (cluster 1) from those that did (cluster 2). Similar clusters where identified in the four-cluster model (see FIG. 8 clusters 1 and 4), and the six-cluster model (see FIG. 9 clusters two and four). Specifically, cluster 1 in the two-cluster model (FIG. 7), 4 on the four-cluster model (FIG. 8), and cluster 4 in the six-cluster model (FIG. 9) are characterized by the lowest participation, social impact, overall responsivity, internal cohesion, newness, and communication density. This patterns resembles the Ghost in the Strijbos-DeLaat role framework. Although, that model used the category label Ghost, it will be labeled the Lurker role herein. Lurkers have been defined differently in the literature, ranging from non-participators to minimal participators (Nonnecke & Preece, 2000; Preece, Nonnecke, & Andrews, 2004). The distinction between a Ghost and a Lurker is not clear in the literature, which appears to use these terms interchangeably, although Strijbos and De Laat do make a distinction based on group size. Two reasons motivated operationalizing this pattern as a Lurker, rather than the Ghost; First, the GCA methodology would not be able to detect an individual that did not participate at all (because there would not be a log file for those students), which suggests the learners in these clusters did contribute at least minimally. Second, past research has labeled the Ghost and Lurker roles predominantly based on the amount of contributions a student makes, although the GCA captures participation as well as the sociocognitive characteristics of those contributions. The pattern depicted for these clusters does not suggest these students have no social impact, or were completely unresponsive to others. Rather it suggests that these students expressed less compared to other group members. Lurking behavior sometimes involves some level of engagement but at other times little engagement so it is associated with both positive and negative outcomes in the literature (Preece et al., 2004). Therefore, Lurker is used as a label for this cluster, under an embodiment.

Similar patterns were also observed between cluster 2 in the two-cluster model, cluster 1 in the four-cluster model, and cluster 2 in the six-cluster model. The learners in these clusters are among the highest participators; they exhibit high social impact, responsiveness, and internal cohesion, but coupled with the lowest newness and communication density. Learners in these clusters are investing a high degree of effort in the collaborative discussion and display self-regulatory and social-regulatory skills. This pattern is labeled the Driver. While the two-cluster model makes sense conceptually, the simplicity of the segmentation is less meaningful from a practical and theoretical standpoint.

The four and six cluster solutions provide more detail by further distinguishing the mid-range students. For instance, cluster 3 in the four-cluster model and cluster 1 in the six-cluster model are characterized by learners who have the highest participation. However, when they contribute, their discourse is more in response to themselves than other team members (i.e., higher internal cohesion than responsiveness or social impact), and do not warrant further discussion from the group members or provide new information (i.e., low social impact and newness). These individuals would be similar to the Over-riders described in Strijbos and De Laats' (2010) framework, who exhibit strong individual learning goals and try to push the group members into adopting their agenda. In contrast to the Driver role, Over-riders have a higher degree of internal cohesion compared to social impact or responsiveness, which signals the Over-rider is more concerned with the personal gain than the collaboration or social climate.

Cluster 2 in the four-cluster model and cluster 6 in the six-cluster model are also quite similar. Here we see learners with low participation, but when they do contribute, they attend to other learners' contributions and provide meaningful information that furthers the discussion (i.e., high internal cohesion, overall responsiveness, and social impact). This pattern is similar to a student that is engaged in the collaborative interaction and is called a Task-Leader. It is interesting to note that these students are not among the highest participators, but their discourse signals a social positioning that is conducive to a productive exchange within the collaborative interaction.

Cluster 3 and 5 in the six-cluster model (FIG. 9) produced two additional patterns not observed in the other cluster models. Learners occupying cluster 5 exhibited high internal cohesion, but low scores on all the other group communication measures. This cluster is labeled as Social Detached, because the pattern appears to capture students who are not productively engaged with their collaborative peers, but instead focused on themselves. Cluster 3 is characterized by learners who have the lowest participation. However, when they do contribute it appears to build, at least minimally, on previously contributed ideas and move the collaborative discourse forward (i.e., higher social impact and responsiveness). This cluster is labeled as the Follower. Overall, all three cluster models appear, at least visually, to produce theoretically meaningful student groupings. In the next phase of the analysis the quality and validity of the cluster solutions is evaluated.

Clustering Evaluation and Validation

The literature proposes several cluster validation indexes that quantify the quality of a clustering (Hennig, Meila, Murtagh, & Rocci, 2015). In principle, these measures provide a fair comparison of clustering and aid researchers in determining whether a particular clustering of the data is better than an alternative clustering (Taniar, 2006). There are three main types of cluster validation measures and approaches available: internal, stability, and external. Internal criteria evaluate the extent to which the clustering "fits"

the data set based on the actual data used for clustering. In the current dissertation three commonly reported internal validity measures (Silhouette, Dunns index, and Connectivity) were explored using the R package clValid (Brock, Pihur, Datta, & Datta, 2008). Silhouette analysis measures how well an observation is clustered and it estimates the average distance between clusters (Rousseeuw, 1987). Silhouette widths indicate how discriminant the clusters chosen are by providing values that range from −1, indicating that observations are likely placed in the wrong cluster to 1, indicating clusters perfectly separate the data and no better (competing) ways to cluster can be found. Dunn's index (D) evaluates the quality of clusters by computing a ratio between the inter-cluster distance (i.e., between cluster separation) and intra-cluster diameter (i.e., within-cluster compactness). Larger values of D suggest good clusters, and a D larger than 1 indicates compact separated clusters (Dunn, 1974). The Connectivity measure captures the extent to which observations are placed in the same cluster as their nearest neighbors (Handl, Knowles, & Kell, 2005). The connectivity has a value between zero and ∞ and should be minimized. These internal stability measures for the two-, four-, and six-cluster solutions are reported in Table 13. As can be seen from Table 13, the two-cluster solution had the highest internal validity across the three measures, followed by the four-cluster solution. The two-cluster model was substantially better for the Connectivity measure. However, for the Dunn Index and Silhouette measures, the two-cluster model was only marginally better than the other cluster solutions. For instance, we see the two-cluster solution, compared to the four-cluster solution, is only 0.2 higher for the Silhouette measure, and 0.01 higher for the Dunn Index.

TABLE 13

Internal Validity Measures for the Two, Four, and Six Cluster Solutions

| Internal Validity Measures | Two-Cluster Model | Four-Cluster Model | Six-Cluster Model | Index Range/ Preference |
|---|---|---|---|---|
| Silhouette | .33 | .30 | .31 | Zero to one/ Higher |
| Dunn Index | .07 | .06 | .05 | Zero to ∞/ Higher |
| Connectivity | 87.72 | 196.01 | 249.55 | Zero to ∞/ Lower |

Stability is another important aspect of cluster validity. Stability means that a meaningful valid cluster should remain intact (i.e., not disappear easily) if the data set is changed in a non-essential way (Hennig, 2007). While there are different conceptions of what constitutes a "non-essential change" of a data set, a common method employed is the leave-one-column out. The stability measures compare the results from clustering based on the full data set to clustering based on removing each column, one at a time (Brock et al., 2008; Datta & Datta, 2003). In the current data set this corresponds to the removal of one of the GCA variables at a time. The stability measures are the average proportion of non-overlap (APN), the average distance (AD), the average distance between means (ADM), and the figure of merit (FOM). The APN measures the average proportion of observations not placed in the same cluster by clustering based on the full data and clustering based on the data with a single column removed. The AD measure computes the average distance between observations placed in the same cluster by clustering based on the full data and clustering based on the data with a single column removal. The ADM measure computes the average distance between cluster centers for observations placed in the same cluster by clustering based on the full data and clustering based on the data with a single column removed. The FOM measures the average intra-cluster variance of the observations in the deleted column, where the clustering is based on the remaining (undeleted) samples. This estimates the mean error using predictions based on the cluster averages (Brock et al., 2008). In all cases the average is taken over all the deleted columns, and all measures should be minimized. As seen in Table 14, the stability scores for the two-, four-, and six-cluster solutions are quite similar, with the two-, and four-cluster solution being, on average, only slightly more stable than the six-cluster model. The results from the internal validity and stability inspection showed, on average, only minimal differences between the cluster solutions. However, the two-cluster solution only categorized learners as high and low across the GCA variables (see FIG. 7). This simple dichotomous grouping is less meaningful for identifying more intricate conversational patterns of students' social roles. Therefore, the four-cluster and six-cluster solutions were chosen in moving forward.

TABLE 14

Stability Validity Measures for the Two, Four, and Six Cluster Solutions

| Stability Measures | Two-Cluster Model | Four-Cluster Model | Six-Cluster Model | Index Range |
|---|---|---|---|---|
| Average proportion of non-overlap (APN) | .14 | .18 | .22 | Zero to one |
| Average Distance (AD) | 1.31 | 1.07 | .97 | Zero to ∞ |
| Average Distance between means (ADM) | .23 | .26 | .31 | Zero to ∞ |
| Figure of merit (FOM) | .40 | .38 | .37 | Zero to ∞ |

Cluster Coherence

It is important to evaluate the coherence of the clusters from a statistical analysis of the GCA variables involved in their partitioning. Consequently, the four- and six-cluster models were further evaluated to determine whether learners in the cluster groups significantly differed from each other on the six GCA variables. The multivariate skewness and kurtosis were investigated using the R package MVN (Korkmaz, Goksuluk, & Zararsiz, 2015) which produces the chi-square Q-Q plot (see Appendix G) and a test statistic Henze-Zirkler (HZ) which assesses whether the dataset follows an expected multivariate normal distribution. The results indicated the GCA variables did not follow a normal distribution, HZ=5.06, p<0.05. Therefore, a permutational MANOVA (or nonparametric MANOVA) was used to test the effect of the four and six-cluster models on the GCA variables. The permutational MANOVA, implemented in the *Adonis* routine of the VEGAN package in R (Oksanen et al., 2016), is a robust alternative to both parametric MANOVA and to ordination methods for describing how variation is attributed to different experimental treatments or, in this case, cluster partitions (Anderson, 2001). The *Adonis* test showed a significant main effect of cluster for the four-cluster model, $F(3,714)=392.21$, 0.001, and six-cluster model, $F(5,712)=350.86$, $p<0.001$. These results support the models' formation and ability to organize learners based on differences in their collaborative communication profiles.

The analyses proceeded with ANOVAs followed by Tukey's post hoc comparisons to characterize learners' patterns by identifying significant differences in participants' scores on the six GCA variables between the clusters. Levene's Test of Equality of Error Variances was violated for all the GCA variables so a more stringent alpha level (p<0.01) was used when identifying significant differences for these variables (Tabachnick & Fidell, 2007, p. 86). The ANOVA main effect F-values along with the means and standard deviations for the GCA variables across each cluster are reported in Table 15 for the four-cluster model, and Table 16 for the six-cluster model. The ANOVA revealed significant differences among clusters for all of the six GCA variables at the p<0.0001 level for both the four and six-cluster models. Tukey's HSD post hoc comparisons for the four and six-cluster models are presented in Table 17 and Table 18, respectively. As seen in Table 17 and Table 18, the post hoc comparisons confirmed that the observed differences in GCA profiles across the clusters were, for the majority, significantly distinct in both models. In the next phase of the analysis, the four and six-cluster models were further examined to determine external validity

TABLE 17

Tukey-HSD P-Values for the Pairwise Comparisons for the GCA Measures Across the Four-Cluster Solution

| Four-Cluster Comparison | GCA Variables | | | | | |
|---|---|---|---|---|---|---|
| | Participation | Social Impact | Overall Responsivity | Internal Cohesion | Newness | Communication Density |
| 2 vs. 1 | p < .001 | p = .98 | p = .69 | p = .97 | p < .001 | p < .001 |
| 3 vs. 1 | p = .22 | p < .001 | p < .001 | p < .001 | p = .65 | p < .05 |
| 4 vs. 1 | p < .001 | p < .001 | p < .001 | p < .001 | p < .001 | p < .001 |
| 3 vs. 2 | p < .001 | p < .001 | p < .001 | p < .001 | p < .001 | p = .04 |
| 4 vs. 2 | p < .001 | p < .001 | p < .001 | p < .001 | p = .99 | p = .85 |
| 4 vs. 3 | p < .001 | p = .15 | p = .81 | p < .001 | p < .001 | p < .001 |

TABLE 15

Four-cluster Model Means and Standard Deviations for the 6 GCA Variables

| GCA Measures | Cluster 1: Driver n = 154 M (SD) | Cluster 2: Task-Leader n = 182 M (SD) | Cluster 3: Over-rider n = 171 M (SD) | Cluster 4: Lurker n = 211 M (SD) | F-value |
|---|---|---|---|---|---|
| Participation | 0.57 (0.26) | −0.49 (0.3) | 0.57 (0.29) | −0.64 (0.27) | 440.30*** |
| Social Impact | 0.55 (0.3) | 0.52 (0.35) | −0.47 (0.31) | −0.48 (0.38) | 282.70*** |
| Overall Responsivity | 0.40 (0.39) | 0.44 (0.37) | −0.45 (0.32) | −0.39 (0.44) | 173.80*** |
| Internal Cohesion | 0.42 (0.31) | 0.31 (0.47) | −0.21 (0.41) | −0.47 (0.41) | 130.90*** |
| Newness | −0.11 (0.14) | −0.29 (0.13) | −0.12 (0.14) | −0.3 (0.14) | 27.09*** |
| Communication Density | −0.14 (0.16) | −0.3 (0.13) | −0.1 (0.14) | −0.26 (0.15) | 25.06*** |

Note:
ANOVA df = 3,714;
***p < .0001

TABLE 16

Six-cluster Model Means and Standard Deviations for the Six GCA Variables

| GCA Measures | Cluster 1: Over-rider n = 143 M(SD) | Cluster 2: Driver n = 153 M(SD) | Cluster 3: Follower n = 88 M(SD) | Cluster 4: Lurker n = 117 M(SD) | Cluster 5: Detached n = 91 M(SD) | Cluster 6: Task-Leader n = 126 M(SD) | F-value |
|---|---|---|---|---|---|---|---|
| Participation | 0.64 (0.23) | 0.60 (0.24) | −0.66 (0.28) | −0.63 (0.27) | −0.37 (0.36) | −0.44 (0.32) | 285.70*** |
| Social Impact | −0.50 (0.31) | 0.51 (0.33) | 0.15 (0.47) | −0.66 (0.23) | −0.29 (0.39) | 0.63 (0.25) | 200.50*** |
| Overall Responsivity | −0.48 (0.31) | 0.38 (0.38) | 0.21 (0.46) | −0.61 (0.24) | −0.28 (0.36) | 0.56 (0.28) | 157.70*** |
| Internal Cohesion | −0.30 (0.37) | 0.39 (0.31) | −0.59 (0.21) | −0.65 (0.17) | 0.29 (0.31) | 0.55 (0.23) | 210.30*** |
| Newness | −0.12 (0.14) | −0.10 (0.14) | −0.31 (0.14) | −0.30 (0.13) | −0.25 (0.15) | −0.28 (0.12) | 15.83*** |
| Communication Density | −0.09 (0.14) | −0.13 (0.16) | −0.29 (0.15) | −0.26 (0.15) | −0.23 (0.16) | −0.31 (0.12) | 15.01*** |

Note:
ANOVA df = 5.712;
***p < .0001

TABLE 18

Tukey-HSD P-Values for the Pairwise Comparisons for the GCA Measures Across the Six-Cluster Solution

| Six-Cluster Comparison | GCA Variables | | | | | |
|---|---|---|---|---|---|---|
| | Participation | Social Impact | Overall Responsivity | Internal Cohesion | Newness | Communication Density |
| 2 vs. 1 | p = .04 | p < .001 | p < .001 | p < .001 | p = .83 | p = .06 |
| 3 vs. 1 | p < .001 | p < .001 | p < .001 | p < .001 | p < .001 | p < .001 |
| 4 vs. 1 | p < .001 | p < .001 | p < .001 | p < .001 | p < .001 | p < .001 |
| 5 vs. 1 | p < .001 | p = .008 | p = .05 | p < .001 | p < .001 | p < .001 |
| 6 vs. 1 | p < .001 | p < .001 | p < .001 | p < .001 | p < .001 | p < .001 |
| 3 vs. 2 | p < .001 | p < .001 | p = .66 | p < .001 | p < .001 | p < .01 |
| 4 vs. 2 | p < .001 | p < .001 | p < .001 | p < .001 | p < .001 | p < .01 |
| 5 vs. 2 | p < .001 | p < .001 | p < .001 | p = .58 | p < .05 | p < .001 |
| 6 vs. 2 | p < .001 | p = .07 | p < .001 | p < .001 | p < .001 | p < .001 |
| 4 vs. 3 | p = .93 | p < .001 | p < .001 | p = .99 | p = 1.00 | p = .99 |
| 5 vs. 3 | p < .001 | p < .001 | p < .001 | p < .001 | p = .56 | p = .50 |
| 6 vs. 3 | p < .001 | p < .001 | p < .001 | p < .001 | p = .99 | p = 1.00 |
| 5 vs. 4 | p < .001 | p < .001 | p < .001 | p < .001 | p = .61 | p = .78 |
| 6 vs. 4 | p < .001 | p < .001 | p < .001 | p < .001 | p = 1.00 | p = .98 |
| 6 vs. 5 | p = .99 | p < .001 | p < .001 | p < .001 | p = .72 | p = .37 |

Model Generalizability

Internal generalizability. When performing unsupervised cluster analyses, it is important to know whether the cluster results generalize (e.g., Research Question 2a). In the current dissertation, a bootstrapping and replication methodology approach was adopted to see if the observed clusters generalize meaningfully to unseen data (Dalton, Ballarin, & Brun, 2009; Everitt, Landau, Leese, & Stahl, 2011). First, the internal generalizability was evaluated for the four- and six-cluster models from the Traditional CSCL dataset. Specifically, a bootstrapping approach was used to assess the prediction strength of the training data, and then a replication model was used to evaluate whether the training data cluster centers can predict the ones in the testing data. If the four- and six-cluster structure found using k-means clustering is appropriate for the Traditional CSCL data, then the prediction for the test dataset, and a clustering solution created independently for the test dataset, should match closely.

The prediction strength of the training data was explored using the clusterboot function in the R package fpc (Hennig, 2015). This approach uses a bootstrap resampling scheme to evaluate the prediction strength of a given cluster. The algorithm uses the Jaccard coefficient, a similarity measure between sets. The Jaccard similarity between two sets Y and X is the ratio of the number of elements in the intersection of Y and X over the number of elements in the union of Y and X. The cluster prediction strength and stability of each cluster in the original four and six-cluster models is the mean value of its Jaccard coefficient over all the bootstrap iterations. As a rule of thumb, clusters with a value less than 0.6 should be considered unstable. Values between 0.6 and 0.75 indicate that the cluster is measuring a pattern in the data, but there is not high certainty about which points should be clustered together. Clusters with values above about 0.85 can be considered highly stable and have high prediction strength (Zumel, Mount, & Porzak, 2014). The prediction strength of the Traditional CSCL training data was evaluated using 100 bootstrap resampling iterations.

Figure 10:
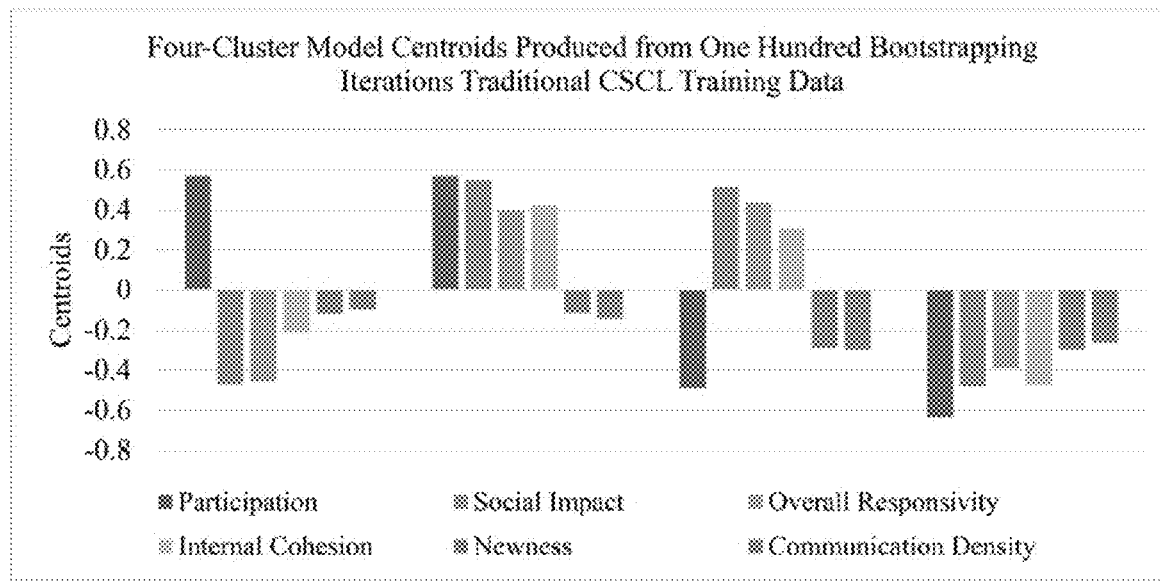
FIG. 10 shows a final four-cluster pattern produced by 100 bootstrap resampling iterations for traditional CSCL training data, under an embodiment. The pattern shown in FIG. 10 is identical to the original k-means four-cluster model pattern depicted in FIG. 8.
Figure 11:
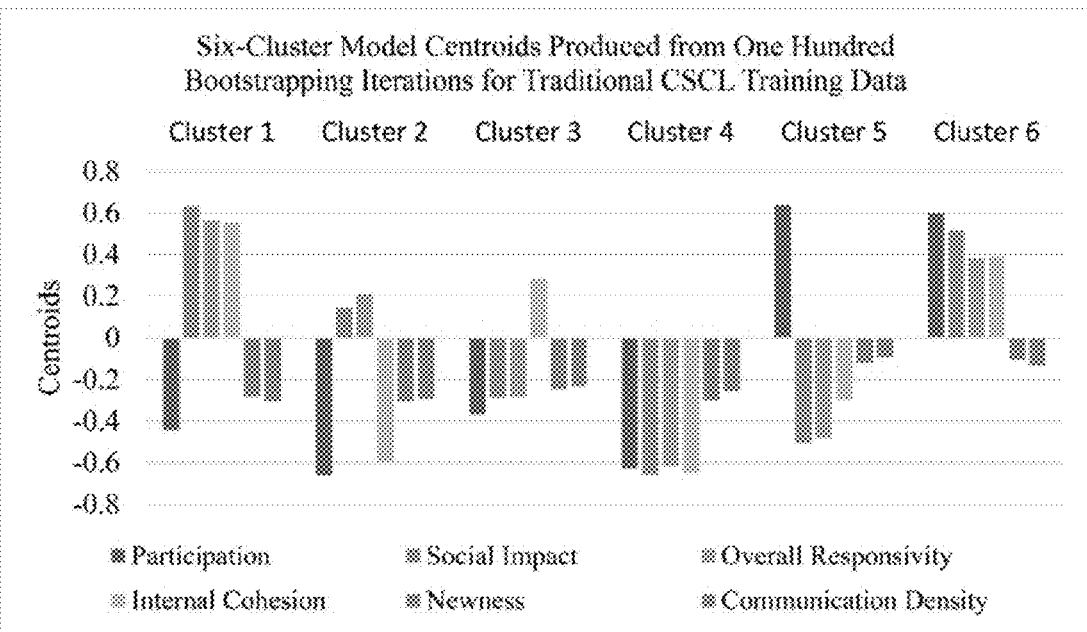
FIG. 11 shows a final six-cluster pattern produced by 100 bootstrap resampling iterations for traditional CSCL training data. The pattern shown in FIG. 11 is identical to the original k-means six-cluster model pattern depicted in FIG. 9.

The final cluster pattern produced by the 100 bootstrap resampling iterations for the four and six-cluster model are reported in FIG. 10 and FIG. 11, respectively. As seen in the figures, the observed pattern for both models was identical to the original k-means four and six-cluster models, albeit with a different ordering of the clusters. The ordering of clusters in the k-means algorithm is arbitrary so the pattern of the GCA variables within each cluster is of most importance. The Jaccard's similarity values showed very strong prediction for all four clusters in the four-cluster model with 0.92, 0.93, 0.94, and 0.95, for clusters 1-4, respectively. Similar results were also observed for the six-cluster models' Jaccard's similarity values with 0.96, 0.95, 0.91, 0.96, 0.91, and 0.96 for clusters 1-6, respectively.

Figure 12:
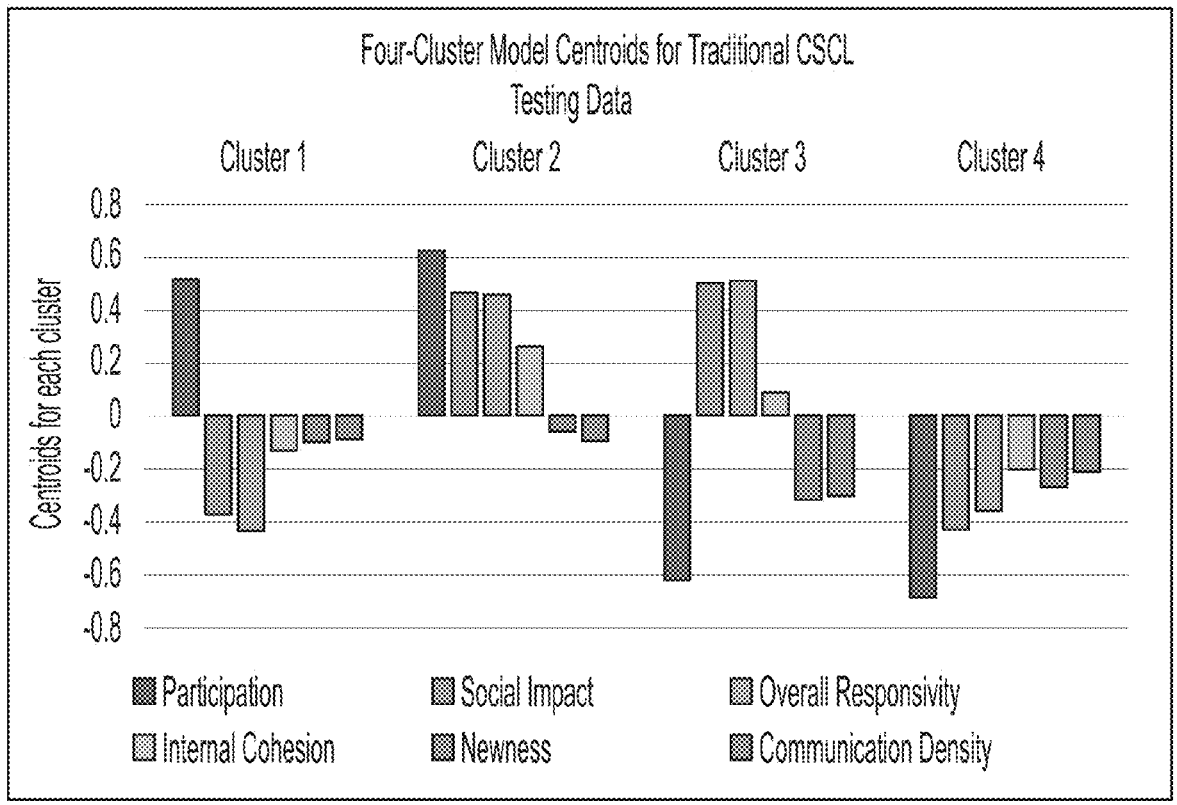
FIG. 12 shows traditional CSCL testing data centroids for a four-cluster solution across GCA variables, under an embodiment.
Figure 13:
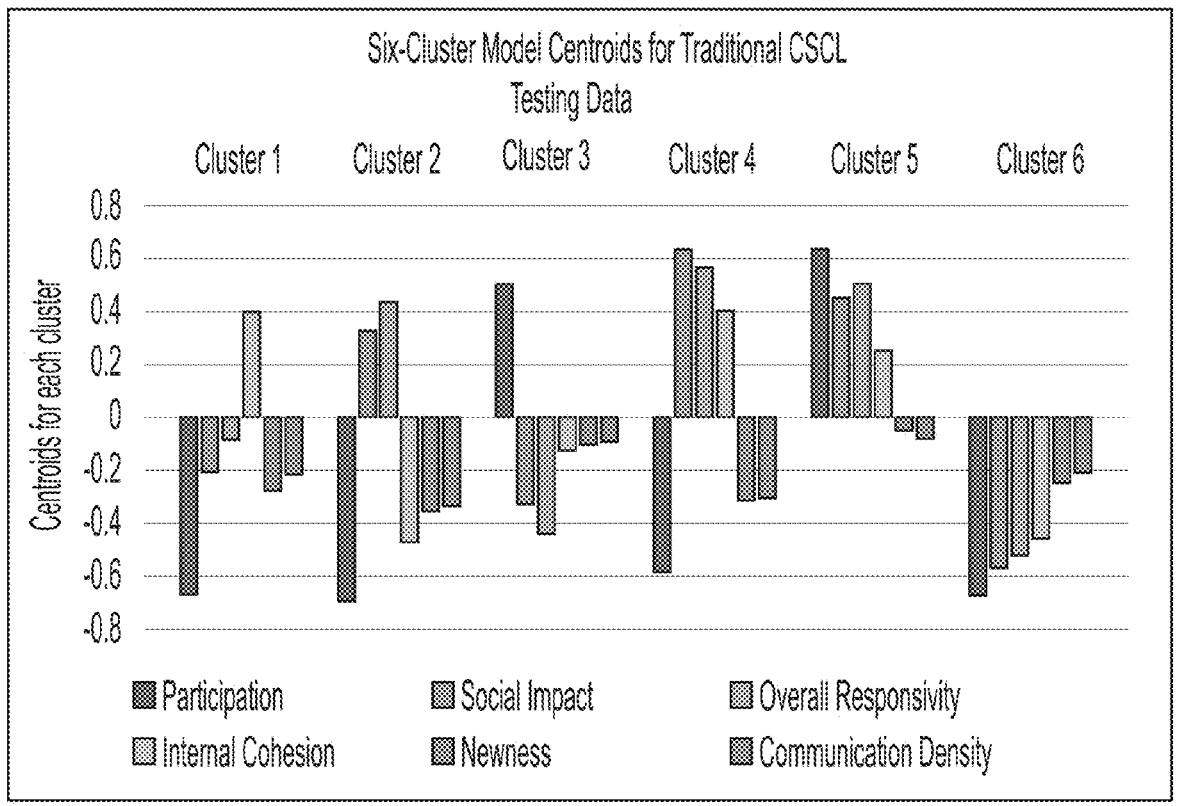
FIG. 13 shows traditional CSCL testing data centroids for a six-cluster solution across GCA variables, under an embodiment.

The next analyses focus on evaluating the generalizability of the observed clusters in the training data to the testing data. First, four- and six-cluster k-means analyses were performed on the held out Traditional CSCL test data (N=136). Descriptive statistics for the GCA variables are reported below in Table 19. The centroids for the four- and six-cluster k-means solution for the Traditional CSCL test data are illustrated in FIG. 12 and FIG. 13, respectively. The observed pattern of the four- and six-cluster solution for the testing data appears, at least visually, similar to the one observed on the training data.

TABLE 19

Descriptive Statistics for GCA Measures in the Traditional CSCL Testing Data Set

| Measure | Minimum | Median | M | SD | Maximum |
|---|---|---|---|---|---|
| Participation | −0.23 | −0.01 | 0.00 | 0.10 | 0.30 |
| Social Impact | −0.01 | 0.18 | 0.18 | 0.05 | 0.33 |
| Overall Responsivity | 0.00 | 0.18 | 0.18 | 0.05 | 0.41 |
| Internal Cohesion | 0.00 | 0.20 | 0.19 | 0.11 | 1.00 |
| Newness | 0.05 | 0.49 | 0.72 | 1.06 | 11.04 |
| Communication Density | 0.01 | 0.21 | 0.32 | 0.49 | 5.23 |

Note.
Mean (M);
Standard deviation (SD);
N = 136.

The next analyses focus on quantifying the observed overlap between the testing and training cluster analyses. Specifically, the cluster centers from the training data set were used to predict the clusters in the test data for both the four- and six-cluster models. This analysis was performed using the cl_predict function in the R clue package (Hornik & Böhm, 2016). Cross-tabulation of the predicted and actual cluster assignments for the Traditional CSCL testing data set are reported in Table 20 for the four-cluster model, and Table 21 for the six-cluster model. The rows in both tables correspond to the clusters specified by the k-means clustering on the testing data and the columns correspond to the predicted cluster membership by the training data. In a perfect prediction, large values would lie along the diagonal, with zeroes off the diagonal; that would indicate that all samples that belong to cluster 1 were predicted by the training data as belonging to cluster 1, and so forth. The form of this table can give you considerable insight into which clusters are reliably predicted. It can also show which groups are likely to be confused and which types of misclassification are more common than others. However, in this case we observed an almost perfect prediction in both the four and six-cluster model, with few exceptions.

TABLE 20

Cross-tabulation of the Predicted and Actual Cluster Assignments for the Four-Cluster Model on Traditional CSCL Testing Data Set

| Testing Clusters | Training Predicted Clusters | | | |
|---|---|---|---|---|
| | Cluster 1 | Cluster 2 | Cluster 3 | Cluster 4 |
| Cluster 1 | 35 | 0 | 0 | 0 |
| Cluster 2 | 1 | 29 | 0 | 0 |
| Cluster 3 | 0 | 2 | 33 | 5 |
| Cluster 4 | 0 | 0 | 1 | 30 |

TABLE 21

Cross-tabulation of the Predicted and Actual Cluster Assignments for the Six-Cluster Model on Traditional CSCL Testing Data Set

| Testing Clusters | Training Predicted Clusters | | | | | |
|---|---|---|---|---|---|---|
| | Cluster 1 | Cluster 2 | Cluster 3 | Cluster 4 | Cluster 5 | Cluster 6 |
| Cluster 1 | 32 | 0 | 0 | 0 | 0 | 0 |
| Cluster 2 | 2 | 29 | 0 | 0 | 0 | 0 |
| Cluster 3 | 0 | 0 | 15 | 2 | 1 | 0 |
| Cluster 4 | 0 | 0 | 0 | 18 | 0 | 0 |
| Cluster 5 | 4 | 0 | 0 | 1 | 13 | 0 |
| Cluster 6 | 0 | 0 | 0 | 0 | 0 | 19 |

Two measures were used to evaluate the predictive accuracy of the four and six-cluster models on the Traditional CSCL training clusters: Adjusted Rand Index (ARI) and a measure of effect size (Cramer V) for the cluster cross-tabulation. ARI computes the proportion, of the total of ($_2''$) object pairs, that agree; that is, are either (i) in the same cluster according to partition 1 and the same cluster according to partition 2 or (ii) in different clusters according to 1 and in different clusters according to 2. The ARI addresses some of the limitations of the original rand index by providing a conservative measure which penalizes for any randomness in the overlap (Hubert & Arabie, 1985). The ARI was calculated between: (a) the test data clustering membership and (b) the predicted cluster membership given by the training data. The predictive accuracy of the training data is considered good if it is highly similar to the actual testing data cluster membership. The degree of association between the membership assignments of the predicted and actual cluster solutions was ARI=0.83 for the four-cluster model, and ARI=0.84 for the six-cluster model. ARI values range from 0 to 1, with higher index values indicating more agreement between sets. The measure of effect size for the cross-tabulation revealed Cramer V=0.92 for both models, which is considered very strong association (Kotrlik, Williams, & Jabor, 2011). Given these results, the four- and six-cluster solutions were judged to be robust and well supported by the data.

Figure 14:
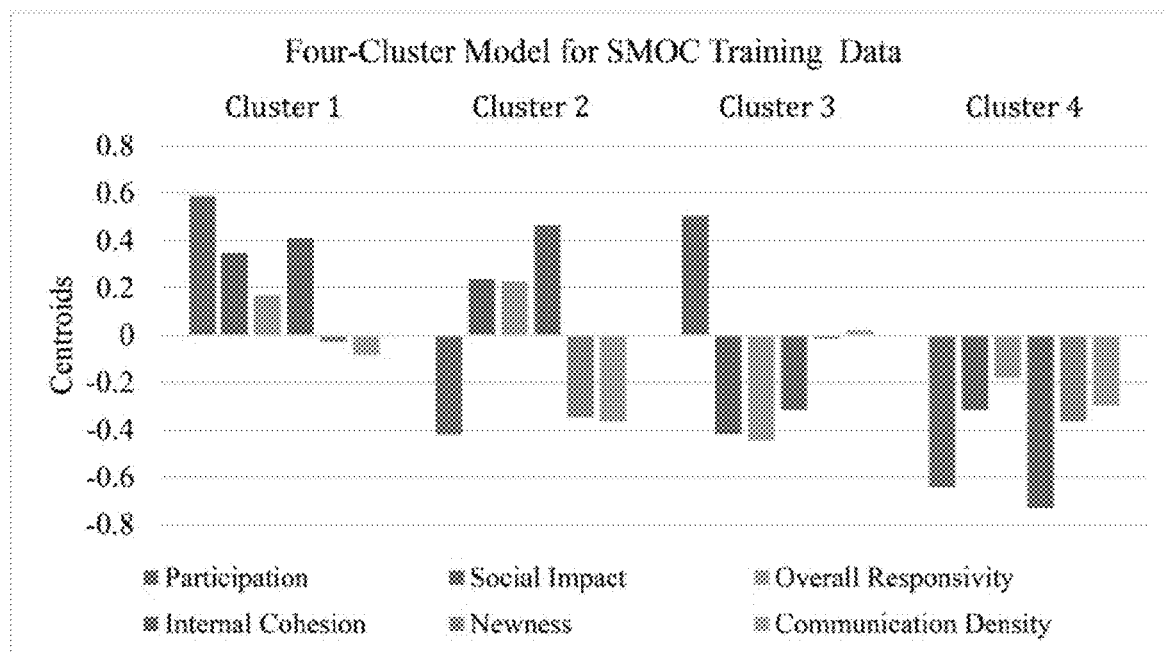
FIG. 14 shows SMOC training data centroids for a four-cluster solution across GCA variables, under an embodiment.
Figure 15:
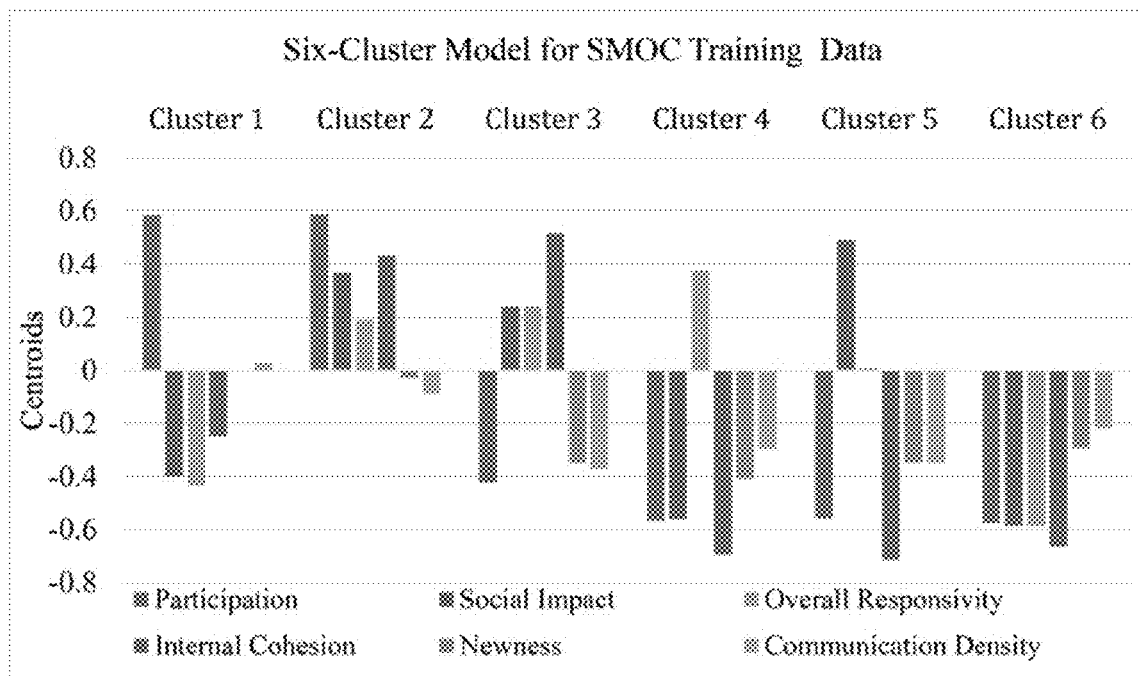
FIG. 15 shows SMOC training data centroids for a six-cluster solution across GCA variables, under an embodiment.
Figure 16:
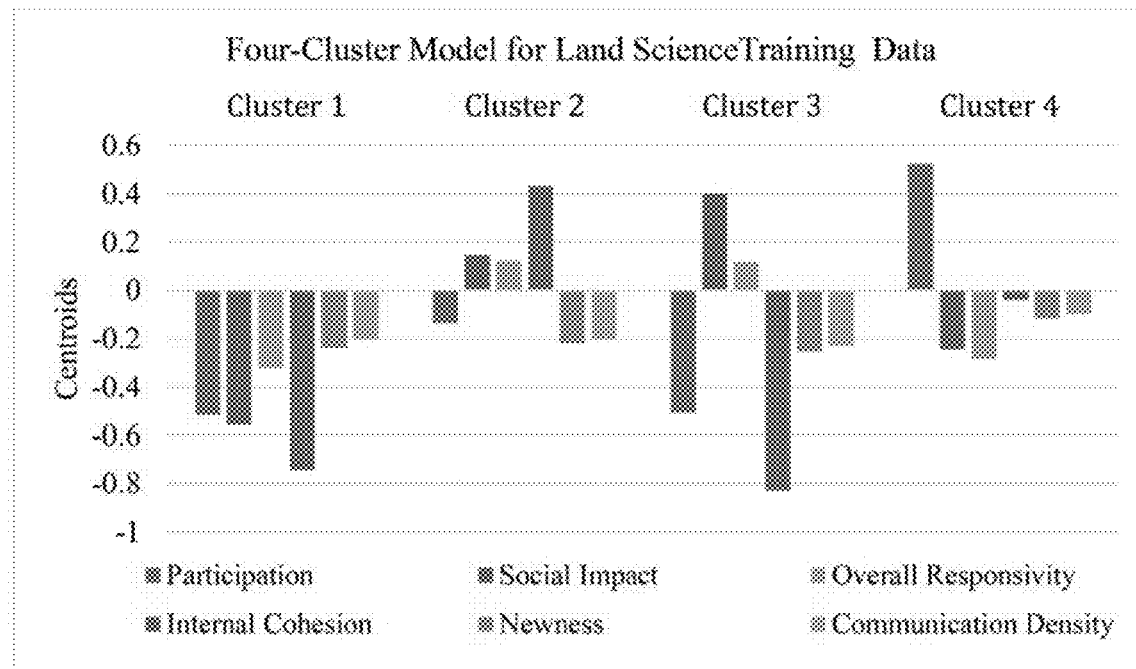
FIG. 16 shows land science training data centroids for a four-cluster solution across GCA variables, under an embodiment.
Figure 17:
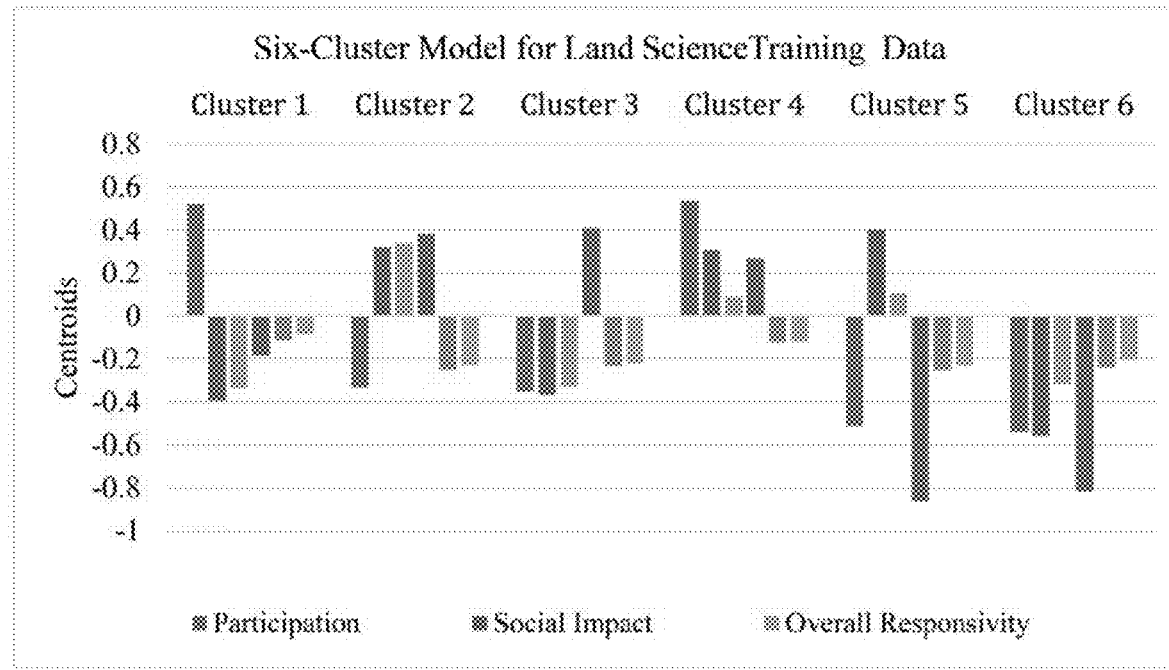
FIG. 17 show land science training data centroids for a six-cluster solution across the GCA variable, under an embodiment.

A similar replication approach was adopted to evaluate the generalizability within the SMOC and Land Science data sets. Descriptive statistics for the GCA measures in the SMOC training (N=9,463)/testing (N=2,378) and Land Science training (N=2,837)/testing (N=695) data sets are presented in Table 22. First, a four- and six-cluster model was constructed on the SMOC and Land Science training data sets. The pattern of the four- and six-cluster models are depicted in FIG. 14 and FIG. 15 for the SMOC training data set, and FIG. 16 and FIG. 17 for the Land Science training data set.

TABLE 22

Descriptive Statistics for GCA Measures in the SMOC & Land Science Training and Testing Data Sets

| Measure | Min | | Med | | M | | SD | | Max | |
|---|---|---|---|---|---|---|---|---|---|---|
| | Train | Test | Train | Test | Train | Test | Train | Test | Train | Test |
| SMOC Data sets | | | | | | | | | | |
| Participation | −0.44 | −0.49 | 0.00 | 0.00 | 0.00 | 0.00 | 0.11 | 0.11 | 0.45 | 0.42 |
| Social Impact | −0.14 | −0.05 | 0.15 | 0.15 | 0.16 | 0.16 | 0.10 | 0.10 | 1.00 | 1.00 |
| Overall Responsivity | −0.30 | −0.04 | 0.15 | 0.15 | 0.16 | 0.16 | 0.11 | 0.11 | 1.00 | 1.00 |
| Internal Cohesion | −0.43 | −0.17 | 0.12 | 0.12 | 0.13 | 0.14 | 0.12 | 0.12 | 1.00 | 1.00 |

TABLE 22-continued

Descriptive Statistics for GCA Measures in the SMOC & Land Science Training and Testing Data Sets

| Measure | Min | | Med | | M | | SD | | Max | |
|---|---|---|---|---|---|---|---|---|---|---|
| | Train | Test | Train | Test | Train | Test | Train | Test | Train | Test |
| Newness | 0.00 | 0.00 | 0.65 | 0.65 | 0.84 | 0.83 | 0.83 | 0.76 | 17.39 | 7.73 |
| Communication Density | 0.00 | 0.00 | 0.19 | 0.19 | 0.26 | 0.26 | 0.30 | 0.26 | 10.56 | 3.32 |
| Land Science Data sets | | | | | | | | | | |
| Participation | −0.50 | −0.49 | −0.01 | −0.03 | 0.00 | 0.00 | 0.14 | 0.15 | 0.78 | 0.49 |
| Social Impact | −0.10 | −0.05 | 0.12 | 0.12 | 0.13 | 0.12 | 0.09 | 0.08 | 0.90 | 0.74 |
| Overall Responsivity | −0.12 | −0.04 | 0.11 | 0.11 | 0.13 | 0.12 | 0.10 | 0.09 | 1.00 | 1.00 |
| Internal Cohesion | −0.21 | −0.17 | 0.11 | 0.11 | 0.13 | 0.12 | 0.13 | 0.12 | 1.00 | 1.00 |
| Newness | 0.00 | 0.00 | 0.60 | 0.59 | 1.10 | 1.11 | 2.33 | 2.15 | 70.27 | 27.39 |
| Communication Density | 0.00 | 0.00 | 0.18 | 0.18 | 0.38 | 0.36 | 0.94 | 0.72 | 31.27 | 10.45 |

Note.
Mean (M).
Standard deviation (SD).

The analysis proceeded by evaluating the internal generalizability for the SMOC and Land Science data sets separately. This analysis was performed by using the cluster centers from the SMOC and Land Science training data sets to predict the clusters in the test data for both the four- and six-cluster model. These analyses were also performed using the cl_predict function in the R clue package (Hornik & Böhm, 2016). Cross-tabulation of the predicted and actual cluster assignments for the SMOC and Land Science testing data set are reported in Table 23 and Table 24 for the four-cluster model, and Tables 25 and Table 26 for the six-cluster model, respectively. We see from these tables that there appears to be more agreement for the predicted cluster assignments in the six-cluster models, than the four-cluster models for both datasets. We can quantify the agreement using the ARI and Cramer V provided by the flexclust package. A comparison of the ARI and Cramer V measures for the four- and six-cluster model is presented in Table 27. Again, the ARI values range from 0 to 1, with higher index values indicating more agreement between sets. As seen in Table 27, the six-cluster model exhibited slightly higher predictive agreement between the training and testing data cluster assignments when compared to the four-cluster model. Further, the Cramer V measure revealed a slightly stronger effect size for the six-cluster model cross-tabulation (see Table 27). Taken together, the four and six-cluster solutions were judged to be supported by both the SMOC and Land Science collaborative interaction data, with the six-cluster model being only minimally better.

TABLE 23

Cross-tabulation of the Four-Cluster Model Predicted and Actual Cluster Assignments for the SMOC Testing Data Set

| Testing Clusters | Predicted Clusters | | | |
|---|---|---|---|---|
| | Cluster 1 | Cluster 2 | Cluster 3 | Cluster 4 |
| Cluster 1 | 586 | 29 | 0 | 0 |
| Cluster 2 | 4 | 636 | 0 | 74 |
| Cluster 3 | 7 | 0 | 484 | 10 |
| Cluster 4 | 3 | 24 | 14 | 507 |

TABLE 24

Cross-tabulation of the Four-Cluster Model Predicted and Actual Cluster Assignments for the Land Science Testing Data Set

| Testing Clusters | Predicted Clusters | | | |
|---|---|---|---|---|
| | Cluster 1 | Cluster 2 | Cluster 3 | Cluster 4 |
| Cluster 1 | 198 | 7 | 3 | 1 |
| Cluster 2 | 0 | 142 | 9 | 2 |
| Cluster 3 | 49 | 0 | 180 | 1 |
| Cluster 4 | 0 | 0 | 2 | 101 |

TABLE 25

Cross-tabulation of the Six-Cluster Model Predicted and Actual Cluster Assignments for the SMOC Testing Data Set

| Testing Clusters | Predicted Clusters | | | | | |
|---|---|---|---|---|---|---|
| | Cluster 1 | Cluster 2 | Cluster 3 | Cluster 4 | Cluster 3 | Cluster 5 |
| Cluster 1 | 517 | 17 | 4 | 0 | 1 | 15 |
| Cluster 2 | 0 | 469 | 14 | 0 | 0 | 0 |
| Cluster 3 | 0 | 5 | 475 | 1 | 0 | 10 |
| Cluster 4 | 1 | 0 | 1 | 208 | 0 | 4 |
| Cluster 5 | 0 | 0 | 6 | 6 | 198 | 0 |
| Cluster 6 | 1 | 0 | 0 | 3 | 7 | 415 |

TABLE 26

Cross-tabulation of the Six-Cluster Model Predicted and Actual Cluster Assignments for the Land Science Testing Data Set

| Testing Clusters | Predicted Clusters | | | | | |
|---|---|---|---|---|---|---|
| | Cluster 1 | Cluster 2 | Cluster 3 | Cluster 4 | Cluster 3 | Cluster 5 |
| Cluster 1 | 137 | 0 | 0 | 0 | 1 | 1 |
| Cluster 2 | 0 | 90 | 3 | 9 | 4 | 0 |
| Cluster 3 | 1 | 12 | 81 | 0 | 0 | 0 |
| Cluster 4 | 11 | 0 | 2 | 106 | 0 | 0 |

TABLE 26-continued

Cross-tabulation of the Six-Cluster Model Predicted and Actual Cluster Assignments for the Land Science Testing Data Set

| Testing Clusters | Predicted Clusters | | | | | |
|---|---|---|---|---|---|---|
| | Cluster 1 | Cluster 2 | Cluster 3 | Cluster 4 | Cluster 3 | Cluster 5 |
| Cluster 5 | 0 | 0 | 0 | 0 | 98 | 0 |
| Cluster 6 | 0 | 0 | 0 | 0 | 1 | 138 |

TABLE 27

Internal Generalization ARI and Cramer V Results for the Computed Cross-Tabulation Tables for Four and Six-Cluster Models on SMOC and Land Science Data sets

| | SMOC | | Land Science | |
|---|---|---|---|---|
| Model | ARI | Cramer V | ARI | Cramer V |
| Four-Cluster Model | .82 | .91 | .72 | .89 |
| Six-Cluster Model | .90 | .95 | .86 | .92 |

External generalizability. The practice of predictive modeling defines the process of developing a model in a way that we can understand and quantify the model's prediction accuracy on future, yet-to-be-seen data (Kuhn & Johnson, 2013). The previous analyses provided confidence in the four and six-cluster models' ability to generalize to unseen data within the same data set. However, the systems and methods described herein evaluate how well the identified student roles (i.e., clusters) are representative of interaction patterns across various types of collaborative interactions, under an embodiment. The next analyses assess the generalizability of these clusters across the three collaborative interaction data sets (i.e., Research Question 2b). Specifically, the clusters centers from each data set were used to predict the clusters in the other training data sets, wherein all possible combinations were evaluated. Again, two measures were used to evaluate the predictive accuracy of clusters: ARI, and a measure of effect size, Cramer V, for their cross-tabulation. Table 28 shows the ARI and Cramer V results for the computed cross-tabulation evaluations of the four- and six-cluster models. The columns in Table 28 correspond to the predictor data set, while the rows correspond to the predicted data set.

The first item to take away from Table 28 is that, for the four-cluster model, the Land Science data set had the lowest predictive accuracy when both predicting the cluster assignments in the other two data sets and being predicted by them. However, the predictive accuracy among the Traditional CSCL and SMOC data sets appears to be similar, with the SMOC data set showing only slightly higher accuracy when predicting Traditional CSCL.

Table 28 shows the SMOC four-cluster model had the highest agreement predicting the cluster assignments in the Traditional CSCL and Land Science data sets, but the observed agreement was only slightly better than the Traditional CSCL. However, Land Science had the lowest agreement predicting clusters in the other two data sets, and the lowest accuracy at being predicted. These results suggest the four-cluster model does generalize to more similar collaborative interactions, but does not generalize as well to the collaborative problem solving Land Science interactions. For the six-cluster model, we see the SMOC data set has the lowest agreement predicting clusters in the Traditional CSCL and Land Science. However, Land Science had the highest agreement with predicting the Traditional CSCL, and was on par with the Traditional CSCL when predicting the SMOC dataset.

TABLE 28

ARI and Cramer V Results for Each of the Four and Six-Cluster Model Computed Cross-Tabulation Tables

| | W3 Training | | SMOC Training | | Land Science Training | |
|---|---|---|---|---|---|---|
| Model | ARI | Cramer V | ARI | Cramer V | ARI | Cramer V |
| Four-Cluster Model | | | | | | |
| W3 Training Data | — | — | .73 | .86 | .47 | .67 |
| SMOC Training Data | .70 | .83 | — | — | .49 | .66 |
| Land Science Training Data | .45 | .63 | .51 | .69 | — | — |
| Six-Cluster Model | | | | | | |
| W3 Training Data | — | — | .66 | .89 | .76 | .86 |
| SMOC Training Data | .70 | .78 | — | — | .69 | .79 |
| Land Science Training Data | .69 | .83 | .66 | .78 | — | — |

Note.
—indicates previously reported internal generalization evaluations, which are not reported here to avoid redundancy.

Discussion

This section focused on addressing some of the main questions raised in this dissertation. Specifically, we explored the extent to which characteristics of collaborative interaction discourse, as captured with the GCA, diagnostically reveal the social roles students occupy, and if the observed patterns generalize meaningfully. The findings present some practical, methodological, and conceptual implications for the educational data mining and learning analytics communities. First, as a methodological contribution, we have highlighted the rich contextual information captured by the GCA was able to identify distinct interaction patterns representative of the various roles students occupy in collaborative interactions. The automated natural language metrics that make up the GCA allow us to understand how roles are constructed and maintained through the socio-cognitive processes within an interaction. Thus, this methodological contribution is expected to provide a more objective, domain independent, and deeper exploration of the micro-level intrapersonal and interpersonal patterns associated with student roles. Moreover, as a practical contribution, a substantially larger corpus of data can be analyzed with the GCA than when humans are required to annotate the data.

The systems and methods described herein extend Strijbos and De Laat's (2010) framework with several new interaction dimensions. Interestingly, the GCA measures revealed behavioral and communication patterns of the social roles that do not entirely overlap with those observed in Strijbos and De Laat's (2010) framework. The identification of these additional roles might serve as a conceptual contribution for research focusing on understanding the social roles within multi-party communication.

For instance, only one role, the Over-rider, appeared to overlap in the four and six-cluster model for the Traditional CSCL data set. However, the other roles in both models did not appear to align with the labels suggested in Strijbos and De Laat's (2010) framework. This finding could be a product of the micro-level intrapersonal and interpersonal dynamics captured with the GCA measures.

The identified social roles (i.e., clusters) underwent stringent evaluation and validation assessments: internal criteria, stability and cluster coherence. In principle, these measures provide a fair comparison of clustering and aid researchers in determining whether a particular clustering of the data is better than an alternative clustering (Taniar, 2006). Internal criteria measures evaluated the extent to which the clustering "fits" the data set based on the actual data used for clustering. The findings suggested that the four-cluster model performed slightly better than the six-cluster model across the three internal criteria measures. The four cluster stability measures captured the extent to which the clusters remain intact (i.e., not disappear easily) when the data set is changed in a non-essential way (Hennig, 2007). The cluster stability findings showed slightly mixed results, with the four-cluster model outperforming the six-cluster model on two (i.e., Average proportion of non-overlap and Average Distance between means) of the four stability indices. However, the results for the other two stability measures, Figure of merit (FOM) and Average Distance (AD), showed similar result for both the models. Overall, this suggests a preference for the four-cluster model in terms of the stability of the clusters. The cluster coherence allowed us to see if the GCA variables involved in their extraction significantly differed across the roles to identify which variables contribute to the role distinction. The cluster coherence evaluation showed the four-cluster model exhibited more separation across the GCA measures than the six-cluster model.

The cluster models were further inspected for their ability to generalize both within and across the three data sets. The internal generalization assessment for the Traditional CSCL data showed both the four- and six-cluster model exhibited almost perfect agreement with predicting the clusters in the testing data set (see Table 20-21). However, for both the SMOC and Land Science data sets, we saw six-cluster model had higher accuracy (i.e., internal generalization), compared to the four-cluster model (see Table 27). The external generalization evaluation results for the four-cluster model showed the high accuracy between the Traditional CSCL and SMOC datasets, but very low agreement for predicting the Land Science data. This is because the pattern across the GCA measures for four-cluster model is almost identical in the SMOC and Traditional CSCL data sets. In contrast, the four clusters model in the Land Science data set only moderately aligned with the clusters in the SMOC and Traditional CSCL data sets.

As we saw, the six-cluster model does not generalize as well across the data sets. The highest predictive accuracy was observed for the Land Science data set predicting the cluster centers in the Traditional CSCL data set. The lower agreement for the six-cluster model is likely due to the lack of consistency in the clusters across the data sets. Higher agreement between the Traditional CSCL and SMOC data sets was anticipated, based on their overlap in the four-cluster model. Interestingly, this is not what was found. Instead, the additional clusters produced in the six-cluster model aligned well across the Traditional CSCL and Land Science data sets (see FIG. 13 and FIG. 17). The two additional clusters in the SMOC data set appeared to identify learners very high on responsiveness (see cluster 4 in FIG. 15), and social impact (cluster 5 in FIG. 15). Overall, the cluster internal and external generalization evaluations provided confidence in the robustness for the identified roles.

Section 8: Student Roles and Learning

The practical value of the identified social roles can be tested at multiple of levels of granularity. At a minimum, the social roles (Driver, Task-Leader, Follower, Over-rider, Lurker, and Socially Detached) should be meaningfully related to student learning gains. This would provide external validation for the identified social roles (i.e., clusters) in the four- and six-cluster models. Unlike the internal criteria explored earlier in the Detecting Student Roles section, external criteria are independent of the way the clusters are obtained. External cluster validation can be explored by either comparing the cluster solutions to some "known" categories or by comparing them to meaningful external variables, i.e. variables not used in the cluster analysis (Antonenko, Toy, & Niederhauser, 2012). In the current research, the latter approach was implemented by exploring the relationship with individual student learning and overall group performance (Research Question 3a & 3b) to determine whether the cluster membership differed relative to these meaningful variables. Specifically, usefulness of the framework for identifying learners' roles in collaborative learning is explored through two analyses of the data: (a) the influence of student roles on individual student performance, and (b) the influence of student roles on overall group performance.

The multi-level investigation conducted in the current research also addresses a frequently noted limitation found in collaborative learning research. CSCL researchers encounter issues regarding the differing units of analysis in their datasets (Janssen, Erkens, Kirschner, & Kanselaar, 2011). That is, collaborative interactions can be analyzed with the group, individual student, and interaction between students as units of analysis. For example, in the current dissertation, some variables of interest are measured at the individual learner and interaction levels (e.g., student learning gains, participation, internal cohesion, social impact, overall responsivity, newness, communication density, and social roles identified by the cluster analysis), whereas other variables are measured at the group level (e.g., group diversity, group composition, and group performance). Researchers have emphasized the need to conduct more rigorous, multi-level research (Cress, 2008; Bram De Wever, Van Deer, Schellens, & Valcke, 2007; Stahl, 2005; Suthers, 2006b). However, collaborative learning studies usually center on only one of these units of analysis (Stahl, 2013a). As a result, there is little consideration of how the two levels are connected, even though it is clear that such connections are crucially important to understanding and orchestrating learning in collaborative learning environments (Stahl, 2013a). To address this gap in the literature, a series of models were constructed to explore the influence of group level constructs on individual student level learning gains, as well as the influence of individual student level constructs on group performance. Table 29 provides an overview of the mixed-effects models exploring learning across the four- and six-cluster solutions.

TABLE 29

Overview of Mixed-Effects Models Exploring Learning across the Four- and Six Cluster Solutions

| Model Number | Dependent Variable | Level of Dependent Variable | Independent Variable | Level of Independent Variable | Random Variable(s) |
|---|---|---|---|---|---|
| 1 | Learning Gains | Student | Social Roles | Student | Student Nested in Group |
| 2 | Learning Gains | Student | Role Diversity | Group | Student Nested in Group |

TABLE 29-continued

Overview of Mixed-Effects Models Exploring Learning across the Four- and Six Cluster Solutions

| Model Number | Dependent Variable | Level of Dependent Variable | Independent Variable | Level of Independent Variable | Random Variable(s) |
|---|---|---|---|---|---|
| 3 | Performance | Group | Role Diversity | Group | Group |
| 4-6 | Learning Gains | Student | Proportional Occurrence Roles | Group | Student Nested in Group |
| 7-9 | Performance | Group | Proportional Occurrence Roles | Group | Group |

A mixed-effects modeling approach was adopted for these analyses due to the nested structure of the data (e.g., students within groups) (Pinheiro & Bates, 2000). Mixed-effects models include a combination of fixed and random effects and can be used to assess the influence of the fixed effects on dependent variables after accounting for any extraneous random effects. Multilevel modelling handles the hierarchical nesting, interdependency, and unit of analysis problems that are inherent in collaborative learning data. They are the most appropriate technique for investigating data in CSCL-environments (De Wever et al., 2007; Janssen et al., 2011).

In addition to constructing the fixed effects models, null models with the random effects (learner and group or group) but no fixed effects were also constructed. A comparison of the null random-effects only model with the fixed-effect models allows us to determine whether social roles and communication patterns predict student and group performance above and beyond the individual student and group characteristics. Akaike Information Criterion (AIC), Log Likelihood (LL) and a likelihood ratio test were used to determine the best fitting and most parsimonious model. Additionally, the effect sizes for each model were estimated using a pseudo $R^2$ method, as suggested by Nakagawa and Schielzeth (Nakagawa & Schielzeth, 2013). For mixed-effects models, $R^2$ can be characterized into two varieties: marginal $R^2$ and conditional $R^2$. Marginal $R^2$ is associated with variance explained by fixed factors, whereas conditional $R^2$ can be interpreted as the variance explained by the entire model, namely random and fixed factors. Both marginal ($R^2_m$) and conditional ($R^2$) $R^2$ convey unique and relevant information regarding the model fit and variance explained, so both are reported. The nlme package in R (Pinheiro et al., 2016) was used to perform all the required computations. All analyses are on the Traditional CSCL dataset because it was the base corpus for the cluster analyses and it has the most consistent individual and group performance measures.

Influence of Student Roles on Individual Student Performance

First, the relationship between learners' roles and performance in the collaborative learning environment was assessed for both the four- and six-cluster models. A performance score was obtained for each student by calculating their proportional learning gains, formulated as [% Posttest–% Pretest]/[1–% Pretest] (Hake, 1998). Correlations between learning gains and the six GCA variables in the Traditional CSCL data set are reported in Table 30.

TABLE 30

Correlations between Learning and GCA Variables in the Traditional CSCL Data Set

| | Learning Gains | Participation | Social Impact | Overall Responsivity | Internal Cohesion | Newness |
|---|---|---|---|---|---|---|
| Participation | 0.10** | | | | | |
| Social Impact | 0.10* | 0.07 | | | | |
| Overall Responsivity | 0.10* | −0.01 | 0.69*** | | | |
| Internal Cohesion | 0.13*** | 0.21*** | 0.57*** | 0.52*** | | |
| Newness | 0.06 | 0.62*** | 0.05 | −0.03 | 0.11** | |
| Communication Density | 0.04 | 0.54*** | −0.11*** | −0.18*** | −0.05 | 0.91*** |

Note.
***p < .001.
**p < .01.
*p < .05.

As discussed earlier, two linear mixed-effects models were constructed: (a) the full model with learning gains as the dependent variable, social roles as independent variables, and student nested within group as the random effects, and (b) the null model with random effects only and no fixed effects. The likelihood ratio tests indicated that both the Four-Cluster model with $\chi^2(3)=14.93$, p=0.001, $R^2_m=0.02$, $R^2_c=0.95$, and the six-cluster model with $\chi^2(5)=11.55$, p=0.04, $R^2_m=0.02$, $R^2_c=0.95$ yielded a significantly better fit than the null model. A number of conclusions can be drawn from this initial model fit evaluation and inspection of $R^2$ variance. First, the model comparisons (between null and full models) imply that the roles in both the four and six-cluster models were able to add a significant improvement in predicting the learners' performance above and beyond individual participant and group characteristics. Second, for both the four and six-cluster model, social roles, individual participant, and group features explained about 95% of the predictable variance, with 2% of the variance being accounted for by the social roles.

The social roles that were predictive of individual student learning performance for the four-Cluster model and six-cluster model are presented in Table 31 and Table 32, respectively. The reference group for both analyses was the Driver role, meaning that the learning gains for the other roles are compared against the Driver reference group. As can be seen from Table 31, three of the four social roles showed significant differences in student learning gains, as compared to the Driver role. Similar results were observed across the Six-cluster model (Table 32), which showed four of the six roles exhibited significant differences in student learning gains, again as compared to the Driver role. In both models, learners who took on more socially responsible, collaborative roles, such as Driver, performed significantly better than students who occupied the less socially engaged roles, like Lurker, and Over-rider. There was not significant difference between the performance of the Drivers and Task-Leader, suggesting these are the more successful roles in terms of student learning gains.

It is important to note that the observed difference in learning gains across the social roles is not a result of the students simply being more prolific because Task-Leaders and Socially Detached learners performed on par with the Drivers, but were among of the lower participators in the group. The profile for the Socially Detached learners showed mid-range values for responsivity and social impact, compared to their internal cohesion scores. However, the Task-Leaders profile illustrated that when they did make contributions it was very responsive to the other group members (i.e., high responsivity), semantically connected with their previous contributions (i.e., higher internal cohesion). Further, their contributions were seen as relevant by other members and warranted further follow up by their peers (i.e., high social impact). These findings reflected a more substantive difference in social awareness and engagement for the Drivers and Task-Leaders, compared to the Over-riders, beyond the surface level mechanism of simply participating often. Taken together, these discoveries show that not only are the identified roles related to learning in general, but the relationship is theoretically meaningful, which provides external validity.

TABLE 31

Descriptive Statistics for Student Learning Gains Across Four Roles and Mixed-Effects Model Coefficients for Predicting Differences in Individual Student Performance Across Clusters

| | Four-Cluster Model | | | |
|---|---|---|---|---|
| Role | M | SD | β | SE |
| Driver | 0.24 | 0.85 | 0.24*** | 0.07 |
| Task-Leader | 0.09 | 0.85 | −0.15 | 0.09 |
| Over-rider | −0.02 | 0.87 | −0.26** | 0.10 |
| Lurker | −0.10 | 0.85 | −0.33*** | 0.09 |

Note.
* $p < .05$.
** $p < .01$.
*** $p < .001$.
Mean (M).
Standard deviation (SD).
Fixed effect coefficient (β).
Standard error (SE).

TABLE 32

Descriptive Statistics for Student Learning Gains Across Six Roles and Mixed-Effects Model Coefficients for Predicting Differences in Individual Student Performance Across Clusters

| | Six-Cluster Model | | | |
|---|---|---|---|---|
| Role | M | SD | β | SE |
| Driver | 0.21 | 0.89 | 0.21** | 0.07 |
| Over-rider | 0.02 | 0.88 | −0.19* | 0.10 |
| Lurker | −0.11 | 0.79 | −0.32** | 0.11 |

TABLE 32-continued

Descriptive Statistics for Student Learning Gains Across Six Roles and Mixed-Effects Model Coefficients for Predicting Differences in Individual Student Performance Across Clusters

| | Six-Cluster Model | | | |
|---|---|---|---|---|
| Role | M | SD | β | SE |
| Follower | −0.08 | 0.92 | −0.29** | 0.12 |
| Socially Detached | 0.03 | 0.83 | −0.18 | 0.11 |
| Task-Leader | 0.09 | 0.84 | −0.12 | 0.10 |

Note.
*$p < .05$.
**$p < .01$.
*** $p < .001$.
Mean (M).
Standard deviation (SD).
Fixed effect coefficient (β).
Standard error (SE).

Incorporating Group Level Measures

As discussed earlier, it is possible that characteristics of the group influence individual learner outcomes and vice versa. The multilevel nature of collaborative processes highlight the importance of specifying the unit of analysis in documenting, analyzing and assessing collaborative learning process dynamics (De Wever, Schellens, Valcke, & Van Keer, 2006; Sawyer, 2014). There are three primary ways that collaborative process dynamics can be conceptualized, namely as group-level construct, individual student-level construct, and student-student interaction level construct (Stahl, 2013b). Therefore, interactions can be analyzed with the group, individual student, and interaction between students as units of analysis. Measures that capture the interaction dynamics between students can be aggregated to represent both student level constructs, similar to the roles in the current research. The performance assessment of collaborative interactions can be based on the group level (e.g., knowledge convergence, topic relevance) or individual student level outcomes (Strijbos, 2016).

Figure 18:
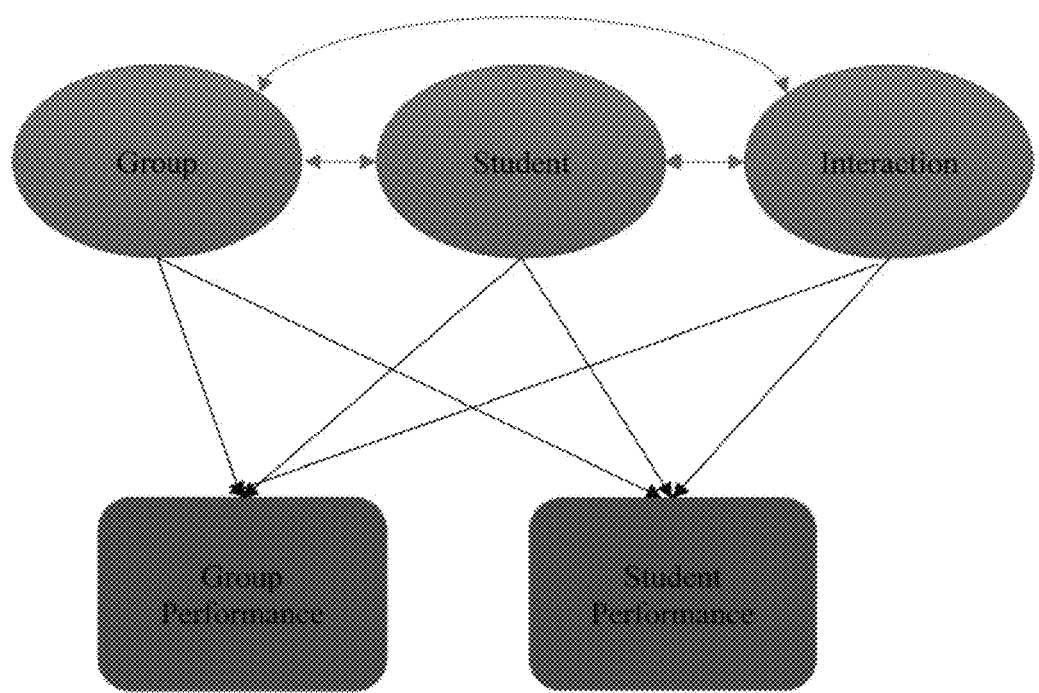
FIG. 18 show multilevel interactions between process and performance levels in collaborative learning, under an embodiment.

FIG. 18 shows a fully connected network that illustrates how all three collaborative process dynamics influence each other and includes two performance assessments. FIG. 18 highlights the importance of the unit of analysis. Unpacking these cross-level patterns in group interactions and understanding how these patterns relate to performance is a high priority for collaborative researchers (Kapur, 2011; Reimann, 2009; Stahl, 2005; Stahl et al., 2014; Suthers, 2006). However, few studies have attempted to answer this call. The investigations below analyze our understanding of how group level constructs, namely group compositions and diversity, interact with student and group level outcomes.

Two groups of models were constructed to assess the influence of group composition on group performance and individual student learning gains. The first set of models assessed the influence of group role diversity on student learning gains and group performance. The second set of models dove deeper to explore the influence of group compositions, as measured by the proportional occurrence of each of the roles, on student learning gains and group performance. As a reminder, group performance was operationally defined as the amount of topic-relevant discussion during the collaborative interaction, as described earlier in the Methods section. Correlations between group performance, student learning gains, diversity, and the proportional occurrence of each role in the four- and six-cluster model are reported in Table 33 and Table 34, respectively. As seen in Table 33 and Table 34, no relationship was observed between student learning gains and group performance, so this was not probed further. Quite small relationships were observed between the four-cluster model role diversity (M=0.88, SD=0.24) and the six-cluster model role diversity (M=1.04, SD=0.26) with student learning gains and group performance. However, when these relationships were further explored in the four-cluster model, the likelihood ratio tests indicated that the full diversity models for student learning gains and group performance did not yield a significantly better fit than the null model with $\chi^2(1)=0.54$, $p=0.46$, $R^2_m=0.001$, $R^2_c=0.96$, and $\chi^2(1)=0.24$, $p=0.62$, $R^2_m=0.002$, $R^2_c=0.88$, respectively. An inspection of the six-cluster model diversity also showed the full model was not a better fit for the data for student learning gains or group performance with $\chi^2(1)=0.39$, $p=0.52$, $R^2_m=0.001$, $R^2_c=0.96$, and $\chi^2(1)=0.26$, $p=0.62$, $R^2_m=0.002$, $R^2_c=0.88$, respectively.

group performance. A total of twelve linear mixed-effects models were constructed. For the four-cluster roles, six linear mixed-effects models were constructed, a null model with the random effect of group, but no fixed effects, a productive roles model with the proportional occurrence of Drivers and Task-Leaders as the independent variable, and an unproductive roles model with the proportional occurrence of Over-riders and Lurkers as the independent variable. For the six-cluster roles, six linear mixed-effects models were constructed, a null model with the random effect of group, but no fixed effects, a productive roles model with the proportional occurrence of Drivers, Task-Leaders, and Socially Detached learners as the independent variable, and an unproductive roles model with the proportional occurrence of Over-riders, Followers and Lurkers as the independent variable. For both the four and six-cluster role models

TABLE 33

Correlations between Student Learning Gains, Group Performance, Role Diversity and the Proportional Occurrence of Four Roles

| Measure | Student Level | Group Level Measures | | | | |
|---|---|---|---|---|---|---|
| | Learning Gains | Group performance | Diversity | Prop. Driver | Prop. Task-Leader | Prop. Over-rider |
| Group Performance | .00 | | | | | |
| Diversity | −.03 | .04 | | | | |
| Prop. Driver | .05 | .30*** | .16** | | | |
| Prop. Task-Leader | .07 | .29*** | .02 | .38*** | | |
| Prop. Over-rider | −.06 | −.30*** | −.06 | −.78*** | −.61*** | |
| Prop. Lurker | −.06 | −.30*** | 0.12** | −.58*** | −.81*** | .39*** |

Note.
***p < .001.
**p < .01.
*p < .05.

TABLE 34

Correlations between Student Learning Gains, Group Performance, Role Diversity and the Proportional Occurrence of Six Roles

| Measure | Student Level Learning Gains | Group Level Measures | | | | | | |
|---|---|---|---|---|---|---|---|---|
| | | Group Performance | Diversity | Prop. Over-rider | Prop. Driver | Prop. Follower | Prop. Lurker | Prop. Socially Detached |
| Group Performance | 0.00 | | | | | | | |
| Diversity | −0.02 | −0.03 | | | | | | |
| Prop. Over-rider | −0.03 | −0.28*** | 0.03 | | | | | |
| Prop. Driver | 0.03 | 0.28*** | −0.12*** | −0.77*** | | | | |
| Prop. Follower | −0.01 | 0.02 | 0.12*** | −0.31*** | 0.29*** | | | |
| Prop. Lurker | −0.05 | −0.28*** | −0.04 | 0.47*** | −0.49*** | −0.46*** | | |
| Prop. Socially Detached | −0.01 | −0.13*** | 0.23*** | 0.16*** | −0.43*** | −0.29*** | 0.07 | |
| Prop. Task-Leader | 0.05 | 0.32*** | −0.16*** | −0.47*** | 0.28*** | −0.11** | −0.52*** | −0.37*** |

Note.
***p < .001.
**p < .01.
*p < .05.

The second set of analyses involved a more fine-grained investigation of the influence of (the proportional occurrence) good and bad roles on student learning gains and below, the first three models had student learning gains as the dependent variable, whereas the next three had group performance as the dependent variable.

For the student level analyses of the four-cluster roles, the likelihood ratio tests indicated that neither the productive role model nor the unproductive role model yielded a significantly better fit than the null model with $\chi^2(2)=3.54$, $p=0.17$, $R^2_m=0.01$, $R^2_{c=0.96}$, and $\chi^2(2)=3.34$, $p=0.19$, $R^2_m=0.005$, $R^2_c=0.96$, respectively. Similarly, the student level analyses of the six-cluster roles, the likelihood ratio tests indicated that neither the productive role model nor the unproductive role model yielded a significantly better fit than the null model with $\chi^2(3)=2.62$, $p=0.45$, $R^2_m=0.004$, $R^2_c=0.96$, and $\chi^2(3)=2.75$, $p=0.43$, $R^2_m=0.004$, $R^2_c=0.96$. Based on the previous findings showing that social role does influence one's individual learning, this latter result suggests that it is less important that a person is combined with productive roles than it is that the person is enacting a productive role.

For the group level analysis of the four-cluster roles, the likelihood ratio tests indicated that that both the productive roles model and the unproductive roles model yielded a significantly better fit than the null model with $\chi^2(2)=20.67$, $p<0.001$, $R^2_m=0.13$, $R^2_c=0.89$, and $\chi^2(2)=20.36$ $p<0.001$, $R^2_m=0.13$, $R^2_c=0.89$, respectively. For the group level analysis of the six-cluster roles, the likelihood ratio tests indicated that that both the productive roles model and the unproductive roles model yielded a significantly better fit than the null model with $\chi^2(3)=23.62$, $p<0.0001$, $R^2_m=0.15$, $R^2_c=0.90$, and $\chi^2(3)=20.92 p<0.001$, $R^2_m=0.13$, $R^2_c=0.89$, respectively. Several conclusions can be drawn from this initial model fit evaluation and inspection of $R^2$ variance. First, the model comparisons support the claim that the proportional occurrence of productive and unproductive roles, in both the four and six-cluster models, were able to add a significant improvement in predicting the group performance above and beyond group characteristics. Second, for all models, the proportional occurrence of different social roles along with group features explained about 89% of the predictable variance in group performance, with 26-28% of the variance being accounted for by the proportional occurrence of different social roles. Table 35 and Table 36 show the social roles that were predictive of group performance for both the productive roles model and the unproductive roles model in the four and six-cluster role models, respectively.

A similar pattern was observed across the four and six role models, as shown in Table 35 and Table 36. Specifically, the proportional occurrence of most social roles predicted group performance when analyzing both the productive roles model and the unproductive roles model. Specifically, groups with learners who occupied more socially responsible, collaborative roles (namely Driver and Task-Leader) performed significantly better than groups with less socially engaged roles (Lurker and Over-rider). These findings mirror the pattern that was observed for individual student learning and social roles (model 1). Taken together, these results illustrate that not only are the identified clusters related to both student learning and group performance in general, but the relationship is theoretically interpretable, which provides additional confidence towards the external validity of the cluster analysis.

TABLE 35

Descriptive Statistics for Group Performance Across Four Roles and Mixed-Effects Model Coefficients for Predicting the Influence of Productive and Unproductive Roles on Group Performance

| Role | Productive Roles Model | | | | Role | Unproductive Roles Model | | | |
| --- | --- | --- | --- | --- | --- | --- | --- | --- | --- |
| | M | SD | β | SE | | M | SD | β | SE |
| Prop. of Driver | .28 | 0.99 | 1.16** | .40 | Prop. of Lurker | −.23 | .93 | −.98** | .40 |
| Prop. of Task-Leader | .25 | 1.05 | .81* | .36 | Prop. of Over-rider | −.26 | .89 | −.96** | .39 |

Note.
N = 148;
*p < .05;
**p < .01.
Mean (M).
Standard deviation (SD).
Fixed effect coefficient (β).
Standard error (SE).

TABLE 36

Descriptive Statistics for Group Performance Across Six Roles and Mixed-Effects Model Coefficients for Predicting the Influence of Productive and Unproductive Roles on Group Performance

| Role | Productive Roles Model | | | | Role | Unproductive Roles Model | | | |
| --- | --- | --- | --- | --- | --- | --- | --- | --- | --- |
| | M | SD | β | SE | | M | SD | β | SE |
| Prop. of Driver | 0.27 | 1.05 | 1.15** | 0.41 | Prop. of Over-Rider | −0.27 | 0.92 | −1.05* | 0.46 |

TABLE 36-continued

Descriptive Statistics for Group Performance Across Six Roles and
Mixed-Effects Model Coefficients for Predicting the Influence of
Productive and Unproductive Roles on Group Performance

| | Productive Roles Model | | | | Unproductive Roles Model | | | | |
|---|---|---|---|---|---|---|---|---|---|
| Role | M | SD | β | SE | Role | M | SD | β | SE |
| Prop. of Socially Detached | −0.18 | 0.79 | 0.42 | 0.52 | Prop. of Follower | 0.03 | 0.94 | −1.02* | 0.55 |
| Prop. of Task-Leader | 0.37 | 1.04 | 1.27** | 0.39 | Prop. of Lurker | −0.32 | 0.94 | −1.42* | 0.52 |

Note.
N = 148.
* $p < .06$.
** $p < .01$.
Mean (M).
Standard deviation (SD).
Fixed effect coefficient (β).
Standard error (SE).

Discussion

This section focused on addressing the practical value of the identified roles in both the four- and six-cluster models. Specifically, we investigated whether the social roles (Driver, Task-Leader, Lurker, and Over-rider, Socially Detached, and Follower) were meaningfully related to student learning gains and group performance. Overall, the results indicate that (a) the roles that learners occupy influence their learning, and (b) the presence of roles within a group interaction can result in different outcomes for that group, being either more or less beneficial. Taken together, these discoveries show that not only are the identified roles related to learning in general, but the relationship is theoretically meaningful, which provides external validity.

For the individual student learning models, we saw that socially engaged roles, like Driver, significantly outperformed less participatory roles, like Lurkers. This finding might be expected. However, other findings emerged that were less intuitive. For instance, we found that Task-Leaders and Socially Detached (although not quite as high) learners performed on par with the Drivers, but were among of the lower participators in the group. This suggests the difference in learning gains across the social roles is not a result of the students simply being more prolific. The Task-Leaders were quite responsive, high social impact, internal cohesion, but lower scores for newness and communication density. However, the most defining feature of the Socially Detached learners was their high internal cohesion because they exhibited mediocre scores across the other GCA measures. Something interesting starts to emerge when these profiles are juxtaposed with the Over-riders. Over-riders were the highest participators, but had lower learning gains, responsivity to peers, social impact, and mediocre internal cohesion. Together, this highlights the potency of having internal cohesion, and being even mildly socially aware and engaged with the other group members. More than simply talking a lot, the intra and interpersonal dynamics (captured by the internal cohesion, responsivity, and social impact measures), appear to be major factors in how much students learn.

The influence of these roles on group performance was also investigated. The first analyses investigated the influence of the overall diversity of roles on group performance. Here, we were interested in seeing if groups that are comprised of, for example, six different roles performed better than those that were comprised of all Task-Leaders. This was motivated by the group interaction literature, which suggests that diversity can be a major contributor to the successfulness of collaborative interactions. These analyses did not suggest any significant influence of group diversity on student or group performance. The findings for diversity in the literature have explored several different types of diversity, including personality, prior knowledge, gender, and other individual traits (Barron, 2003; Fuchs, Fuchs, Hamlett, & Karns, 1998). Therefore, there is the possibility that the diversity in roles is not an important type of diversity.

The next analyses dove deeper to investigate if group composition, or the proportional occurrence of different roles influenced group performance. The results largely mirrored those found for the individual students, with a few exceptions. Interestingly, the finding for Socially Detached learners was tempered when it came to group performance. Specifically, we observed the presence of Socially Detached learners within a group did not significantly influence the group performance. These findings for group level performance have implications for optimal group composition. Again, the results suggest the optimal group composition is not comprised of simply high participating learners. Instead, the optimal group composition involves a combination of both low and high participators. However, what is perhaps even more important is that the learners within the group are both aware of and invested in the social climate of the group interaction and collaborative outcome. Another difference between the influence of roles on groups and student performance pertains to the effect size. The influence of roles within a group appears to have a more potent influence on group performance (explaining 26%-28% of the variance) than does the influence of taking on a particular role on student performance (explaining only 2% of the variance). These discoveries highlight the importance of conducting multi-level analyses (i.e., individual student and group levels) to understand the differential influence of phenomena at these levels.

Section 9: Measurement of Emergent Roles in Collaborative Learning Interactions

Theoretical Background

The theoretical perspectives that explain emergent properties in small group interactions are heavily influenced by process-oriented theories coming from the social psychology of small groups, cognitive psychology, and industrial-organizational psychology (Cooke, Gordman, & Winner, 2007; Fiore et al., 2010; Letsky, 2008). The majority of the theoretical views on cognitive and social processes in small groups have been conceived in information processing terms that organize variables in an input-process-output (IPO) model proposed by McGrath 1984 (see Ilgen, Hollenbeck, Johnson, & Jundt, 2005 for a review; McGrath, 1984). The classical IPO framework specifies a linear progression and one-directional causal relation between the characteristics of the input that give rise to the processes, which in turn establish the outcomes (e.g. the processes cannot influence the inputs). Although the overall influence of the IPO heuristic has been positive, the utility of IPO models as a guide to empirical research has been criticized because it fails to capture the emerging consensus about groups as complex, adaptive systems (Cooke & Hilton, 2015; Ilgen et al., 2005). The recognition of the inherent complexity in the interactional dynamics of group members has produced a more emergent view of how groups function and perform (Arrow, McGrath, & Berdahl, 2000; Rosen, 2015; Stahl, 2005).

Emergent states are constructs that develop over the course of group interactions and influence the group and individual student outcomes (Ilgen et al., 2005; Puntambekar, Erkens, & Hmelo-Silver, 2011). Contemporary perspectives of successful group interactions build on the IPO framework but attempt to address its limitations by explicitly incorporating the inherent dynamics and highlighting when, where, and with whom various processes and emergent states become relevant. For example, Ilgen and colleagues (2005) discuss the feedback loop that link group outputs and subsequent inputs (i.e., knowledge, motivation, and behaviors are both inputs). Contemporary theory emphasizes feedback loops and recursive relationships as a fundamental aspect of group interactions. In line with this, researchers have almost universally recognized that group processes are inherently dynamic (e.g., Ilgen et al., 2005; Kozlowski, 2015; Puntambekar et al., 2011; Stahl, 2013a; Strijbos & De Laat, 2010). However, group processes are still predominantly investigated as static constructs.

The dynamics inherent in the conceptualization of group processes are not currently well specified in group interaction research. This has resulted in researchers advocating that more attention needs to be devoted to group dynamics in research (e.g., Cooke et al., 2007) and advances in research design (e.g., Foltz & Martin, 2009; Kozlowski, 2015). The approach adopted in the current dissertation addresses this by taking an emergent and dynamic perspective to understanding the intrapersonal and interpersonal sociocognitive processes across time and whether specific dynamics lead to more successful collaborative interactions.

In the CSCL literature there has been debate and tension around studying roles as stable patterns versus emergent by-products of group interaction processes that change over time (Hoadley, 2010). The following analyses investigates the identified social roles (i.e., clusters) to see if they exhibit characteristics typically associated with emergent processes. If the roles of particular group members are indeed an emergent property of interactions, then they will exhibit certain properties: (a) they should not be consistently or highly associated with trait based characteristics, and (b) they will not be static, but instead will change in different groups.

Results and Discussion

Are learners' social roles consistently or highly associated with trait based characteristics? The Big Five personality dimensions (Goldberg, 1981; McCrae & John, 1992) are central to trait-based approaches to personality (Ozer & Benet-Martinez, 2006). The Big Five personality dimensions are briefly described below. It is important to note that each of the five personality factors represents a range between two extremes.

Openness: This trait features characteristics such as imagination and insight, and those high in this trait also tend to have a broad range of interests. Individuals with lower scores on this trait are often much more traditional and may struggle with abstract thinking.

Conscientiousness: Standard features of this trait include high levels of thoughtfulness, with good impulse control and goal-directed behaviors. Those high on conscientiousness tend to be organized and mindful of details.

Extraversion: Extraversion is characterized by excitability, sociability, talkativeness, assertiveness and high amounts of emotional expressiveness.

Agreeableness: This personality dimension includes attributes such as trust, altruism, kindness, affection and other prosocial behaviors. Individuals that score higher on agreeableness are inclined to be more cooperative while those low in this trait tend to be more competitive and even manipulative.

Neuroticism: Neuroticism is a trait characterized by moodiness and emotional instability. Individuals who are high in this trait tend to experience mood swings, anxiety, moodiness, irritability and sadness. Those low in this trait tend to be more stable and emotionally resilient.

Figure 19:
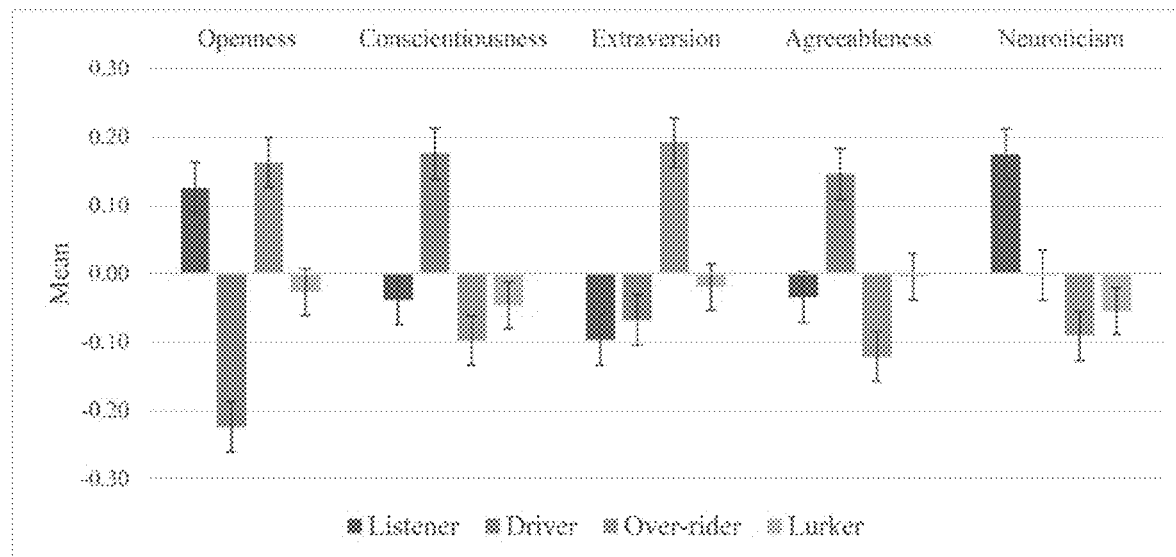
FIG. 19 shows traditional CSCL means and standard errors for big five personality measures across roles, under an embodiment.

Over the years, the Big Five model has gained a reputation of being context independent with longitudinal and cross-cultural evidence supporting this basic personality structure (McCrae & John, 1992). The Traditional CSCL data set contains students' self-reported Big Five personality traits, so it is ideal for testing the first claim (i.e., they should not be consistently or highly associated with trait based characteristics). Correlational and linear discriminant analyses were adopted to explore the association between students' personality characteristics and the identified social roles. Table 37 shows that the Pearson correlation coefficients between Big Five personality measures and GCA measures in the Traditional CSCL data set were quite small, ranging from $r=-0.11$ to $0.14$. The only significant relationship was between Participation and Openness. This relationship between Openness and Participation is consistent with previous findings by Chen and Caropreso (2004). This correlation analysis shows how the sociocognitive GCA measures are related to personality characteristics in an expected way, but they do not appear to be consistently or highly associated with the trait based personality characteristics. Means for Big Five personality measures across the four roles are presented in FIG. 19. The pattern appears to align with what we might expect for the identified roles. For instance, the Over-rider (represented by the green bar) showed higher scores on openness and extraversion, but lower on conscientiousness and agreeableness. This pattern might be anticipated by individuals that dominate the interaction with their personal agenda.

TABLE 37

Pearson Correlations between Big Five Personality
and GCA Measures for Traditional CSCL Data Set

| Measure | Openness | Conscientiousness | Extraversion | Agreeableness | Neuroticism |
|---|---|---|---|---|---|
| Participation | 0.14*** | −0.04 | 0.06 | −0.04 | 0.00 |
| Social Impact | −0.03 | 0.12** | −0.05 | 0.06 | 0.02 |
| Overall Responsivity | −0.04 | 0.08* | −0.11** | 0.04 | 0.03 |
| Internal Cohesion | −0.01 | 0.14*** | −0.03 | 0.05 | 0.04 |
| Newness | 0.04 | −0.02 | 0.03 | −0.08* | −0.01 |
| Communication Density | 0.03 | −0.01 | 0.03 | −0.07 | 0.00 |

Note.
*$p < .05$.
**$p < .01$.
***$p < .001$.

Linear discriminant function analysis (DFAs) was used as a follow up to the correlation analyses. DFAs is a commonly used data mining technique that is useful in determining whether a set of variables is effective in predicting category membership (Maimon & Rokach, 2010). The DFA generates a discriminant function, a statistical technique that predicts which one of the 4 alternative roles a person occupies based on a set of continuous variables (i.e., Big Five personality measures).

These analyses were intended to provide some initial evidence indicating whether differences in trait-based personality characteristics were related to the identified social roles students take on during collaborative interactions. However, the DFA results show that only the first function, Openness to experience, significantly discriminated among the roles. Overall, the results suggest that the clusters can be distinguished by the DFA. Some degree of association was to be expected. Indeed, some degree of association was found, however, the DFA does not provide evidence that the roles are highly, consistently, or reliability related with learners' personality traits.

Figure 20:
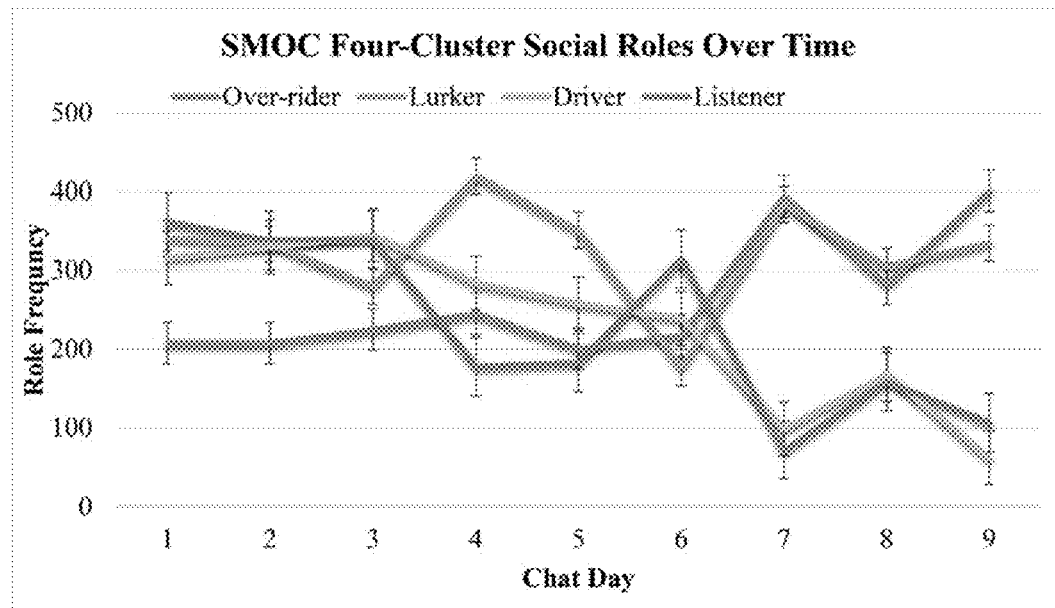
FIG. 20 shows the frequency of social roles over time, under an embodiment.

Are learners' social roles static or do they change across different groups? The next set of analyses proceeded to test the second claim, and further evaluate if the social roles are a product of trait-based characteristics in individual students or emergent processes within the interaction. Specifically, if learners consistently occupy the same social roles in different groups with varying compositions, this will provide evidence against the emergent property perspective. The SMOC dataset, where students participated in multiple groups throughout the semester, was ideal for testing the second claim. In the AutoMentor dataset, students were reorganized into different groups midway through the course, and so there could be changes to the roles the students took on. However, there would only be a single possible role-transition per student, and so does not form sufficient examples to robustly test these hypotheses. Consequently, only the SMOC data was used in the following analyses. The frequency of the conversational roles was explored over the nine days that chats took place (see FIG. 20). We can see from the visualization that the social roles vary quite a bit from day to day. Some variation might be expected due to students being absent on certain days, but there are large variations in most instances, which would suggest the variation is perhaps not a product of student absence. Further, a qualitative examination of the data showed that individuals were indeed occupying different roles throughout the course.

The findings from the qualitative inspection, correlation, and DFA analysis provide evidence that the social roles students take on during multi-party interactions are an emergent product of the interaction, rather than a trait-based characteristic of the student. The qualitative inspection showing students occupying different roles over the semester is particularly interesting and raises new questions regarding the dynamics of social role transitions. The temporal dynamics of social roles is an important phenomenon that has not received much emphasis, so investigations into these patterns can provide valuable insights for CSCL research and practice.

Therefore, the next analyses focus on quantifying and exploring patterns in social role transitions. Specifically, state transition networks (STNs) were used to better understand the evolution pathways of students' social roles over time. A state transition model encodes the probability of transitioning between specific states (i.e., social roles) during successive chat interactions. By examining the transition probabilities between roles, STN quantifies the patterns in transitions from one role to another. In this context, the sociocognitive roles can be examined as an evolving, multi-state network, thereby allowing us to reveal temporal patterns that may otherwise remain hidden. Table 38 and Table 39 show contingency tables with raw counts for the transitions from the roles in the rows to the roles in the columns, under the four and six-cluster models, respectively. These raw counts are derived from looking at the roles for a given participant across sequential chat days, irrespective of when the student occupied that role.

Emergence is a difficult concept to define concretely. In the context of these discourse roles, it is easier to contrast emergent roles with perfectly trait-based and perfectly arbitrary roles. If roles were entirely determined by stable characteristics of a person, then we should expect little to no variation in the role that a person takes on. On the other hand, if roles were entirely arbitrary, we would expect no stable relationship between an individual and her role, nor any influence of past role on future role (i.e., the role is independent from itself across time). The truly emergent role is therefore somewhere in the middle between these two extremes. While we may not be able to identify the causal factors that drive role adoption from purely observational data, we can test for the viability of these two null-hypotheses.

TABLE 38

Contingency Table for Transitions Among Roles in SMOC for Four-Cluster Model

| Role | Lurker | Over-rider | Driver | Task-Leader |
| --- | --- | --- | --- | --- |
| Lurker | 1063 | 564 | 382 | 582 |
| Over-rider | 560 | 743 | 511 | 351 |
| Driver | 468 | 643 | 693 | 472 |
| Task-Leader | 677 | 479 | 489 | 565 |

TABLE 39

Contingency Table for Transitions Among Roles in SMOC for Six-Cluster Model

| Role | Over-rider | Driver | Initiator | Lurker | Follower | Task-Leader |
| --- | --- | --- | --- | --- | --- | --- |
| Over-rider | 644 | 472 | 126 | 344 | 107 | 292 |
| Driver | 572 | 623 | 142 | 277 | 139 | 403 |
| Initiator | 139 | 149 | 102 | 185 | 106 | 221 |
| Lurker | 315 | 196 | 132 | 336 | 149 | 225 |
| Follower | 158 | 111 | 92 | 202 | 110 | 166 |
| Task-Leader | 402 | 407 | 194 | 336 | 191 | 477 |

A chi-squared association test of these values showed that the subsequent roles are not independent of the prior roles (four-cluster: $\chi^2=461.93$, df=9, p<0.001; six-cluster: $\chi^2=510.3$, df=25, p<0.001). This provides evidence against the purely arbitrary hypothesis, since if roles truly were arbitrary we would expect there to be no influence of history on the next role adopted. Table 40 and Table 41 provides the empirical conditional probability for the four and six-cluster models, respectively.

TABLE 40

Observed Transition Frequencies for SMOC Data Set in SMOC for Four-Cluster Model

| Role | Lurker | Over-rider | Driver | Task-Leader |
| --- | --- | --- | --- | --- |
| Lurker | 0.41 | 0.22 | 0.15 | 0.22 |
| Over-rider | 0.26 | 0.34 | 0.24 | 0.16 |
| Driver | 0.21 | 0.28 | 0.30 | 0.21 |
| Task-Leader | 0.31 | 0.22 | 0.22 | 0.26 |

TABLE 41

Observed Transition Frequencies for SMOC Data Set in SMOC for Six-Cluster Model

| Role | Over-rider | Driver | Initiator | Lurker | Follower | Task-Leader |
| --- | --- | --- | --- | --- | --- | --- |
| Over-rider | 0.32 | 0.24 | 0.06 | 0.17 | 0.05 | 0.15 |
| Driver | 0.27 | 0.29 | 0.07 | 0.13 | 0.06 | 0.19 |
| Initiator | 0.15 | 0.17 | 0.11 | 0.21 | 0.12 | 0.25 |
| Lurker | 0.23 | 0.14 | 0.10 | 0.25 | 0.11 | 0.17 |
| Follower | 0.19 | 0.13 | 0.11 | 0.24 | 0.13 | 0.20 |
| Task-Leader | 0.20 | 0.20 | 0.10 | 0.17 | 0.10 | 0.24 |

Each cell in the table gives the empirical conditional probability of transitioning to the role in the column, given that the student was in the role on the row. As such, each row is a discrete probability distribution. The fact that the transition probabilities are so distributed is compatible with the emergence hypotheses. If roles were entirely trait-like, and determined by the individual, then we would expect the diagonal values to be 1.0 and the off-diagonals to all be 0.0. If the roles were entirely arbitrary (i.e. uniformly random), then the all values in Table 40 (four-cluster model) would be 0.25, and in Table 41 (six-cluster model) they would all be 0.16. A series of chi-squared goodness-of-fit tests were conducted to test whether these distributions were significantly different from both a uniform distribution, and a distribution where the identity transition (i.e., Driver->Driver, Lurker->Lurker, etc.) were 1.0 and all others 0.0. All of these provided strong evidence (p<0.001) that these distributions were neither uniformly random, nor similar to a perfectly trait-like distribution, providing further evidence against the two null-hypotheses.

In order to determine if the effect of the prior role has a meaningful influence on the subsequent role, over and above what you might expect from chance, we must compare the conditional probability, $P(M_{t+1}|M_t)$, to the corresponding marginal probability, $P(M_{t+1})$. Following the method of D'Mello and Graesser (2012a), an effect-size metric was computed for each transition as follows:

$$L(M_t \to M_{t+1}) = \frac{P(M_{t+1} | M_t) - P(M_{t+1})}{1 - P(M_{t+1})}$$

This metric gives the difference between the conditional and marginal probabilities, scaled by the potential for such a difference given the size of the marginal. If the from- and to-variables are independent, this metric will be zero because the conditional and marginal probabilities will be equal. It will tend towards larger positive/negative values as the conditional probabilities get larger/smaller than the marginal probabilities. In addition to this metric, a one-sample t-test was performed on each potential transition. The marginal probabilities for the four-cluster role model were: Lurker=0.30, Over-rider=0.26, Driver=0.22, and Task-Leader=0.21. The marginal probabilities for the six-cluster role model were: Over-rider=0.24, Driver=0.21, Initiator=0.09, Lurker=0.18, Follower=0.09, and Task-Leader=0.19. The results of the transition analyses are summarized in Tables 42 and 43.

TABLE 42

Matrix of Effect-Size Metrics for Four-Cluster Role Model

| Role | Lurker | Over-rider | Driver | Task-Leader |
| --- | --- | --- | --- | --- |
| Lurker | 0.16*** | −0.06*** | −0.10*** | 0.01 |
| Over-rider | −0.06*** | 0.11*** | 0.01 | −0.06*** |
| Driver | −0.13*** | 0.03* | 0.10*** | −0.01 |
| Task-Leader | 0.01 | −0.06*** | 0.00 | 0.05*** |

Note.
***p < .001.
**p < .01.
*p < .05.

TABLE 43

Matrix of Effect-Size Metrics for Six-Cluster Role Model

| Role | Over-rider | Driver | Initiator | Lurker | Follower | Task-Leader |
|---|---|---|---|---|---|---|
| Over-rider | 0.07*** | 0.05** | 0.01*** | 0.04 | 0.01*** | 0.03*** |
| Driver | 0.06* | 0.07*** | 0.02*** | 0.03*** | 0.02*** | 0.04 |
| Initiator | 0.02*** | 0.02*** | 0.01** | 0.02 | 0.01** | 0.02*** |
| Lurker | 0.03 | 0.02*** | 0.01 | 0.04*** | 0.02** | 0.02** |
| Follower | 0.02*** | 0.01*** | 0.01* | 0.02*** | 0.01*** | 0.02 |
| Task-Leader | 0.04*** | 0.04 | 0.02 | 0.04 | 0.02 | 0.05*** |

Note.
***$p < .001$.
**$p < .01$.
*$p < .05$.

These matrices give a sense for the meaningful connections in a potential STN for these roles. We can see that the diagonal of each matrix is strongly significant, with relatively large metric scores. This might incline us to support the static trait hypothesis, however, when we see the number of significant off-diagonal values, it becomes clear that this cannot be the whole story. The metric scores on the diagonals are also not uniformly the largest for every row, leading us to believe that other transitions may be more meaningful. Additionally, the matrices are not symmetrical, meaning that the tendency to go from role A to B is not necessarily the same as the tendency to go from B to A. This also tends to support a picture of emergence and complex dynamical changes between the roles.

While we see both positive and negative significant transitions for the four-cluster model, we have only positive transitions in the six-cluster model. This seems to line up according to the more active or passive roles, so that while there may be a weak positive association within active (Driver, Over-rider) and passive (Lurker, Task-Leader) roles, there are only strongly negative associations across the active-passive divide. This may indicate that while the roles themselves are not trait-based, the tendency towards an active or passive role is. It is also interesting to note that for both of the roles in the six-cluster model that do not occur in the four-cluster model (Initiator and Follower) the diagonal entry is not the largest value, whereas it is for all other roles. This may indicate that these roles are less stable, and might collapse into one of the other roles.

Section 10: General Discussion

The overall objective of this research was to investigate the discourse of collaborative learning to gain insight on why some groups are more successful than others. A group communication analysis (GCA) framework was developed to address the main questions raised in this dissertation. As described in section 4, the GCA applies automated computational linguistic techniques to the sequential interactions of online collaborative interactions. The GCA involves computing six distinct measures of participant sociocognitive interaction patterns (i.e., Responsiveness, Social Impact/Initiative, Internal Cohesion, Communication Density, and Sharing of New Information). The automated natural language metrics that make up the GCA allow us to understand how roles are constructed and maintained through the sociocognitive processes within an interaction.

The analysis set forth herein focused on sociocognitive variables. However, there are several other collaborative interaction characteristics that would likely be valuable when attempting to characterize the roles students occupy during group interactions. For instance, affective characteristics of individuals and groups have been shown to play a very important role in learning (Baker, D'Mello, Rodrigo, & Graesser, 2010; D'Mello & Graesser, 2012b; Graesser, D'Mello, & Strain, 2014). There has also been evidence suggesting the importance of behavioral characteristics, such as keystrokes, click-stream, response time, duration, and reading time measures, that could provide additional information related to the roles learners occupy in collaborative interactions (i.e., Antonenko et al., 2012; Azevedo, et al., 2010; Mostow & Beck, 2006). Finally, the measure of topic relevance was used to provide an independent measure of group performance (i.e., separate from student learning gains) in the analysis set forth herein. However, this is arguably a quite important feature that could provide valuable information for understanding social roles in group interactions.

In section 7, Detecting Social Roles, the GCA was applied to two large, collaborative learning, and one collaborative problem solving dataset (learner N=2,429; group N=3,598). Participants were then clustered based on their profiles across the GCA measures. The cluster analyses identified roles that have distinct patterns in behavioral engagement style (i.e., active or passive, leading or following), contribution characteristics (i.e., providing new information or echoing given material), and social orientation. The four and six-cluster models revealed the following roles: Drivers, Task-Leaders, Socially Detached learners, Over-riders, Followers, and Lurkers. The identified social roles (i.e., clusters) underwent stringent evaluation, validation, and internal and external generalization assessments. Specifically, bootstrapping and replication analyses illustrated that the roles generalize both within and across different collaborative interaction datasets, indicating that these roles are robust constructs. Thus, this methodological contribution of the GCA provides a more objective, domain independent, and deeper exploration of the micro-level intrapersonal and interpersonal patterns associated with student roles. Moreover, as a practical contribution, a substantially larger corpus of data can be analyzed with the GCA than when humans need to annotate the data. Interestingly, the GCA measures revealed behavioral and communication patterns of the social roles that do not entirely overlap with those observed in Strijbos and De Laat's (2010) framework. The identification of these additional roles serve as a conceptual contribution for research focusing on understanding the social roles within multi-party communication. Overall, the results from section 6 indicate that learners' patterns of linguistic coordination and cohesion, as measured by the GCA, can diagnostically reveal the roles that individuals play in collaborative discussions.

In section 7, Learning and Social Roles, the practical value of the of the identified roles in both the four- and six-cluster models was evaluated. Specifically, we investigated whether the social roles (Driver, Task-Leader, Lurker, and Over-rider, Socially Detached, and Follower) were meaningfully related to student learning gains and group performance. Overall, the results indicate that a) the roles that learners occupy influences their learning, and b) the presence of roles within a group interaction can result in different outcomes for that group, being either more, or less beneficial for the collaborative outcome. This section provided two important contributions to the collaborative learning literature. First, the multilevel mixed-effects models applied in this section are rarely applied in CSCL research; however, they are the most appropriate statistical analysis for this nested structure data CSCL data (De Wever et al., 2007; Janssen et al., 2011; Pinheiro & Bates, 2000). Furthermore, these models impose a very stringent test of the influence of roles on group and student learning by controlling for the variance associated with differences in group and learner characteristics. As such, the use of mixed-effects models provides confidence in the robustness of the findings in this section. Second, the multi-level investigation conducted in this section addressed a frequently noted limitation found in collaborative learning research. Collaborative interactions are inherently multilevel in that they can be analyzed with the group, individual student, and interaction between students as units of analysis. As such, prominent CSCL researchers have emphasized the need to conduct more rigorous, multi-level research (Cress, 2008; De Wever, Van Keer, Schellens, & Valcke, 2007; Stahl, 2005; Suthers, 2006b). Collaborative learning studies usually center on only one of these units of analysis (Stahl, 2013a). As a result, there has been little reflection on how the levels are connected and differentially influenced by phenomena, although it is evident that such connections are fundamentally important for the intellectual growth and practical value of collaborative learning research (Stahl, 2013a). As Kapur et al., (2011) said "It is worth reiterating that these methods should not be used in isolation, but as part of a larger, multiple grain size analytical program. At each grain size, findings should potentially inform and be informed by findings from analysis at other grain sizes—an analytical approach that is commensurable with the multiple levels (individual, group) at which the phenomenon unfolds. Only then can these methods and measures play an instrumental role in the building and testing of a process-oriented theory of problem solving and learning." In line with this, the most noteworthy discoveries in section eight concerns the findings for the influence of roles on student learning and group performance. The results suggested the difference in learning gains and group performance across the social roles is not a result of the students simply being more prolific. That is, more than simply talking a lot, the intra and interpersonal dynamics (captured by the internal cohesion, responsivity, and social impact measures) appear to be a more potent element in the success of collaborative groups and how much individual students learn.

There have been several analytical approaches to exploring language, discourse and communication in CSCL. Regarding analytical approaches, scholars typically rely on human coding that uses content analysis schemes or surface level communication features. While there has been extensive knowledge gleaned from manual content analyses, manual methods are labor-intensive, and as such are no longer a viable option with the increasing scale of educational data (Daradoumis et al., 2006). Additionally, manual content analysis based on CSCL coding schemes has been criticized for relying on preconceived categories of behavior for the phenomenon of interest rather than seeking to discover those phenomena in their unique situations (Stahl, 2006; Stahl et al., 2014). As such, this is one of the notable contributions of the GCA. One of the benefits of the preconceived categories involved in manual content analyses is that these coded categories would afford a "gold standard" external validation. For instance, if these roles were identified through manually coded categories, then the cluster analysis results could be compared against the human annotated "gold standard".

The analysis set forth herein explored substantially larger collaborative interactions than are typically analyzed with manual methods in CSCL research. The GCA variables are comprised of rather complex and dynamic discourse characteristics that are calculated within segments of moving windows of 20 turns across the group interactions. Hence, collaborative interaction data of this size and multifaceted discourse characteristics would be quite difficult and time consuming, if not impossible, for humans to achieve. However, external cluster validation can be explored by either comparing the cluster solutions to some "gold standard" categories or by comparing them to meaningful external variables, i.e. variables not used in the cluster analysis (Antonenko et al., 2012). The analysis set forth herein implemented the latter approach. Specifically, evidence for the external validation for the roles was provided by showing that the identified roles are related to both individual student learning and group performance in general, and that the relationship is theoretically meaningful.

The systems, methods, and analysis set forth herein provided fruitful lines of research. Specifically, the methodological GCA framework allows us to understand how roles are constructed and maintained through the sociocognitive processes within an interaction. The developed analytical tools and empirical findings of this research contribute to our understanding of how individuals learn together as a group and thereby advance the learning sciences. More broadly, GCA provides a framework for researchers to explore the intra- and inter-personal patterns associated with the participants' roles and the sociocognitive processes related to successful collaboration.

Figure 21:
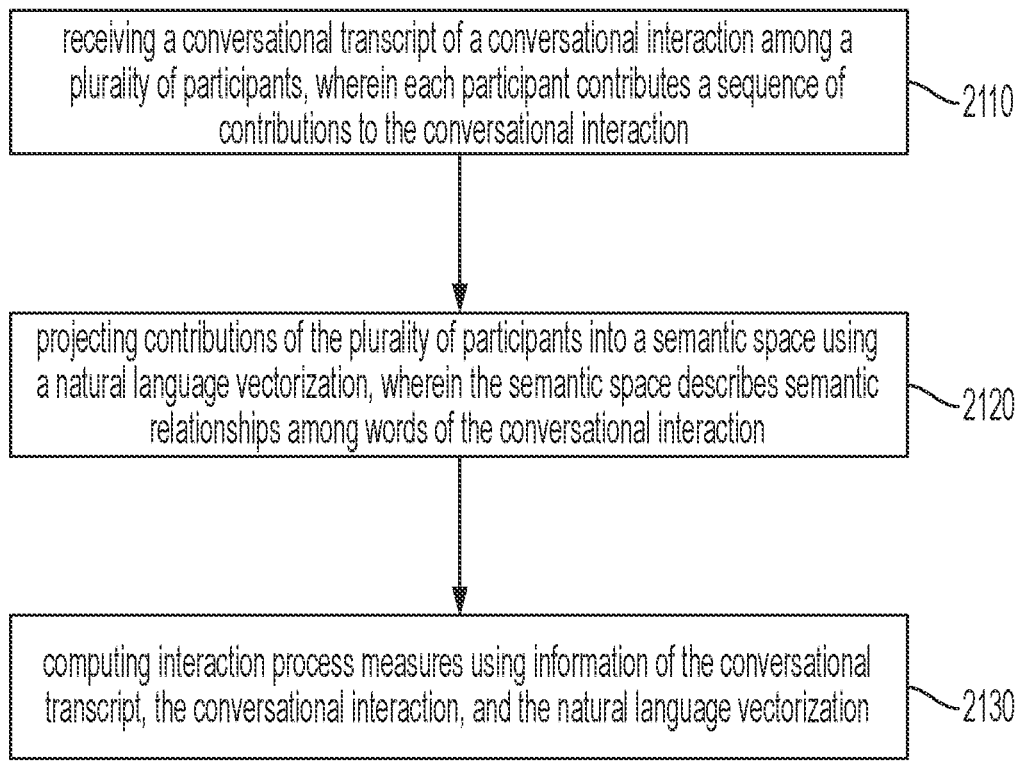
FIG. 21 shows a method for computing interaction process measures, under an embodiment.

FIG. 21 shows a method for computing interaction process measures, under an embodiment. FIG. 21 shows 2110 receiving a conversational transcript of a conversational interaction among a plurality of participants, wherein each participant contributes a sequence of contributions to the conversational interaction. FIG. 21 shows 2120 projecting contributions of the plurality of participants into a semantic space using a natural language vectorization, wherein the semantic space describes semantic relationships among words of the conversational interaction. FIG. 21 shows 2130 computing interaction process measures using information of the conversational transcript, the conversational interaction, and the natural language vectorization.

Note that references are set forth herein as Appendix H.

A method is described herein comprising under one embodiment receiving a conversational transcript of a conversational interaction among a plurality of participants, wherein each participant contributes a sequence of contributions to the conversational interaction. The method includes projecting contributions of the plurality of participants into a semantic space using a natural language vectorization, wherein the semantic space describes semantic relationships among words of the conversational interaction. The method includes computing interaction process measures using information of the conversational transcript, the conversational interaction, and the natural language vectorization.

C represents a sequence of contributions with $c_t$ representing the $t^{th}$ contribution in the sequence, under an embodiment.

|C|=n indicates a length of a sequence of contributions, under an embodiment.

Each contribution in a sequence of contributions occurs at time t wherein 1≤t≤n, under an embodiment.

P comprises a set of participants in the discussion, under an embodiment.

|P|=k participants in the set of participants, under an embodiment.

$P_{t(a)}$ for any participant a of the plurality of participants comprises under an embodiment $$p_t(a) = \begin{cases} 1, & \text{if contribution } c_t \text{ was made by participant } a \in P \\ 0, & \text{otherwise} \end{cases}$$

A participation function P(a) for any participant a of the plurality of participants comprises under an embodiment $$P_a = \{p_1(a), p_2(a), p_3(a), \ldots, p_n(a)\}.$$

The projecting of an embodiment comprises projecting contribution $c_i$ into the semantic space using the natural language vectorization.

The natural language vectorization of an embodiment comprises a word-document matrix factorization method including latent semantic analysis (LSA).

The natural language vectorization of an embodiment comprises a word-document matrix factorization method including term frequency inverse document frequency (TF-IDF).

The natural language vectorization of an embodiment comprises a neural embedding method including skip-gram (Word2Vec).

The natural language vectorization of an embodiment comprises a neural embedding method including global vectors for word representation (GloVe).

The projecting contribution $c_i$ includes matching at least one word of contribution $c_i$ with at least one normalized term vector of the semantic space, under an embodiment.

The method of an embodiment comprises summing over the at least one matched normalized term vector to produce document vector $\vec{d}_i$.

The method of an embodiment comprises computing a semantic similarity measure between $c_i$ and $c_j$ as a cosine similarity between corresponding document vectors $\vec{d}_i$ and $\vec{d}_j$, wherein the cosine similarity comprises $$\cos(\vec{d}_i, \vec{d}_j) = \frac{\vec{d}_i \cdot \vec{d}_j}{\|\vec{d}_i\| \cdot \|\vec{d}_j\|}.$$

The method of an embodiment comprises defining a semantic similarity function for contribution $c_i$ from participant a and contribution $c_j$ from participant b as $$s_{ij}(a,b) = p_i(a) \cdot p_j(b) \cdot \cos(\vec{d}_i, \vec{d}_j).$$

The method of an embodiment comprises defining a participant responsivity function by averaging semantic similarity of contributions of one participant a to another participant b when the contributions are lagged by some fixed amount, τ, across all contributions.

The participant responsivity function of an embodiment comprises $$r_\tau(a, b) = \begin{cases} 0, & \|p_\tau(a, b)\| = 0 \\ \frac{1}{\|p_\tau(a, b)\|} \sum_{t=\tau+1}^{n} s_{t,t-\tau}(a, b), & \|p_\tau(a, b)\| \neq 0 \end{cases}.$$

Output of the participant responsivity function is under an embodiment normalized by the total number of τ-lagged contributions expressed as follows:

$$\|p_\tau(a,b)\| = \tau_{t=\tau-1}^{n} p_t(a) \cdot P_{t-\tau}(b).$$

The interaction process measures of an embodiment include the output of the participant responsivity function.

The method of an embodiment comprises defining a τ-lagged responsivity matrix across all participants of the plurality of participants as a k×k matrix $R_\tau$, wherein the element in row i, column j is given by the responsivity function $r_\tau(i, j)$.

Rows of the T-lagged responsivity matrix represent responding participants, under an embodiment.

Columns of the T-lagged responsivity matrix represent the initiating participants, under an embodiment.

A w-spanning responsivity matrix comprises under an embodiment $$\bar{R}_w = \frac{1}{w} \sum_{\tau=1}^{w} R_\tau.$$

An individual entry in the matrix $\bar{r}_w(a, b)$ comprises the responsivity of participant a to b across w, under an embodiment.

Internal cohesion of a participant a comprises under an embodiment diagonal entry $\bar{r}_w(a, a)$ in the w-spanning responsivity matrix, wherein the interaction process measures include internal cohesion.

Overall responsivity of a participant a to all other participants comprises under an embodiment $$\bar{r}_w(a) = \frac{1}{k-1} \sum_{i=1; i \neq a}^{k} \bar{r}_w(a, i).$$

The interaction process measures of an embodiment include overall responsivity.

Social impact of an embodiment comprises $$\bar{\iota}_w(a) = \frac{1}{k-1} \sum_{j=1; j \neq a}^{k} \bar{r}_w(j, a).$$

The interaction process measures of an embodiment include social impact.

The method of an embodiment comprises defining a subspace of the semantic space matrix as $$G_t = \text{span}\{\vec{d}_1, \vec{d}_2, \ldots, \vec{d}_{t-1}\}.$$

Semantic content of a current contribution of a sequence of contributions may be divided under an embodiment into a portion already given by projecting a document vector for the current contribution onto the subspace as $\vec{g}_t = \text{Proj}_{G_t}(\vec{d}_t)$.

A portion of the semantic content of a current contribution of a sequence of contributions that is new is given under an embodiment by projecting the document vector onto an orthogonal complement of the subspace as $\vec{n}_t = \text{Proj}_{G_t^\perp}(\vec{d}_t)$.

New content of a current contribution of a sequence of contributions comprises under an embodiment $$n(c_t) = \frac{\|\vec{n}_t\|}{\|\vec{n}_t\| + \|\vec{g}_t\|}.$$

Newness provided by a participant a comprises under an embodiment $$N(a) = \frac{1}{\|P_a\|} \sum_{t=1}^{n} p_t(a) \cdot n(c_t).$$

The interaction process measures of an embodiment include newness.

Communication density of a current contribution of a sequence of contributions comprises under an embodiment $$D_i = \frac{\|\vec{d}_i\|}{\|c_i\|},$$

where $\|\vec{d}_i\|$ is the norm of the $\vec{d}_i$ vector and $\|c_i\|$ is the length of the contribution in words.

Communication density of participant a comprises under an embodiment $$D(a) = \frac{\sum_{t=1}^{n} p_t(a) \cdot \|d_t\|}{\sum_{t=1}^{n} p_t(a) \cdot \|c_t\|}.$$

The interaction process measures of an embodiment include the communication density of a participant.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The computational linguistic analysis of learners' discourse in computer-mediated group learning environments can be a component of a single system, multiple systems, and/or geographically separate systems. The computational linguistic analysis of learners' discourse in computer-mediated group learning environments can also be a subcomponent or subsystem of a single system, multiple systems, and/or geographically separate systems. The components of computational linguistic analysis of learners' discourse in computer-mediated group learning environments can be coupled to one or more other components (not shown) of a host system or a system coupled to the host system.

One or more components of the computational linguistic analysis of learners' discourse in computer-mediated group learning environments and/or a corresponding interface, system or application to which the computational linguistic analysis of learners' discourse in computer-mediated group learning environments is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the computational linguistic analysis of learners' discourse in computer-mediated group learning environments can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the computational linguistic analysis of learners' discourse in computer-mediated group learning environments and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the computational linguistic analysis of learners' discourse in computer-mediated group learning environments and corresponding systems and methods include: microcontrollers with memory (such as electronically erasable programmable read only memory (EEPROM)), embedded microprocessors, firmware, software, etc. Furthermore, aspects of the computational linguistic analysis of learners' discourse in computer-mediated group learning environments and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the computational linguistic analysis of learners' discourse in computer-mediated group learning environments is not intended to be exhaustive or to limit the systems and methods to the precise forms disclosed. While specific embodiments of, and examples for, the computational linguistic analysis of learners' discourse in computer-mediated group learning environments and corresponding systems and methods are described herein for illustrative purposes, various equivalent modifications are possible within the scope of the systems and methods, as those skilled in the relevant art will recognize. The teachings of the computational linguistic analysis of learners' discourse in computer-mediated group learning environments and corresponding systems and methods provided herein can be applied to other systems and methods, not only for the systems and methods described above.

The elements and acts of the various embodiments described above can be combined to provide further embodiments. These and other changes can be made to the computational linguistic analysis of learners' discourse in computer-mediated group learning environments and corresponding systems and methods in light of the above detailed description.

We claim:

1. A method comprising, receiving a conversational transcript of a conversational interaction among a plurality of participants, wherein each participant contributes a sequence of contributions to the conversational interaction, wherein C represents a sequence of contributions with $c_t$ representing the $t^{th}$ contribution in the sequence, wherein $|C|=n$ indicates a length of a sequence of contributions, wherein each contribution in a sequence of contributions occurs at time t wherein $1 \leq t \leq n$, wherein P comprises the plurality of participants in the discussion, wherein $|P|=k$ participants of the plurality of participants, wherein $P_{t(a)}$ for any participant a of the plurality of participants comprises $$p_t(a) = \begin{cases} 1, & \text{if contribution } c_t \text{ was made by participant } a \in P \\ 0, & \text{otherwise,} \end{cases}$$

wherein a participating function P(a) for any participant a of the plurality of participants comprises $$P_a = \{p_1(a), p_2(a), p_3(a), \ldots, p_n(a)\};$$

projecting contributions of the plurality of participants into a semantic space using a natural language vectorization, wherein the semantic space describes semantic relationships among words of the conversational interaction, the projecting comprising projecting contribution $c_i$ into the semantic space using the natural language vectorization, the projecting contribution $c_i$ including matching at least one word of contribution $c_i$ with at least one normalized term vector of the semantic space;

summing over the at least one matched normalized term vector to produce document vector $\vec{d}_i$;

computing a semantic similarity measure between $c_i$ and $c_j$ as a consine similarity between corresponding document vectors $\vec{d}_i$ and $\vec{d}_j$, wherein the consine similarity comprises $$\cos(\vec{d}_i, \vec{d}_j) = \frac{\vec{d}_i \cdot \vec{d}_j}{\|\vec{d}_i\| \cdot \|\vec{d}_j\|}.$$

defining a semantic similarity function for contribution $c_i$ from participant a and contribution $c_j$ from participant b as $$s_{ij}(a,b) = p_i(a) \cdot p_j(b) \cdot \cos(\vec{d}_i, \vec{d}_j);$$

computing interaction process measures using information of the conversational transcript, the conversational interaction, the semantic space, the natural language vectorization, and the semantic similarity function.

2. The method of claim 1, wherein the natural language vectorization comprises a word-document matrix factorization method including latent semantic analysis (LSA).

3. The method of claim 1, wherein the natural language vectorization comprises a word-document matrix factorization method including term frequency inverse document frequency (TF-IDF).

4. The method of claim 1, wherein the natural language vectorization comprises a neural embedding method including skip-gram.

5. The method of claim 1, wherein the natural language vectorization comprises a neural embedding method including global vectors for word representation (GloVe).

6. The method of claim 1, comprising defining a measure of responsiveness using a participant responsivity function, wherein the participant responsivity function uses the semantic similarity function to average semantic similarity of contributions of one participant a to another participant b when the contributions are lagged by some fixed amount, $\tau$, across all contributions.

7. The method of claim 6, wherein the participant responsivity function comprises $$r_\tau(a, b) = \begin{cases} 0, & \|p_\tau(a, b)\| = 0 \\ \dfrac{1}{\|p_\tau(a, b)\|} \sum_{t=\tau+1}^{n} s_{t,t-\tau}(a, b), & \|p_\tau(a, b)\| \neq 0 \end{cases}.$$

8. The method of claim 7, wherein output of the participant responsivity function is normalized by the total number of $\tau$-lagged contributions expressed as follows:

$$\|p_\tau(a,b)\| = \sum_{t=\tau+1}^{n} p_t(a) \cdot p_{t-\tau}(b)$$

wherein the interaction process measures include the output of the participant responsivity function.

9. The method of claim 8, comprising defining a $\tau$-lagged responsivity matrix across all participants of the plurality of participants as a k×k matrix $R_\tau$, wherein the element in row i, column j is given by the responsivity function $r_\tau(i,j)$.

10. The method of claim 9, wherein rows of the $\tau$-lagged responsivity matrix represent responding participants.

11. The method of claim 10, wherein columns of the $\tau$-lagged responsivity matrix represent the initiating participants.

12. The method of claim 11, wherein a w-spanning responsivity matrix comprises $$\bar{R}_w = \frac{1}{w} \sum_{\tau=1}^{w} R_\tau.$$

13. The method of claim 12, wherein an individual entry in the matrix $\bar{r}_w(a, b)$ comprises the responsivity of participant a to b across w.

14. The method of claim 13, wherein internal cohesion of a participant a comprises diagonal entry $\bar{r}_w(a, a)$ in the w-spanning responsivity matrix, wherein the interaction process measures include the internal cohesion.

15. The method of claim 14, wherein overall responsivity of a participant a to all other participants comprises $$\bar{r}_w(a) = \frac{1}{k-1} \sum_{i=1; i \neq a}^{k} \bar{r}_w(a, i).$$

16. The method of claim 15, wherein the interaction process measures include the overall responsivity.

17. The method of claim 16, wherein social impact comprises $$\bar{\iota}_w(a) = \frac{1}{k-1} \sum_{j=1; j \neq a}^{k} \bar{r}_w(j, a).$$

18. The method of claim 17, wherein the interaction process measures include the social impact.

19. The method of claim 18, comprising defining a subspace of the semantic space matrix as $$G_t = \mathrm{span}\{\vec{d}_1, \vec{d}_2, \ldots, \vec{d}_{t-1}\}.$$

20. The method of claim 19, wherein semantic content of a current contribution of a sequence of contributions may be divided into a portion already given by projecting a document vector for the current contribution onto the subspace as $\vec{g}_t = \mathrm{Proj}_{G_t}(\vec{d}_t)$.

21. The method of claim 20, wherein a portion of the semantic content of a current contribution of a sequence of contributions that is new is given by projecting the document vector onto an orthogonal complement of the subspace as $\vec{n}_t = \mathrm{Proj}_{G_t^\perp}(\vec{d}_t)$.

22. The method of claim 21, wherein new content of a current contribution of a sequence of contributions comprises $$n(c_t) = \frac{\|\vec{n}_t\|}{\|\vec{n}_t\| + \|\vec{g}_t\|}.$$

23. The method of claim 22, wherein newness provided by a participant a comprises $$N(a) = \frac{1}{\|P_a\|} \sum_{t=1}^{n} p_t(a) \cdot n(c_t).$$

24. The method of claim 23, wherein the interaction process measures include the newness.

25. The method of claim 24, wherein communication density of a current contribution of a sequence of contributions comprises $$D_i = \frac{\|\vec{d}_i\|}{\|c_i\|},$$

where $\|\vec{d}_i\|$ is the norm of the $\vec{d}_i$ vector and $\|c_i\|$ is the length of the contribution in words.

26. The method of claim 25, wherein communication density of participant a comprises $$D(a) = \frac{\sum_{t=1}^{n} p_t(a) \cdot \|d_t\|}{\sum_{t=1}^{n} p_t(a) \cdot \|c_t\|}.$$

27. The method of claim 26, wherein the interaction process measures include the communication density of a participant.

\* \* \* \* \*